US008359400B2

(12) United States Patent
Zargham et al.

(10) Patent No.: US 8,359,400 B2
(45) Date of Patent: Jan. 22, 2013

(54) SYSTEM AND METHOD FOR USER-DEFINABLE DOCUMENT EXCHANGE

(75) Inventors: Shawn Zargham, Rockville, MD (US); Mark Hatam, Bethesda, MD (US)

(73) Assignee: Telarix, Inc., Vienna, VA (US)

( * ) Notice: Subject to any disclaimer, the term of this patent is extended or adjusted under 35 U.S.C. 154(b) by 304 days.

(21) Appl. No.: 12/041,484

(22) Filed: Mar. 3, 2008

(65) Prior Publication Data
US 2008/0235319 A1  Sep. 25, 2008

Related U.S. Application Data

(60) Provisional application No. 60/904,352, filed on Mar. 2, 2007.

(51) Int. Cl.
*G06F 15/16* (2006.01)
(52) U.S. Cl. .................................. 709/232; 709/231
(58) Field of Classification Search .................. 709/232
See application file for complete search history.

(56) References Cited

U.S. PATENT DOCUMENTS

| 6,314,425 | B1* | 11/2001 | Serbinis et al. ................. 707/10 |
| 7,050,555 | B2 | 5/2006 | Zargham et al. |
| 7,185,058 | B2 | 2/2007 | Blackwell et al. |
| 2003/0046639 | A1 | 3/2003 | Fai et al. |
| 2004/0024809 | A1 | 2/2004 | Edwards et al. |
| 2004/0034595 | A1* | 2/2004 | Kugeman et al. ................ 705/40 |
| 2004/0194009 | A1* | 9/2004 | LaComb et al. ................ 715/500 |
| 2005/0004885 | A1 | 1/2005 | Pandian et al. |
| 2005/0031019 | A1 | 2/2005 | Itoh |
| 2005/0232263 | A1 | 10/2005 | Sagara |
| 2006/0235987 | A1 | 10/2006 | Goto et al. |
| 2008/0065524 | A1 | 3/2008 | Matthews et al. |

OTHER PUBLICATIONS

"Brown Brothers Harriman Launches Infomediary Solution." [Mar. 20, 2002], Retrieved from the Internet: http://findarticles.com/p/articles/mi_m0EIN/is_2002_March_20/ai_84015578/ [retrieved on Feb. 14, 2011]; [2 pages].

(Continued)

*Primary Examiner* — Benjamin R Bruckart
*Assistant Examiner* — Shripal Khajuria
(74) *Attorney, Agent, or Firm* — Morrison & Foerster LLP

(57) ABSTRACT

A document exchange based on user-definable validation rules provided by the exchanging parties. In one embodiment, an uploader uploads a document from a first computer, the upload being associated with a first member account registered with a network site. A user interface receives a delivery destination for the document from the first computer, the delivery destination being associated with a second member account registered with the network site. A content validator validates content of the document based on rules registered at the network site in connection with the second member account. An output adaptor determines a document delivery format registered at the network site in connection with the second member account. A delivery component delivers the document in the determined format to a second computer associated with the second member account.

56 Claims, 58 Drawing Sheets

OTHER PUBLICATIONS

"Brown Brothers Harriman Infomediary Rolls Out Web-Based Message Entry Application for Asset Managers Using Volante Technologies" [Aug. 27, 2003]. Retrieved from the Internet: <http://www.bobsguide.com/guide/news/2003/Aug/28/BROWN_BROTHERS_HARRIMAN_INFOMEDIARY_ROLLS_OUT_WEB-BASED_MESSAGE_ENTRY_APPLICATION_FOR_ASSET_MANAGERS_USING_VOLANTE_TECHNOLOGIES.html. [retrieved on Feb. 14, 2011]; [1 page].

"BBH Implements Volante Technology for Message Entry Tool." [Aug. 29, 2003] Retrieved from the Internet: http://www.finextra.com/news/fullstory.aspx?newsitemid=9833. [retrieved on Feb. 14, 2011]; [1 page].

"BBH Infomediary Accredited as Swift Solution Partner." [Feb. 24, 2004], Retrieved from the Internet: http://www.finextra.com/news/fullstory.aspx?newsitemid=11250. [retrieved on Feb. 14, 2011]; [1 page].

"Kentouris, C. Omgeo Connects to BBH's Infomediary Messaging Platform." [Oct. 8, 2007], Retrieved from the Internet: http://www.securitiestechnologymonitor.com/issues/19_34/21579-1.html. [retrieved on Feb. 14, 2011]; [1 page].

Extended Search Report dated Jun. 6, 2012 directed to EP Application No. 08731275.7; (6 pages).

* cited by examiner

FIG. 9

| VALIDATION ID | DESCRIPTION | IGNORE RULE | REJECT PRICE LIST | REJECT DESTINATION | REJECT COUNTRY | AUTO ADJUST DATES | SPLIT INTO PARTIAL AND FULL COUNTRY | ALERT ONLY |
|---|---|---|---|---|---|---|---|---|
| PL1010 | DUPLICATE DESTINATION | ○ | ● | ○ | | | | |
| PL1020 | MULTIPLE COUNTRY CODES FOR DESTINATION | ● | ○ | ○ | ○ | | | ○ |
| PL1030 | NEW DESTINATION WITH NO ASSOCIATED DIAL CODES | ● | ○ | ● | | | | ○ |
| PL1040 | DESTINATION WITH NO RATES OR DIAL CODES | ● | ○ | ○ | ○ | | | |
| PL1050 | DESTINATION WITH RATES BUT NO DIAL CODES | ● | ○ | ○ | | | | ○ |
| PL1060 | DESTINATION WITH DIAL CODES BUT NO RATES | ● | ○ | ○ | ○ | | | ○ |
| PL2010 | DUPLICATE RATE TYPE | ● | ○ | ● | | | | ○ |
| PL2020 | RATE INCREASE NOTICE VIOLATION | ● | ○ | | | ○ | | ○ |
| PL2031 | RATE INCREASE | ● | | | | | | ○ |
| PL2032 | RATE DECREASE | ● | | | | | | |
| PL3010 | NON NUMERIC DIAL CODE | ● | ○ | ● | | | | |
| PL3020 | DIAL CODE LENGTH GREATER THAN ALLOWED LIMIT | | ○ | ○ | ○ | | | |
| PL3030 | INVALID DIAL CODE RANGE | ● | ○ | ● | ○ | | | |
| PL3040 | DUPLICATE DIAL CODE | ● | ○ | ● | ○ | | | |
| PL3050 | OVERLAP IN DIAL CODE RANGE | ● | ○ | ○ | ○ | | | ○ |
| PL3060 | DIAL CODE CHANGES NOTICE VIOLATION | ● | ○ | ○ | ○ | ○ | | ○ |
| PL4011 | EFFECTIVE DATE OLDER THAN ALLOWED LIMIT | ● | ○ | ○ | ○ | | | ○ |
| PL4012 | EFFECTIVE DATE GREATER THAN ALLOWED LIMIT | ● | ○ | ○ | ○ | | | ○ |
| PL4020 | OUT OF SEQUENCE RATES | | ○ | | ○ | | | ○ |
| PL4030 | MULTIPLE DATES WITHIN COUNTRY FOR FULL COUNTRY AND A TO Z | | | | | | ○ | |
| PL5010 | TIME BAND OVERLAP | ● | ○ | ○ | ○ | | | ○ |
| PL5020 | COUNTRY CODE NOT RESOLVED | | ○ | ● | | | | ○ |
| PL6010 | TIME BAND MISMATCH | ● | | ○ | ○ | | | ○ |

EXAMPLE

- <ns:OfferDetail Destination="Afghanistan-Mobile" CC="93" EffDate="2007-11-09T00:00:00" MinimumDuration="" InitialRounding="" AdditionalRounding="">
  <ns:Rate Type="R01" Value="0.8768069" />
  <ns:DD DialedDigit="9375" />
  </ns:OfferDetail>
- <ns:OfferDetail Destination="Afghanistan-Mobile" CC="93" EffDate="2007-11-09T00:00:00" MinimumDuration="" InitialRounding="" AdditionalRounding="">
  <ns:Rate Type="R01" Value="0.026711" />
  <ns:DD DialedDigit="9375" />
  </ns:OfferDetail>

* DOES NOT OCCUR WHEN CONVERTING FROM XLS FILES

FIG. 11A

EXAMPLE

1020: MULTIPLE COUNTRY CODES FOR DESTINATION

RECEIVED PRICE LIST REPRESENTATION IN IXLINK DATABASE

| DESTINATION | COUNTRY CODE | DIAL CODE | RATE | EFF. DATE |
|---|---|---|---|---|
| ITALY-ROC-FIXED | 39 | 39 | 0.40 | 23-JAN-07 |
| VATICAN CITY-ROC-FIXED | 39 | 39 | 0.40 | 23-JAN-07 |
| VATICAN CITY-ROC-FIXED | 379 | 379 | 0.40 | 23-JAN-07 |

TREATMENT: "REJECT DESTINATION"

| DESTINATION | COUNTRY CODE | DIAL CODE | RATE | EFF. DATE |
|---|---|---|---|---|
| ITALY-ROC-FIXED | 39 | 39 | 0.40 | 23-JAN-07 |
| VATICAN CITY-ROC-FIXED | 39 | 39 | 0.40 | 23-JAN-07 |
| VATICAN CITY-ROC-FIXED | 379 | 379 | 0.40 | 23-JAN-07 |

TREATMENT: "REJECT COUNTRY"

| DESTINATION | COUNTRY CODE | DIAL CODE | RATE | EFF. DATE |
|---|---|---|---|---|
| ITALY-ROC-FIXED | 39 | 39 | 0.40 | 23-JAN-07 |
| VATICAN CITY-ROC-FIXED | 39 | 39 | 0.40 | 23-JAN-07 |
| VATICAN CITY-ROC-FIXED | 379 | 379 | 0.40 | 23-JAN-07 |

TREATMENT: "AUTO-ADJUST DATES"

| DESTINATION | COUNTRY CODE | DIAL CODE | RATE | EFF. DATE |
|---|---|---|---|---|
| TREATMENT NOT AVAILABLE | | | | |

RECEIVED PRICE LIST REPRESENTATION IN IXLINK DATABASE     EXAMPLE

1030: NEW DESTINATION WITH NO ASSOCIATE DIAL CODES

| DESTINATION | COUNTRY DIAL CODE | DIAL CODE | RATE | EFF. DATE |
|---|---|---|---|---|
| BRAZIL-RIO DE JANEIRO-FIXED | 55 | | 0.30 | 23-JAN-07 |
| BRAZIL-ROC-FIXED | 55 | 55 | 0.40 | 23-JAN-07 |
| ARGENTINA-ROC | 54 | 54 | 0.50 | 23-JAN-07 |

TREATMENT: "REJECT DESTINATION"     TREATMENT: "REJECT COUNTRY"

| DESTINATION | COUNTRY DIAL CODE | DIAL CODE | RATE | EFF. DATE |
|---|---|---|---|---|
| BRAZIL-RIO DE JANEIRO-FIXED | 55 | | | |
| BRAZIL-ROC-FIXED | 55 | 55 | 0.40 | 23-JAN-07 |
| ARGENTINA-ROC | 54 | 54 | 0.50 | 23-JAN-07 |

TREATMENT NOT AVAILABLE

TREATMENT: "AUTO-ADJUST DATES"

| DESTINATION | COUNTRY DIAL CODE | DIAL CODE | RATE | EFF. DATE |
|---|---|---|---|---|

TREATMENT NOT AVAILABLE

FIG. 11D

RECEIVED PRICE LIST REPRESENTATION IN IXLINK DATABASE     EXAMPLE

1040: DESTINATIONS WITH NO RATES OR DIAL CODES

| DESTINATION | COUNTRY DIAL CODE | DIAL CODE | RATE | EFF. DATE |
|---|---|---|---|---|
| BRAZIL-RIO DE JANEIRO-FIXED | | | 0.30 | 23-JAN-07 |
| BRAZIL-ROC-FIXED | 55 | 55 | 0.40 | 23-JAN-07 |
| ARGENTINA-ROC | 54 | 54 | 0.50 | 23-JAN-07 |

TREATMENT: "REJECT DESTINATION"     TREATMENT: "REJECT COUNTRY"

| DESTINATION | COUNTRY DIAL CODE | DIAL CODE | RATE | EFF. DATE |
|---|---|---|---|---|

TREATMENT NOT AVAILABLE

TREATMENT: "AUTO-ADJUST DATES"

| DESTINATION | COUNTRY DIAL CODE | DIAL CODE | RATE | EFF. DATE |
|---|---|---|---|---|

TREATMENT NOT AVAILABLE

EXAMPLE

1050: DESTINATION WITH RATES BUT NO DIAL CODES

| DESTINATION | COUNTRY CODE | DIAL CODE | RATE | EFF. DATE |
|---|---|---|---|---|
| BRAZIL-RIO DE JANEIRO-FIXED | 55 | | 0.30 | 23-JAN-07 |
| BRAZIL-ROC-FIXED | 55 | 55 | 0.40 | 23-JAN-07 |
| ARGENTINA-ROC | 54 | 54 | 0.50 | 23-JAN-07 |

TREATMENT: "REJECT DESTINATION"

| DESTINATION | COUNTRY CODE | DIAL CODE | RATE | EFF. DATE |
|---|---|---|---|---|
| BRAZIL-RIO DE JANEIRO-FIXED | 55 | | | 23-JAN-07 |
| BRAZIL-ROC-FIXED | 55 | 55 | 0.40 | 23-JAN-07 |
| ARGENTINA-ROC | 54 | 54 | 0.50 | 23-JAN-07 |

TREATMENT: "AUTO-ADJUST DATES"

EXAMPLE

| DESTINATION | COUNTRY CODE | DIAL CODE | RATE | EFF. DATE |
|---|---|---|---|---|
| BRAZIL-RIO DE JANEIRO-FIXED | 55 | | 0.30 | 23-JAN-07 |
| BRAZIL-ROC-FIXED | 55 | 55 | 0.40 | 23-JAN-07 |
| ARGENTINA-ROC | 54 | 54 | 0.50 | 23-JAN-07 |

TREATMENT: "AUTO-ADJUST DATES"

| DESTINATION | COUNTRY CODE | DIAL CODE | RATE | EFF. DATE |
|---|---|---|---|---|

TREATMENT NOT AVAILABLE

FIG. 11E

1060: RECEIVED PRICE LIST REPRESENTATION IN IXLINK DATABASE
DESTINATION WITH DIAL CODES BUT NO RATES

| DESTINATION | COUNTRY CODE | DIAL CODE | RATE | EFF. DATE |
|---|---|---|---|---|
| BRAZIL-RIO DE JANEIRO-FIXED | 55 | 5521 | | 23-JAN-07 |
| BRAZIL-ROC-FIXED | 55 | 55 | 0.40 | 23-JAN-07 |
| ARGENTINA-ROC | 54 | 54 | 0.50 | 23-JAN-07 |

TREATMENT: "REJECT DESTINATION"

| DESTINATION | COUNTRY CODE | DIAL CODE | RATE | EFF. DATE |
|---|---|---|---|---|
| BRAZIL-RIO DE JANEIRO-FIXED | 55 | 5521 | | 23-JAN-07 |
| BRAZIL-ROC-FIXED | 55 | 55 | 0.40 | 23-JAN-07 |
| ARGENTINA-ROC | 54 | 54 | 0.50 | 23-JAN-07 |

TREATMENT: "AUTO-ADJUST DATES"

EXAMPLE

TREATMENT: "REJECT COUNTRY"

| DESTINATION | COUNTRY CODE | DIAL CODE | RATE | EFF. DATE |
|---|---|---|---|---|

TREATMENT NOT AVAILABLE

| DESTINATION | COUNTRY CODE | DIAL CODE | RATE | EFF. DATE |
|---|---|---|---|---|

TREATMENT NOT AVAILABLE

RECEIVED PRICE LIST REPRESENTATION IN IXLINK DATABASE  EXAMPLE

2010: DUPLICATE RATE TYPE

| DESTINATION | COUNTRY:DIAL CODE | DIAL CODE | RATE TYPE | RATE |
|---|---|---|---|---|
| BRAZIL-RIO DE JANEIRO-FIXED | 55 | 55.21 | ALL DAY | 0.30 |
| BRAZIL-RIO DE JANEIRO-FIXED | 55 | 55.21 | ALL DAY | 0.35 |
| BRAZIL-ROC-FIXED | 55 | 55 | ALL DAY | 0.40 |
| ARGENTINA-ROC | 54 | 54 | ALL DAY | 0.50 |

TREATMENT: "REJECT DESTINATION"

| DESTINATION | COUNTRY:DIAL CODE | DIAL CODE | RATE TYPE | RATE |
|---|---|---|---|---|
| BRAZIL-RIO DE JANEIRO-FIXED | 55 | 55.21 | ALL DAY | 0.30 |
| BRAZIL-RIO DE JANEIRO-FIXED | 55 | 55.21 | ALL DAY | 0.35 |
| BRAZIL-ROC-FIXED | 55 | 55 | ALL DAY | 0.40 |
| ARGENTINA-ROC | 54 | 54 | ALL DAY | 0.50 |

TREATMENT: "REJECT COUNTRY"

| DESTINATION | COUNTRY:DIAL CODE | DIAL CODE | RATE TYPE | RATE |
|---|---|---|---|---|
| BRAZIL-RIO DE JANEIRO-FIXED | 55 | 55.21 | ALL DAY | 0.30 |
| BRAZIL-RIO DE JANEIRO-FIXED | 55 | 55.21 | ALL DAY | 0.35 |
| BRAZIL-ROC-FIXED | 55 | 55 | ALL DAY | 0.40 |
| ARGENTINA-ROC | 54 | 54 | ALL DAY | 0.50 |

TREATMENT: "AUTO-ADJUST DATES"

| DESTINATION | COUNTRY | DIAL CODE | RATE TYPE | RATE |
|---|---|---|---|---|

TREATMENT NOT AVAILABLE

FIG. 11H

RECEIVED PRICE LIST REPRESENTATION IN IXLINK DATABASE  EXAMPLE

2020: RATE INCREASE NOTICE VIOLATION

| DESTINATION | COUNTRY:DIAL CODE | DIAL CODE | RATE | EFF DATE |
|---|---|---|---|---|
| BRAZIL-RIO DE JANEIRO-FIXED | 55 | 55.21 | 0.35 | 23-JAN-07 |
| BRAZIL-ROC-FIXED | 55 | 55 | 0.40 | 23-JAN-07 |
| ARGENTINA-ROC | 54 | 54 | 0.50 | 23-JAN-07 |

NOTE: SUPPOSE THIS PRICE LIST PROCESSING DATE IS 20-JAN-07, REQUIRED ADVANCED NOTICE PERIOD IS 7 DAYS AND CURRENT DESTINATION'S RATE IS 0.30

TREATMENT: "REJECT DESTINATION"

| DESTINATION | COUNTRY:DIAL CODE | DIAL CODE | RATE | EFF DATE |
|---|---|---|---|---|
| BRAZIL-RIO DE JANEIRO-FIXED | 55 | 55.21 | 0.35 | 23-JAN-07 |
| BRAZIL-ROC-FIXED | 55 | 55 | 0.40 | 23-JAN-07 |
| ARGENTINA-ROC | 54 | 54 | 0.50 | 23-JAN-07 |

TREATMENT: "REJECT COUNTRY"

| DESTINATION | COUNTRY:DIAL CODE | DIAL CODE | RATE | EFF DATE |
|---|---|---|---|---|
| BRAZIL-RIO DE JANEIRO-FIXED | 55 | 55.21 | 0.35 | 23-JAN-07 |
| BRAZIL-ROC-FIXED | 55 | 55 | 0.40 | 23-JAN-07 |
| ARGENTINA-ROC | 54 | 54 | 0.50 | 23-JAN-07 |

TREATMENT: "AUTO-ADJUST DATES"

| DESTINATION | COUNTRY:DIAL CODE | DIAL CODE | RATE | EFF DATE |
|---|---|---|---|---|
| BRAZIL-RIO DE JANEIRO-FIXED | 55 | 55.21 | 0.35 | 27-JAN-07 |
| BRAZIL-ROC-FIXED | 55 | 55 | 0.40 | 23-JAN-07 |
| ARGENTINA-ROC | 54 | 54 | 0.50 | 23-JAN-07 |

FIG. 11I

RECEIVED PRICE LIST REPRESENTATION IN IXLINK DATABASE

2031: RATE INCREASE

| DESTINATION | COUNTRY-DIAL CODE CODE | RATE | EFF.DATE |
|---|---|---|---|
| BRAZIL-RIO DE JANEIRO-FIXED | 55 21 | 0.60 | 23-JAN-07 |
| BRAZIL-ROC-FIXED | 55 | 0.40 | 23-JAN-07 |
| ARGENTINA-ROC | 54 | 0.50 | 23-JAN-07 |

NOTE: SUPPOSE CURRENT DESTINATION'S RATE IS 0.30 AND RATE INCREASE LIMIT IS 50%
TREATMENT: "REJECT DESTINATION"

| DESTINATION | COUNTRY-DIAL CODE CODE | RATE | EFF.DATE |
|---|---|---|---|

TREATMENT NOT AVAILABLE

EXAMPLE — TREATMENT: "REJECT COUNTRY"

| DESTINATION | COUNTRY-DIAL CODE CODE | RATE | EFF.DATE |
|---|---|---|---|

TREATMENT NOT AVAILABLE

TREATMENT: "AUTO-ADJUST DATES"

| DESTINATION | COUNTRY-DIAL CODE CODE | RATE | EFF.DATE |
|---|---|---|---|

TREATMENT NOT AVAILABLE

FIG. 11J

RECEIVED PRICE LIST REPRESENTATION IN IXLINK DATABASE

2032: RATE INCREASE

| DESTINATION | COUNTRY-DIAL CODE CODE | RATE | EFF.DATE |
|---|---|---|---|
| BRAZIL-RIO DE JANEIRO-FIXED | 55 21 | 0.05 | 23-JAN-07 |
| BRAZIL-ROC-FIXED | 55 | 0.40 | 23-JAN-07 |
| ARGENTINA-ROC | 54 | 0.50 | 23-JAN-07 |

NOTE: SUPPOSE CURRENT DESTINATION'S RATE IS 0.30 AND RATE DECREASE LIMIT IS 50%
TREATMENT: "REJECT DESTINATION"

| DESTINATION | COUNTRY-DIAL CODE CODE | RATE | EFF.DATE |
|---|---|---|---|

TREATMENT NOT AVAILABLE

EXAMPLE — TREATMENT: "REJECT COUNTRY"

| DESTINATION | COUNTRY-DIAL CODE CODE | RATE | EFF.DATE |
|---|---|---|---|

TREATMENT NOT AVAILABLE

TREATMENT: "AUTO-ADJUST DATES"

| DESTINATION | COUNTRY-DIAL CODE CODE | RATE | EFF.DATE |
|---|---|---|---|

TREATMENT NOT AVAILABLE

FIG. 11K

| RECEIVED PRICE LIST REPRESENTATION IN IXLINK DATABASE | | | | | EXAMPLE | | | | | |
|---|---|---|---|---|---|---|---|---|---|---|
| 3010: NON NUMERIC DIAL CODE | | | | | TREATMENT: "REJECT COUNTRY" | | | | | |

| DESTINATION | COUNTRY CODE | DIAL CODE | RATE | EFF DATE |
|---|---|---|---|---|
| BRAZIL-RIO DE JANEIRO-FIXED | 55 | 5X | 0.35 | 23-JAN-07 |
| BRAZIL-ROC-FIXED | 55 | 55 | 0.40 | 23-JAN-07 |
| ARGENTINA-ROC | 54 | 54 | 0.50 | 23-JAN-07 |

| DESTINATION | COUNTRY CODE | DIAL CODE | RATE | EFF DATE |
|---|---|---|---|---|
| BRAZIL-RIO DE JANEIRO-FIXED | 55 | 5X | 0.30 | 23-JAN-07 |
| BRAZIL-ROC-FIXED | 55 | 55 | 0.40 | 23-JAN-07 |
| ARGENTINA-ROC | 54 | 54 | 0.50 | 23-JAN-07 |

TREATMENT: "REJECT DESTINATION"

| DESTINATION | COUNTRY CODE | DIAL CODE | RATE | EFF DATE |
|---|---|---|---|---|
| BRAZIL-RIO DE JANEIRO-FIXED | 55 | 6X | 0.30 | 23-JAN-07 |
| BRAZIL-ROC-FIXED | 55 | 55 | 0.40 | 23-JAN-07 |
| ARGENTINA-ROC | 54 | 54 | 0.50 | 23-JAN-07 |

TREATMENT: "AUTO-ADJUST DATES"

| DESTINATION | COUNTRY CODE | DIAL CODE | RATE | EFF DATE |
|---|---|---|---|---|
| TREATMENT NOT AVAILABLE | | | | |

FIG. 11L

| RECEIVED PRICE LIST REPRESENTATION IN IXLINK DATABASE | | | | | EXAMPLE | | | | | |
|---|---|---|---|---|---|---|---|---|---|---|
| 3020: DIAL CODE LENGTH GREATER THEN ALLOWED LIMIT | | | | | TREATMENT: "REJECT COUNTRY" | | | | | |

| DESTINATION | COUNTRY CODE | DIAL CODE | EFF DATE |
|---|---|---|---|
| BRAZIL-RIO DE JANEIRO-FIXED | 55 | 55 21 1234567890123 | 23-JAN-07 |
| BRAZIL-ROC-FIXED | 55 | 55 | 23-JAN-07 |
| ARGENTINA-ROC | 54 | 54 | 23-JAN-07 |

| DESTINATION | COUNTRY CODE | DIAL CODE | RATE | EFF DATE |
|---|---|---|---|---|
| BRAZIL-RIO DE JANEIRO-FIXED | 55 | 55 21 1234567890123 | | 23-JAN-07 |
| BRAZIL-ROC-FIXED | 55 | 55 | | 23-JAN-07 |
| ARGENTINA-ROC | 54 | 54 | | 23-JAN-07 |

NOTE: SUPPOSE MAXIMUM DIALED DIGIT LENGTH IS 15
TREATMENT: "REJECT DESTINATION"

| DESTINATION | COUNTRY CODE | DIAL CODE | EFF DATE |
|---|---|---|---|
| BRAZIL-RIO DE JANEIRO-FIXED | 55 | 55 21 1234567890123 | 23-JAN-07 |
| BRAZIL-ROC-FIXED | 55 | 55 | 23-JAN-07 |
| ARGENTINA-ROC | 54 | 54 | 23-JAN-07 |

TREATMENT: "AUTO-ADJUST DATES"

| DESTINATION | COUNTRY CODE | DIAL CODE | EFF DATE |
|---|---|---|---|
| TREATMENT NOT AVAILABLE | | | |

FIG. 11M

RECEIVED PRICE LIST REPRESENTATION IN IXLINK DATABASE | EXAMPLE | TREATMENT: "REJECT COUNTRY"

3030: DIAL CODE RANGE IS INVALID

| DESTINATION | COUNTRY CODE | DIAL CODE | EFF DATE |
|---|---|---|---|
| BRAZIL-RIO DE JANEIRO-FIXED | 55 | 55 21 24 - 55 21 2 | 23-JAN-07 |
| BRAZIL-ROC-FIXED | 55 | 55 | 23-JAN-07 |
| ARGENTINA-ROC | 54 | 54 | 23-JAN-07 |

TREATMENT: "REJECT DESTINATION"

| DESTINATION | COUNTRY CODE | DIAL CODE | EFF DATE |
|---|---|---|---|
| BRAZIL-RIO DE JANEIRO-FIXED | 55 | 55 21 24 - 55 21 2 | 23-JAN-07 |
| BRAZIL-ROC-FIXED | 55 | 55 | 23-JAN-07 |
| ARGENTINA-ROC | 54 | 54 | 23-JAN-07 |

| DESTINATION | COUNTRY CODE | DIAL CODE | EFF DATE |
|---|---|---|---|
| BRAZIL-RIO DE JANEIRO-FIXED | 55 | 55 21 24 - 55 21 2 | 23-JAN-07 |
| BRAZIL-ROC-FIXED | 55 | 55 | 23-JAN-07 |
| ARGENTINA-ROC | 54 | 54 | 23-JAN-07 |

TREATMENT: "AUTO-ADJUST DATES"

| DESTINATION-COUNTRY CODE | DIAL CODE | EFF DATE |
|---|---|---|

TREATMENT NOT AVAILABLE

| DESTINATION-COUNTRY CODE | DIAL CODE | EFF DATE |
|---|---|---|

TREATMENT NOT AVAILABLE

FIG. 11N

RECEIVED PRICE LIST REPRESENTATION IN IXLINK DATABASE | EXAMPLE | TREATMENT: "REJECT COUNTRY"

3040: DUPLICATE DIAL CODE

| DESTINATION | COUNTRY CODE | DIAL CODE | RATE | RATE TYPE | EFF DATE |
|---|---|---|---|---|---|
| BRAZIL-RIO DE JANEIRO-FIXED | 55 | 55 21 | 0.30 | | 23-JAN-07 |
| BRAZIL-RIO DE JANEIRO-MOBILE | 55 | 55 21 | 0.30 | | 23-JAN-07 |
| BRAZIL-ROC-FIXED | 55 | 55 | 0.40 | | 23-JAN-07 |
| ARGENTINA-ROC | 54 | 54 | 0.50 | | 23-JAN-07 |

TREATMENT: "REJECT DESTINATION"

| DESTINATION | COUNTRY CODE | DIAL CODE | RATE | RATE TYPE | EFF DATE |
|---|---|---|---|---|---|
| BRAZIL-RIO DE JANEIRO-FIXED | 55 | 55 21 | 0.30 | | 23-JAN-07 |
| BRAZIL-RIO DE JANEIRO-MOBILE | 55 | 55 21 | 0.30 | | 23-JAN-07 |
| BRAZIL-ROC-FIXED | 55 | 55 | 0.40 | | 23-JAN-07 |
| ARGENTINA-ROC | 54 | 54 | 0.50 | | 23-JAN-07 |

| DESTINATION | COUNTRY CODE | DIAL CODE | RATE | RATE TYPE | EFF DATE |
|---|---|---|---|---|---|
| BRAZIL-RIO DE JANEIRO-FIXED | 55 | 55 21 | 0.30 | | 23-JAN-07 |
| BRAZIL-RIO DE JANEIRO-MOBILE | 55 | 55 21 | 0.30 | | 23-JAN-07 |
| BRAZIL-ROC-FIXED | 55 | 55 | 0.40 | | 23-JAN-07 |
| ARGENTINA-ROC | 54 | 54 | 0.50 | | 23-JAN-07 |

TREATMENT: "AUTO-ADJUST DATES"

| DESTINATION-COUNTRY CODE | RATE | RATE TYPE |
|---|---|---|

TREATMENT NOT AVAILABLE

FIG. 11O

RECEIVED PRICE LIST REPRESENTATION IN IXLINK DATABASE

3050: OVERLAP IN DIAL CODE RANGE

| DESTINATION | COUNTRY CODE | DIAL CODE | RATE | EFF DATE |
|---|---|---|---|---|
| BRAZIL-RIO DE JANEIRO-FIXED | 55 | 21 2-55 2 | 0.30 | 23-JAN-07 |
| BRAZIL-RIO DE JANEIRO-MOBILE | 55 | 21 4-55 2 | 0.50 | 23-JAN-07 |
| BRAZIL-ROC-FIXED | 55 | 55 | 0.40 | 23-JAN-07 |
| ARGENTINA-ROC | 54 | 54 | 0.50 | 23-JAN-07 |

TREATMENT: "REJECT DESTINATION"

| DESTINATION | COUNTRY CODE | DIAL CODE | RATE | RATE TYPE | EFF DATE |
|---|---|---|---|---|---|
| BRAZIL-RIO DE JANEIRO-FIXED | 55 | 21 2-55 2 | 0.30 | | 23-JAN-07 |
| BRAZIL-RIO DE JANEIRO-MOBILE | 55 | 21 4-55 2 | 0.50 | | 23-JAN-07 |
| BRAZIL-ROC-FIXED | 55 | 55 | 0.40 | | 23-JAN-07 |
| ARGENTINA-ROC | 54 | 54 | 0.50 | | 23-JAN-07 |

EXAMPLE

TREATMENT: "REJECT COUNTRY"

| DESTINATION | COUNTRY CODE | DIAL CODE | RATE | EFF DATE |
|---|---|---|---|---|
| BRAZIL-RIO DE JANEIRO-FIXED | 55 | 21 2-55 2 | 0.30 | 23-JAN-07 |
| BRAZIL-RIO DE JANEIRO-MOBILE | 55 | 21 4-55 2 | 0.50 | 23-JAN-07 |
| BRAZIL-ROC-FIXED | 55 | 55 | 0.40 | 23-JAN-07 |
| ARGENTINA-ROC | 54 | 54 | 0.50 | 23-JAN-07 |

TREATMENT: "AUTO-ADJUST DATES"

| DESTINATION/COUNTRY CODE/DIAL CODE | RATE | RATE TYPE |
|---|---|---|
| TREATMENT NOT AVAILABLE | | |

RECEIVED PRICE LIST REPRESENTATION IN IXLINK DATABASE

3060: DIAL CODE CHANGES NOTICE VIOLATION

| DESTINATION | COUNTRY CODE | DIAL CODE | RATE | EFF DATE |
|---|---|---|---|---|
| BRAZIL-RIO DE JANEIRO-FIXED | 55 | 55 21 2 | 0.30 | 23-JAN-07 |
| BRAZIL-ROC-FIXED | 55 | 55 | 0.40 | 23-JAN-07 |
| ARGENTINA-ROC | 54 | 54 | 0.50 | 23-JAN-07 |

NOTE: SUPPOSE PRICE LIST PROCESSING DATE IS 20-JAN-2007, CURRENT DESTINATION "DIAL CODE" IS 55 21 AND ADVANCED NOTICE PERIOD FOR CHANGING DIAL CODE IS 7 DAYS

TREATMENT: "REJECT DESTINATION"

| DESTINATION | COUNTRY CODE | DIAL CODE | RATE | EFF DATE |
|---|---|---|---|---|
| BRAZIL-RIO DE JANEIRO-FIXED | 55 | 55 21 2 | 0.30 | 23-JAN-07 |
| BRAZIL-ROC-FIXED | 55 | 55 | 0.40 | 23-JAN-07 |
| ARGENTINA-ROC | 54 | 54 | 0.50 | 23-JAN-07 |

EXAMPLE

TREATMENT: "REJECT COUNTRY"

| DESTINATION | COUNTRY CODE | DIAL CODE | RATE | EFF DATE |
|---|---|---|---|---|
| BRAZIL-RIO DE JANEIRO-FIXED | 55 | 55 21 2 | 0.30 | 23-JAN-07 |
| BRAZIL-ROC-FIXED | 55 | 55 | 0.40 | 23-JAN-07 |
| ARGENTINA-ROC | 54 | 54 | 0.50 | 23-JAN-07 |

TREATMENT: "AUTO-ADJUST DATES"

FIG. 11Q

EXAMPLE

RECEIVED PRICE LIST REPRESENTATION IN IXLINK DATABASE

4011: EFFECTIVE DATE OLDER THAN ALLOWED LIMIT

| DESTINATION | COUNTRY CODE | DIAL CODE | RATE | EFF-DATE |
|---|---|---|---|---|
| BRAZIL-RIO DE JANEIRO-FIXED | 55 | 55 21 | 0.30 | 23-SEP-06 |
| BRAZIL-ROC-FIXED | 55 | 55 | 0.40 | 23-JAN-07 |
| ARGENTINA-ROC | 54 | 54 | 0.50 | 23-JAN-07 |

NOTE: SUPPOSE PRICE LIST PROCESSING DATE IS 20-JAN-2007 AND PAST DAYS LIMIT IS 30 DAYS

TREATMENT: "REJECT DESTINATION"

| DESTINATION | COUNTRY CODE | DIAL CODE | RATE | EFF-DATE |
|---|---|---|---|---|
| BRAZIL-RIO DE JANEIRO-FIXED | 55 | 55 21 | | |
| BRAZIL-ROC-FIXED | 55 | 55 | 0.40 | 23-JAN-07 |
| ARGENTINA-ROC | 54 | 54 | 0.50 | 23-JAN-07 |

TREATMENT: "REJECT COUNTRY"

| DESTINATION | COUNTRY CODE | DIAL CODE | RATE | EFF-DATE |
|---|---|---|---|---|
| BRAZIL-RIO DE JANEIRO-FIXED | 55 | 55 21 | | |
| BRAZIL-ROC-FIXED | 55 | 55 | | |
| ARGENTINA-ROC | 54 | 54 | 0.50 | 23-JAN-07 |

TREATMENT: "AUTO-ADJUST DATES"

| DESTINATION | COUNTRY CODE | DIAL CODE | RATE | EFF-DATE |
|---|---|---|---|---|
| TREATMENT NOT AVAILABLE | | | | |

FIG. 11R

EXAMPLE

RECEIVED PRICE LIST REPRESENTATION IN IXLINK DATABASE

4012: EFFECTIVE DATE GREATER THAN ALLOWED LIMIT

| DESTINATION | COUNTRY CODE | DIAL CODE | RATE | EFF-DATE |
|---|---|---|---|---|
| BRAZIL-RIO DE JANEIRO-FIXED | 55 | 55 21 | 0.30 | 23-SEP-07 |
| BRAZIL-ROC-FIXED | 55 | 55 | 0.40 | 23-JAN-07 |
| ARGENTINA-ROC | 54 | 54 | 0.50 | 23-JAN-07 |

NOTE: SUPPOSE PRICE LIST PROCESSING DATE IS 20-JAN-2007 AND FUTURE DAYS LIMIT IS 30 DAYS

TREATMENT: "REJECT DESTINATION"

| DESTINATION | COUNTRY CODE | DIAL CODE | RATE | EFF-DATE |
|---|---|---|---|---|
| BRAZIL-RIO DE JANEIRO-FIXED | 55 | 55 21 | | |
| BRAZIL-ROC-FIXED | 55 | 55 | 0.40 | 23-JAN-07 |
| ARGENTINA-ROC | 54 | 54 | 0.50 | 23-JAN-07 |

TREATMENT: "REJECT COUNTRY"

| DESTINATION | COUNTRY CODE | DIAL CODE | RATE | EFF-DATE |
|---|---|---|---|---|
| BRAZIL-RIO DE JANEIRO-FIXED | 55 | 55 21 | | |
| BRAZIL-ROC-FIXED | 55 | 55 | | |
| ARGENTINA-ROC | 54 | 54 | 0.50 | 23-JAN-07 |

TREATMENT: "AUTO-ADJUST DATES"

| DESTINATION | COUNTRY CODE | DIAL CODE | RATE | EFF-DATE |
|---|---|---|---|---|
| TREATMENT NOT AVAILABLE | | | | |

| CONFIG | UNIT | VALUE |
|---|---|---|
| PAST EFFECTIVE DATE NOTICE PERIOD | DAYS | 7 |
| FUTURE EFFECTIVE DATE NOTICE PERIOD | DAYS | 7 |
| DIAL CODE CHANGE NOTICE PERIOD | DAYS | 7 |
| RATE INCREASE NOTICE PERIOD | DAYS | 7 |
| DIAL CODE LENGTH | CHARACTERS | 50 |
| RATE INCREASE PERCENTAGE | % | 10 |
| RATE DECREASE PERCENTAGE | % | 10 |

FIG. 12

FIG. 13 iXLink

| Operation | Admin | Report | Help | Logout |

Dashboard > Operation > Transactions

Global Telecommunications, Inc.

Begin Date: 2/22/2008    Document Type: ALL    Transaction Status: ALL
End Date: 2/29/2008      Link Activity: ALL    Modified by iXLink: ALL
                         Link Code:            Other Member: ALL
                         Document ID:

[Search]

| Document | Link Code | Sending Member | Receiving Member | Received At | Status |
|---|---|---|---|---|---|
| [200802281649108433][GBL_TLCO-GBL_CCC][PL][Eur][Price List Receipt-Demo] | [GBL_TLCO-GBL_CCC][PL][Eur][Price List Receipt-Demo] | Global Telecommunications, Inc. | Call Connect Communications | 2008-02-28 16:49:10 | Complete |
| [200802281635337][GBL_TLCO-GBL_CCC][PL][Eur][Price List Receipt-Demo] | [GBL_TLCO-GBL_CCC][PL][Eur][Price List Receipt-Demo] | Global Telecommunications, Inc. | Call Connect Communications | 2008-02-28 16:35:33 | Complete |
| [200802280224283][GBL_TLCO-GBL_CCC][PL][Eur][Price List Receipt-Demo] | [GBL_TLCO-GBL_CCC][PL][Eur][Price List Receipt-Demo] | Global Telecommunications, Inc. | Call Connect Communications | 2008-02-28 02:24:28 | Complete |
| [200802280139250477][GBL_TLCO-GBL_CCC][PL][Eur][Price List Receipt-Demo] | [GBL_TLCO-GBL_CCC][PL][Eur][Price List Receipt-Demo] | Global Telecommunications, Inc. | Call Connect Communications | 2008-02-28 01:39:25 | Complete |
| [200802221647375977][GBL_TLCO-GBL_CCC][PL][Eur][Price List Receipt-Demo] | [GBL_TLCO-GBL_CCC][PL][Eur][Price List Receipt-Demo] | Global Telecommunications, Inc. | Call Connect Communications | 2008-02-22 16:47:37 | Complete |

*iXLink* — Global Telecommunications, Inc.

| Operation | Admin | Report | Help | Logout |
|---|---|---|---|---|

- Business Rules
- Config Variables
- Time Band Definition
- Rounding Rules
- Time Band \ Rounding Rules Overrides
- Notifications
- Delivery Methods

| Notification | Active | Recipients | Attachments |
|---|---|---|---|
| Receipt Notification | ☑ | Trial User; | Original Price List; |
| Price List Rejection | ☑ | Trial User; | Original Price List; Validation Results; |
| Price List Delivery Successful | ☑ | Trial User; | Original Price List; Validation Results; Final Price List; |
| Price List Delivery Failure | ☑ | Trial User; | Original Price List; Validation Results; Final Price List; |

[Save]

SYSTEM AND METHOD FOR USER-DEFINABLE DOCUMENT EXCHANGE

CROSS REFERENCE TO RELATED APPLICATION

This application claims the benefit under 35 USC 119(e) of U.S. Provisional Application No. 60/904,352, filed Mar. 2, 2007, the entirety of which is incorporated herein by reference.

FIELD OF THE DISCLOSURE

The disclosure of the present application relates to the exchange of documents between parties, and more particularly, to customizing the document exchange based on validation rules provided by the exchanging parties.

BACKGROUND

The seemingly simple notion of exchanging business documents among business partners can become quite a complicated task in practice. An example of this may be found in the telecommunications industry. As a result of deregulation, communication service providers (e.g., telecommunication carriers) interconnect with other carriers when it is not possible to complete an end-to-end call entirely on a single carrier's network in the most efficient way. For instance, a call may originate within carrier A's network and terminate on carrier B's network. Alternatively, in a more complicated scenario, a call may originate on carrier A's network, transmit through carrier B's network, and then terminate on carrier C's network. In the latter case, carrier A must interconnect with carrier B and carrier B must interconnect with carrier C. These routing options force carriers to establish and manage multiple interconnect agreements in order to optimize the use of their networks, reduce costs, and increase margins.

Such contracts, invoices and other business documents related to network services are primarily transferred among carriers via fax, email (as attachments) and postal mail. These documents are then interpreted and the key data extracted and entered manually into various systems to support upstream business processes. When operating in an intensely competitive and dynamic environment that is characterized by declining prices and shrinking margins, providers such as interconnect carriers devote valuable time and resources to managing the exchange of business documents that could otherwise be spent on optimizing network operations and focusing on other important business goals.

SUMMARY

A document exchange based on user-definable validation rules provided by the exchanging parties is disclosed. In one embodiment, a system may include an uploader, a user interface, a content validator, an output adaptor and a delivery component.

The uploader may upload a document from a first computer, with the upload being associated with a first member account registered with a network site. The user interface may receive a delivery destination for the document from the first computer, with the delivery destination being associated with a second member account registered with the network site. The content validator may validate content of the document based on rules registered at the network site in connection with the second member account. The output adaptor may determine a document delivery format registered at the network site in connection with the second member account. The delivery component may deliver the document in the determined format to a second computer associated with the second member account.

BRIEF DESCRIPTION OF THE DRAWINGS

FIG. 9 is a screenshot of an example of configurable business rules and treatments within a document exchange platform.

FIGS. 11A-11V are examples of business rules within a document exchange platform.

FIG. 12 is a screenshot of an example of configurable variable for business rule conditions within a document exchange platform.

FIG. 13 is a screenshot of an example of a web portal dashboard within a document exchange platform.

FIGS. 14A-14D are screenshots of examples of transaction monitoring pages within a document exchange platform.

FIG. 16 is a screenshot of an example of a report page within a document exchange platform.

DETAILED DESCRIPTION

The present disclosure teaches an automated business document exchange platform. This platform allows documents to be sent, received, analyzed and loaded into systems automatically based on rules and parameters provided by the exchanging parties.

Through the use of input and output adaptors, systems and processes, this platform provides for an automatic exchange of business documents between parties such as communication service providers (CSPs) or carriers, for example. Carriers may be certified and officially registered as a member of the platform. Once a carrier is a member, links can be established with any other member to begin exchanging information via the platform for a specified service.

These links refer to a logical connection between the sending member and the receiving member via the document exchange platform, such as a controlled business communication channel established between two carrier members for the document exchange process. The flow of business information embodied in an exchanged document, such as price lists for example, using this channel may be one-way from one specific member to another. Messaging, such as email notifications for example, may be two-way. Two members may create multiple links between them. Every link between a seller and a buyer, for example, may be assigned a link code.

As part of the registration process, configurable adaptors may be created to parse the sending carriers' document. When a document is received by the platform, it may be put through the senders' input adaptor to extract the relevant business information. The format and content of the business information may then be analyzed and validated by the sending and/or receiving members' defined business rules. If the document is accepted, it may be sent to the receiving member as defined by the receiving member's output adaptor. Senders and receivers may be notified via email and system messages of the results. If rejected, the business document may be returned to the sender with a detailed explanation of why the document was not accepted. Members can monitor transaction activity and configure link and business rules through a web portal.

A transaction refers to an operation related the exchange of business documents between two members of the document exchange platform consistent with internal business rules as defined by one or both members. All transactions may be tracked and audited. In the case of the price list receipt service, for example, a transaction may involve a seller sending a price list document via a link to a buyer, after the buyer's business rules have been applied.

Figure 1:
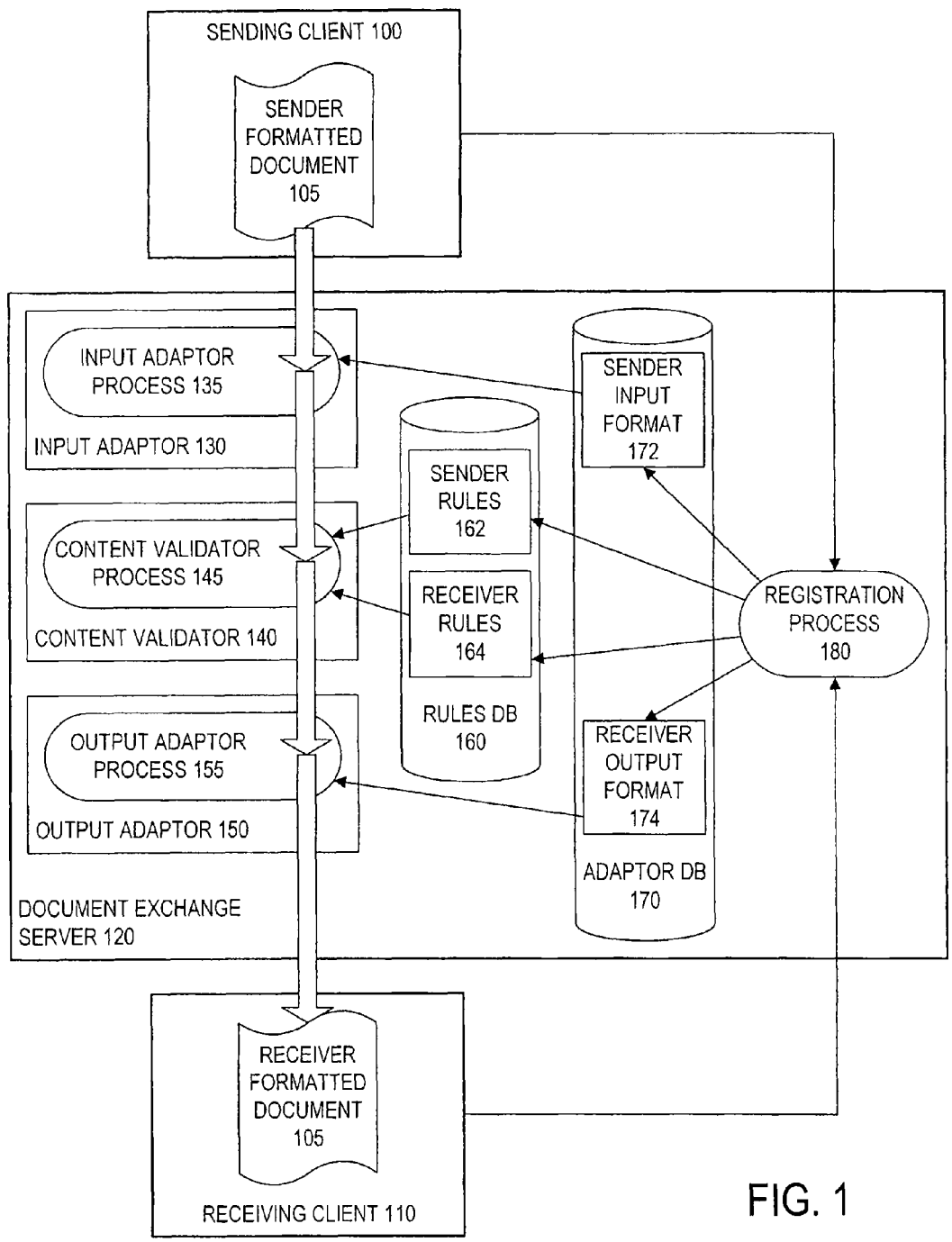
FIG. 1 is a block diagram of an example of a document exchange system and process.
Figure 2:
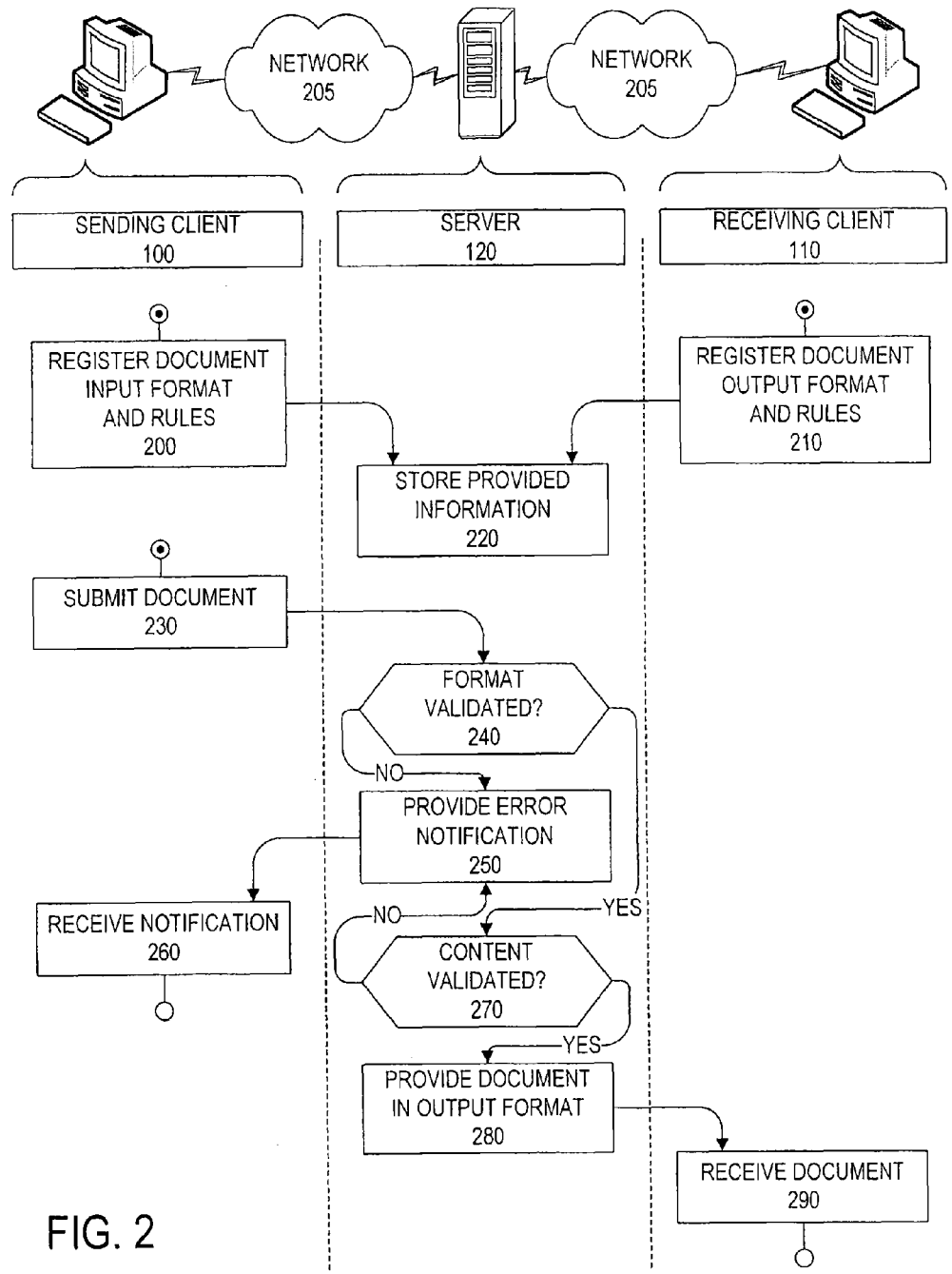
FIG. 2 is a flow diagram of an example of a document exchange process.

As shown in FIGS. 1 and 2 in one embodiment, for example, a sender, via sending client 100, may utilize document exchange server 120 to deliver sender formatted document 105 to a receiver, via receiving client 110, in a format expected by the receiver. Although this embodiment shows one sender delivering one document to one receiver, a sender may employ server 120 to deliver any number of documents to any number of receivers.

In order to utilize the services of server 120, the sender and receiver may first register with server 120 via registration process 180. The sender may register (step 200) input format information 172 and rules 162, for example. Input format information 172 may identify a format to be associated with a particular type of document that the sender may intend to deliver via server 120. Rules 162 may identify particular business rules that may be applied to validate content associated with the particular type of document the sender may intend to deliver. The receiver may register (step 210) output format information 174 and rules 164, for example. Output format information 174 may identify a format that the receiver expects to be associated with a particular type of document to be delivered to the receiver via server 120. Rules 164 may identify particular rules that may be applied to validate content associated with the particular type of document to be delivered to the receiver. Although not shown, the sender may register output format information and the receiver may register input format information for a reverse situation in which the receiver intends to deliver a document to the sender via server 120. Registration process 180 stores (step 220) the provided format information in adaptor database 170 and the provided rules in rules database 160.

Once registered, the sender may submit (step 230) a document to server 120 for delivery to the receiver. Upon uploading the document from sending client 100, server 120 may utilize process 135 by input adaptor 130 to validate (step 240) the document's format. Process 135 may utilize the sender's registered input format information 172 in this validation. If a formatting error is determined, server 120 may provide (step 250) an error notification to sending client 100 (step 260). If no formatting error is determined, server 120 may utilize process 145 by content validator 140 to validate (step 270) the document's content. Process 145 may utilize the receiver's rules 164 and/or the sender's rules 162 in this validation. If the content violates a rule, server 120 may provide (step 250) an error notification to sending client 100 (step 260). If no rule violation is determined, server 120 may provide (step 280) the document to receiving client 110 (step 280) in the format expected by the receiver for the type of document being delivered. Server 120 may utilize process 155 by output adaptor 150 to determine the expected format. Process 155 may utilize the receiver's registered output format information 174 to provide the appropriate formatting to the document.

The types of documents can vary by industry and application. For example, types of documents that may be exchanged by server 120 between CSPs may include pricelists, target buy lists, invoices, declarations, disputes, complex bilateral agreements, and other documents related to the exchange of network services between the carriers. The document exchange may be based on the CSPs defining specific adaptors for each carrier member to convert the member's custom formats into a default format for processing, followed by defining carrier-to-carrier unidirectional configurable commercial links capable of encapsulating a corresponding document schema and business process rules that specify the treatment of documents exchanged between the carriers' members and define the behavior of the process interfaces. This neutral business-to-business exchange for CSPs may include receiving and sending business documents via email, File Transfer Protocol (i.e. FTP), and Web Services, importing and exporting data in custom XML, Excel, or .CSV formats, a transaction manager in charge of coordinating and orchestrating data processing, a database layer for storing the data and applying business rules, and a web portal interface for transaction monitoring, reporting and data entry.

Figure 3:
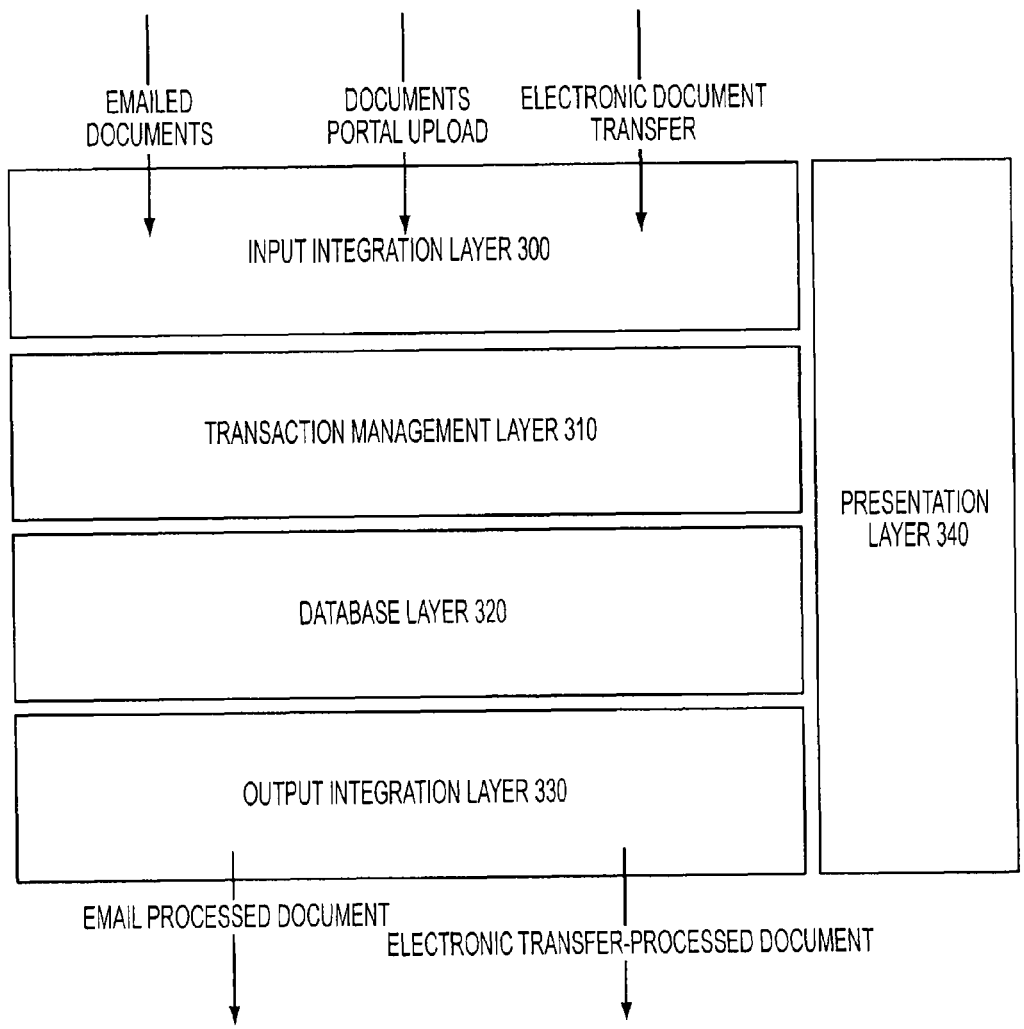
FIG. 3 is a block diagram of an example of system architecture of a document exchange platform.

An example of a document exchange system architecture is shown in FIG. 3. The system architecture includes input integration layer 300, transaction management layer 310, database layer 320, output integration layer 330 and presentation layer 340.

Input integration layer 300 provides for inputting data from business documents into a target link between the sending and receiving members. A set of user input may select the receiving member and the business link identifying the receiver that the business document is to be sent to. Business documents can be emailed, uploaded through a web portal or electronically transferred by the sending member for example. The business documents can be in Microsoft Excel, custom or default XML, or other commonly acceptable business data formats for example.

Figure 4:
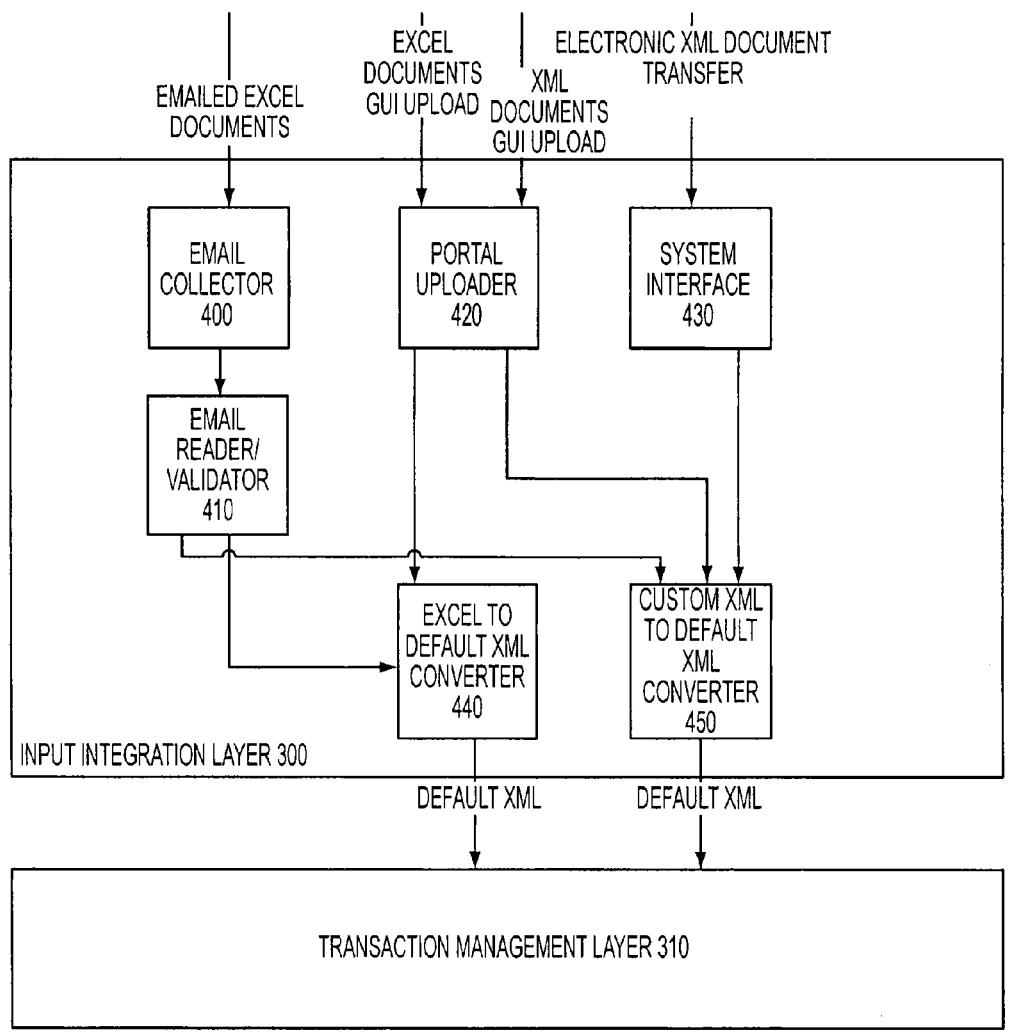
FIG. 4 is a block diagram of an example of an input integration layer of a document exchange platform.

FIG. 4 shows several components of input integration layer 300. For example, email collector 400 may include multiple email servers based on a redundant architecture resulting in high availability. Email collector 400 may use email protocols such as POP3 for receiving emails, for example. Email reader/validator 410 may get a list of all email accounts to poll and create multiple threads, one per account, for further processing. It may then retrieve emails from all email collectors for an email account after validating a link code, attachments, and sending and receiving member information. Subsequently, it may log all information about the email in a database and create a transaction record by communicating with database layer 320 and transaction management layer 310, respectively. It may then route the business document to the appropriate format converter, depending on the type and format of the business document attached to the incoming email.

The following is an example of some email validations that may be performed by the system:
1. Missing or Invalid Email Subject
2. Missing or Invalid Link Code 3. Missing or Invalid Business Document Content
4. User Not Allowed to Send Business Document
5. Link Code and Email Address Mismatch
6. Attachment Missing
7. Multiple Attachments in Excel Format
8. Missing Business Document Template Portal uploader 420 may provide a web user interface for authorized members to upload their business documents after selecting the appropriate receiving member as well as a corresponding link code. System interface 430 may allow electronic transfer of business documents from the sending member's client 100 by supporting common industry protocols such as Web Services, HTTP Post, and alike, for example. Excel to default XML converter 440 may validate incoming Excel files against predefined templates or input adaptors and map the incoming document into a default XML document and then transfer the document to transaction management layer 310 for further processing.

The following is an example of some of the template validations performed by the system:

1. Sheet Name Not Found.
2. Empty Sheet.
3. Invalid Header.
4. Header Column Not Found.
5. Date Reference Not Found.
6. No Compatible Date Format.
7. No Compatible Number Format.
8. Missing Destination Name.
9. Missing Effective Date.
10. Missing Rate Type.
11. Invalid Country Code Format
12. Invalid Dial Code Format.
13. Invalid Rate Type Format.
14. Invalid Date Label Format Custom XML to default XML converter 450 is another example of an input adaptor and may map custom XML documents into a default XML document and then transfer the document to transaction management layer 310 for further processing.

Figure 5:
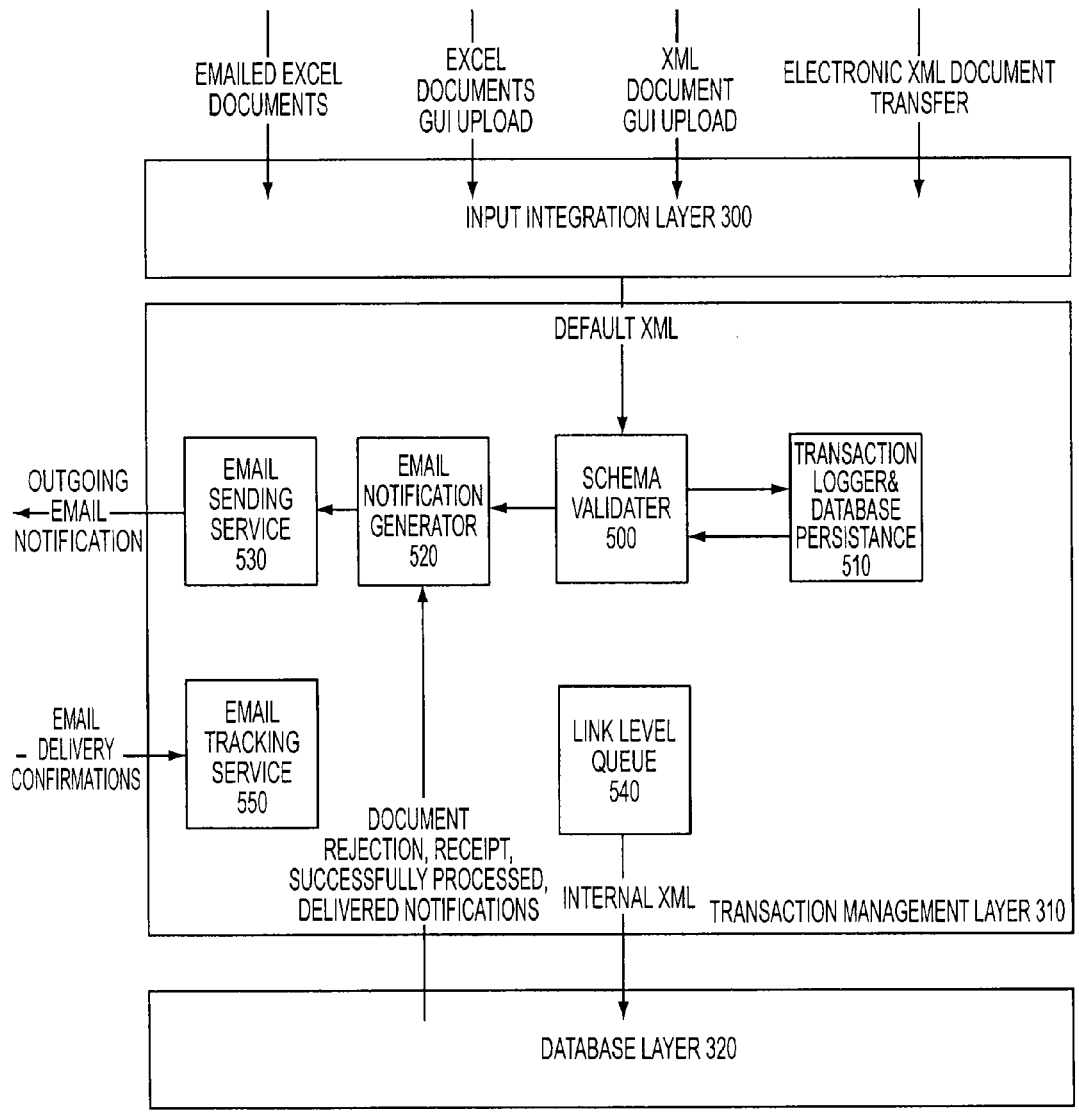
FIG. 5 is a block diagram of an example of a transaction management layer of a document exchange platform.

FIG. 5 shows several components of transaction management layer 310. For example, schema/format validator 500 may verify that the default XML follows a pre-defined format. If not, the business document may get fully rejected and a message passed to email notification generator 520. The default XML may then be converted into an internal XML format with additional information such as record level indicators and sent to link level queue 540. Transaction logger & database persistence 510 may log every transaction for tracking and reporting purposes, and store them in the database for persistence, enabling full recovery from system errors. Link level queue 540 may manage orderly processing of the business documents sent to each link preventing backlogs and prioritizing requests made against each link.

Email notification generator 520 may generate various configurable email notifications ready to be sent to the sender and/or the receiver of the business document. The email notification may contain details about receipt, full rejection, successful processing, and successful delivery of the business documents and may be configured to have the original business document, the validation results, as well as the final processed business document(s) as attachments. Email sending service 530 may send out the email notifications received from email notification generator 520, using email protocols like SMTP for example. Email tracking service 550 may track outgoing emails such as successful delivery to the email recipient, incorrect email address, email servers down, inbox limit exceeded, etc. It also may forward email messages generated by the receiving member's email server to a designated user belonging to the sending member. An example of these types of messages is an auto-reply or out-of-office email message.

Figure 6:
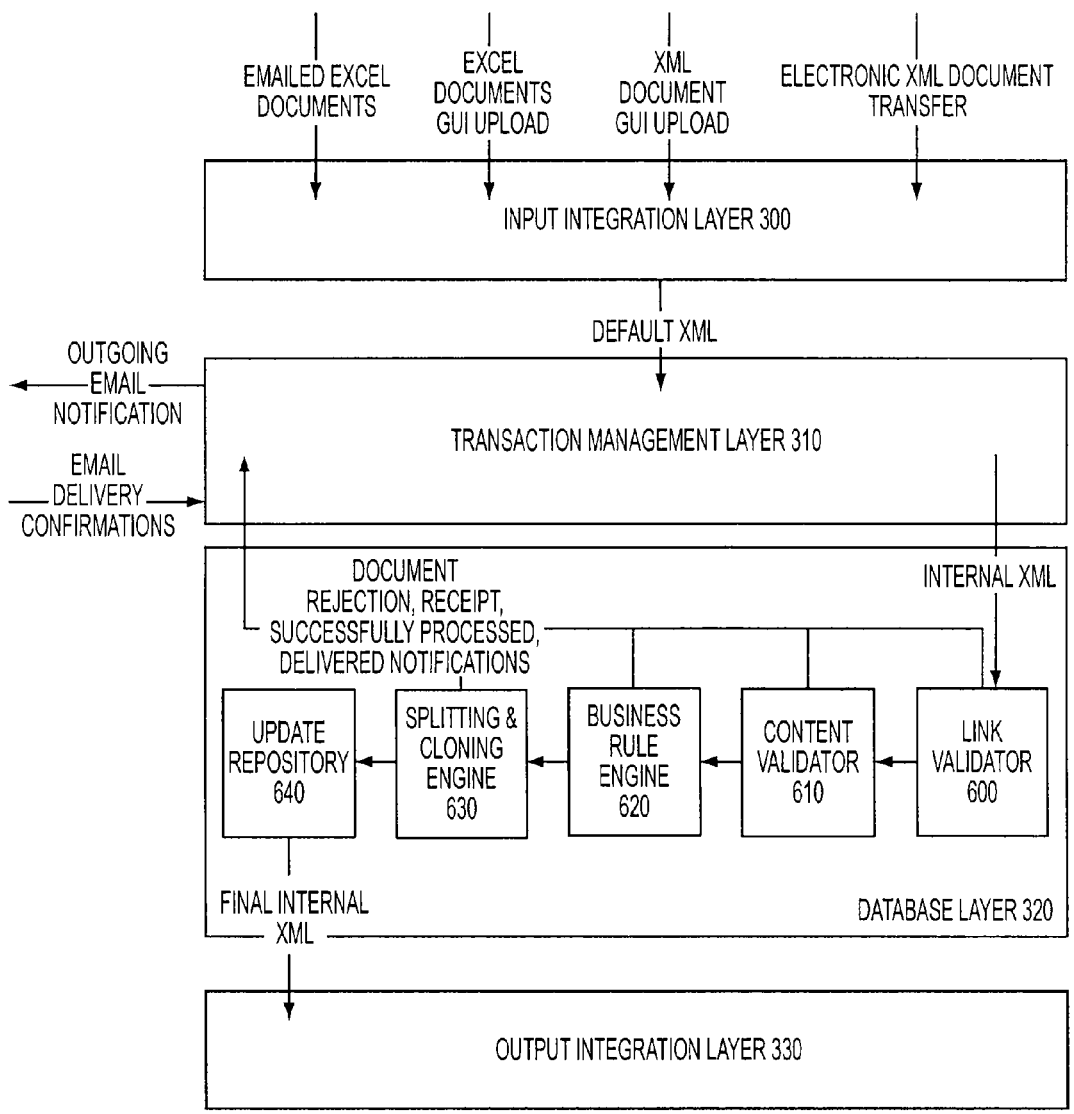
FIG. 6 is a block diagram of an example of a database layer of a document exchange platform.

FIG. 6 shows several components of database layer 320. For example, link validator 600 may verify that a link code supplied by the sender of the business document matches a predefined link code associated with the link. Content validator 610 may verify that the content of the business document is based on predefined rules. An example of content violation is an invalid currency associated with the rates in a business document sent by the sending member. Business rule engine 620 may include treatments selected for specific conditions that may arise when the system is processing a business document. Business rules may be configured by the sending or receiving member for validating the contents of the business documents. Content validator 140 may include functionality provided by both content validator 610 and business rule engine 620.

FIG. 9 shows examples of business rules and treatments that a member can configure.

1. Business Rules—Treatments

As shown in FIG. 9, there are seven types of treatments in this embodiment that may be applied to the conditions. Note that business rules violations might not always result in full rejection of the business document. Also note that not all of the treatments may apply to every business rule condition. For example, a member cannot set the treatment "Ignore the Rule" if there is a new destination with no associated dial codes in this embodiment. The treatments may be configured as follows:

a) Ignore Rule

Rule is not taken into consideration for processing the business document.

b) Reject Entire Document

Business document is fully rejected if condition is true.

c) Reject Destination

Figure 10A:
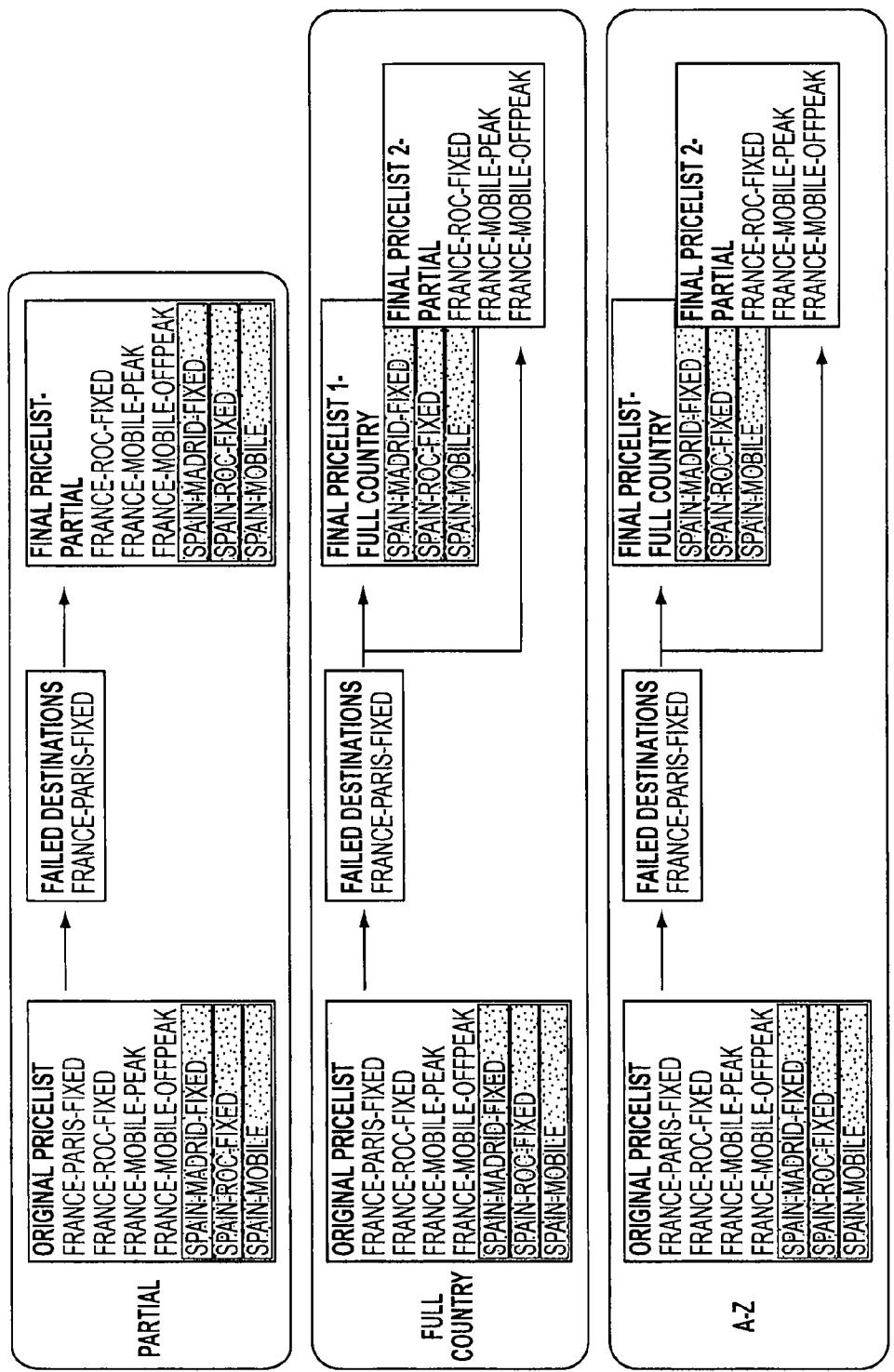
FIGS. 10A-10C are examples of business rule treatments within a document exchange platform.

The specific destination is rejected if condition is true. An example of this treatment is shown in FIG. 10A. Note that a Full Country and A-Z Price Lists may be split in this treatment as shown in the example.

d) Reject Country

Figure 10B:
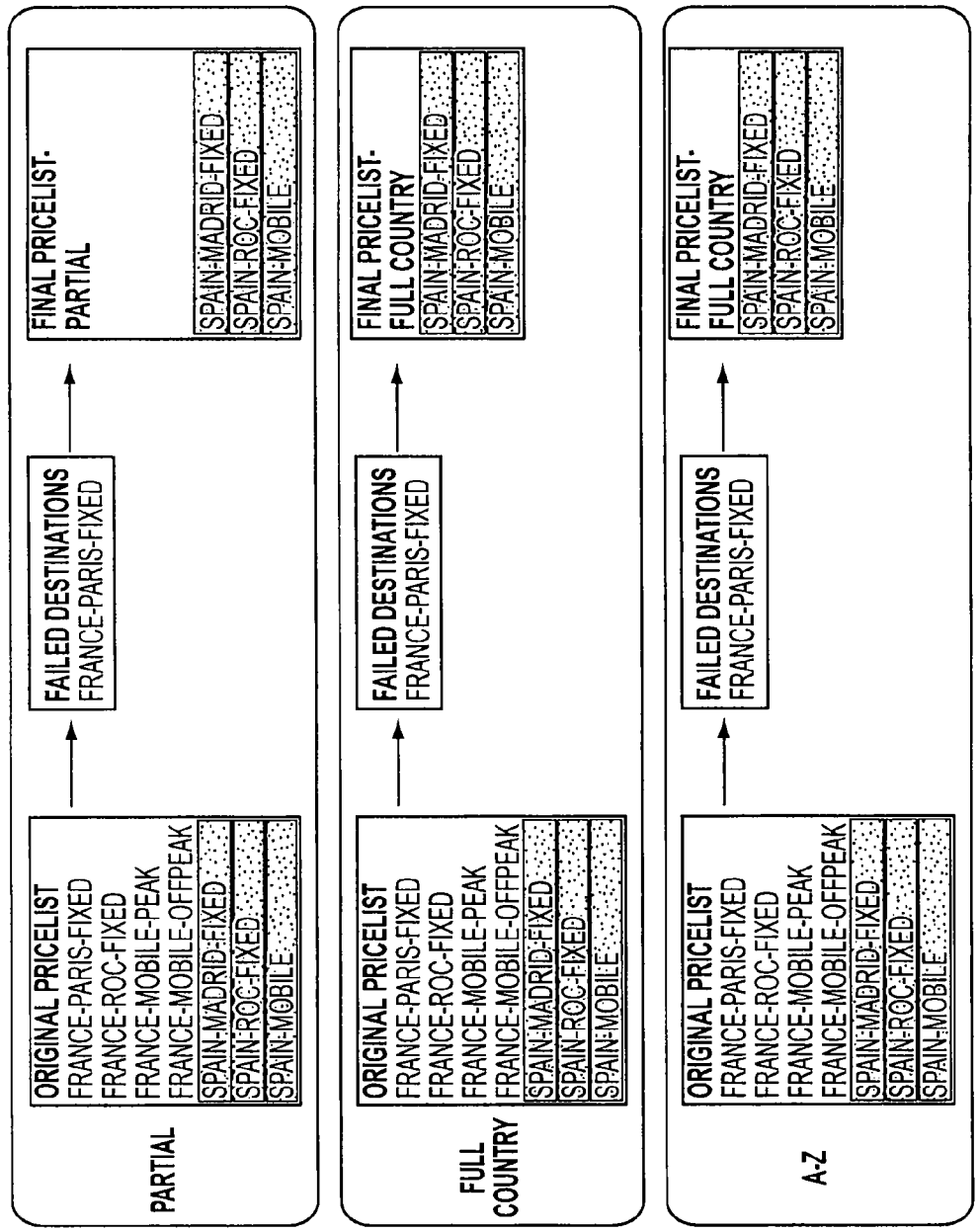

All the destinations for that country are rejected if condition is true. An example of this treatment is shown in FIG. 10B. Note that an A-Z Price List may be transformed into a Full Country if this treatment is applied to it.

e) Auto Adjust Dates

This treatment is applicable to PL 2020—Rate Increase Notice Violation and PL 3060—Dial Code Change Notice. The effective dates in a business document that violate the user-defined range are automatically changed by the system. The user defined range is set by configuration variables. For example, on November 5th the system processes a business document that includes rate increases for November 8th, but the receiving member requires an advance notice of 7 days. If Auto-Adjust treatment is chosen, the system changes the effective date of these rates from November 8th to November 12th.

f) Split into Partial and Full Country

Figure 10C:
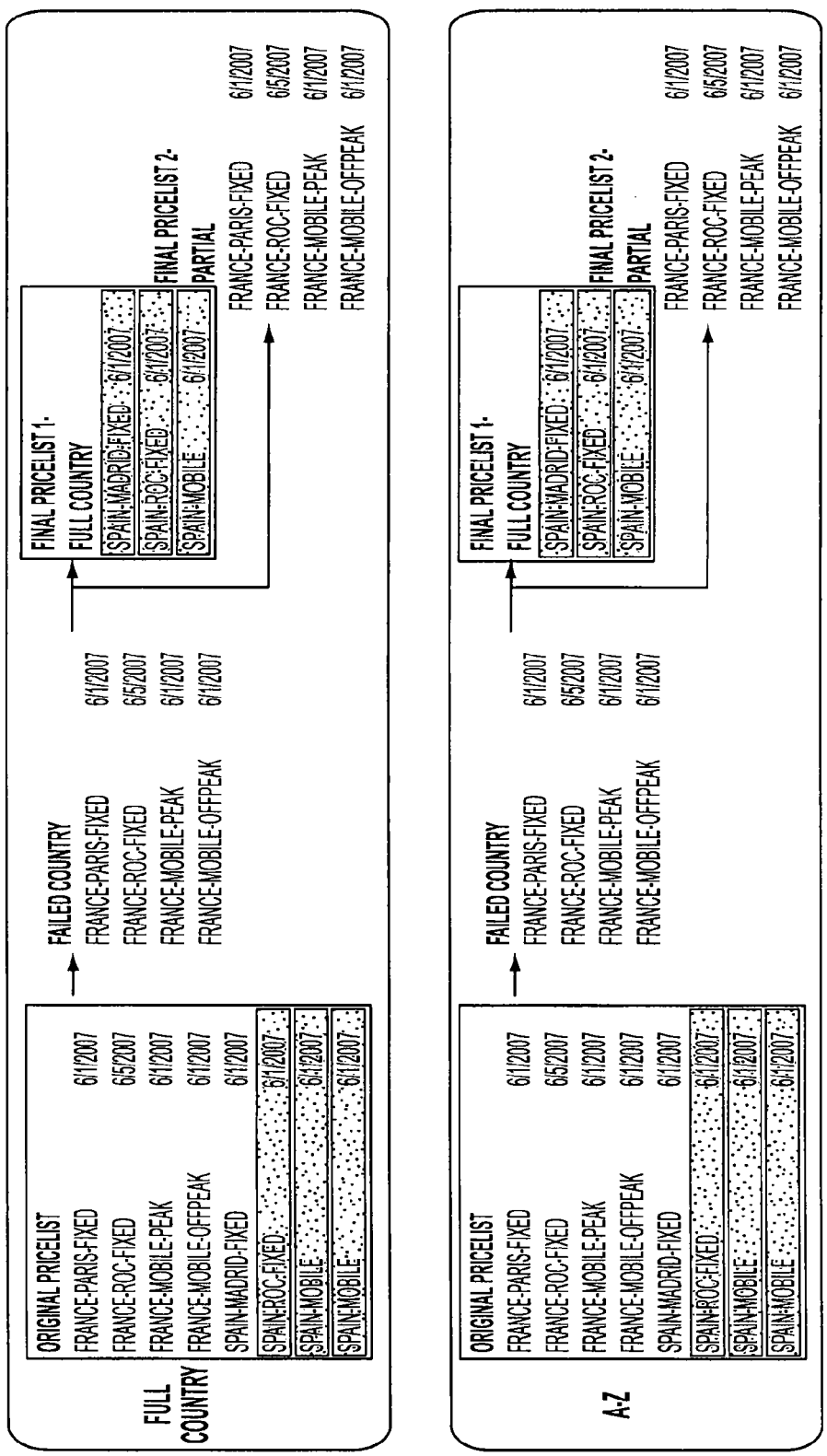

This treatment applies only to PL 4030—Multiple Dates within Country for Full Country and A to Z. It applies to Full Country and A to Z Price List. The business document is split into Full Country and Partial. An example of this treatment is shown in FIG. 10C.

g) Alert Only

For this treatment, the system runs the validation and provides alerts without making changes to the business document. The sending and receiving members receive notifications of the condition as per configured email notifications.

2. Business Rules—Descriptions

A description for the business rules conditions, the associated treatment options for each condition and an example illustrating each condition in this embodiment follow.

a) PL1010—Duplicate Destination

Description: The business document has two items with the same destination, same effective dates and different rates.

Figures 11S, 11T:
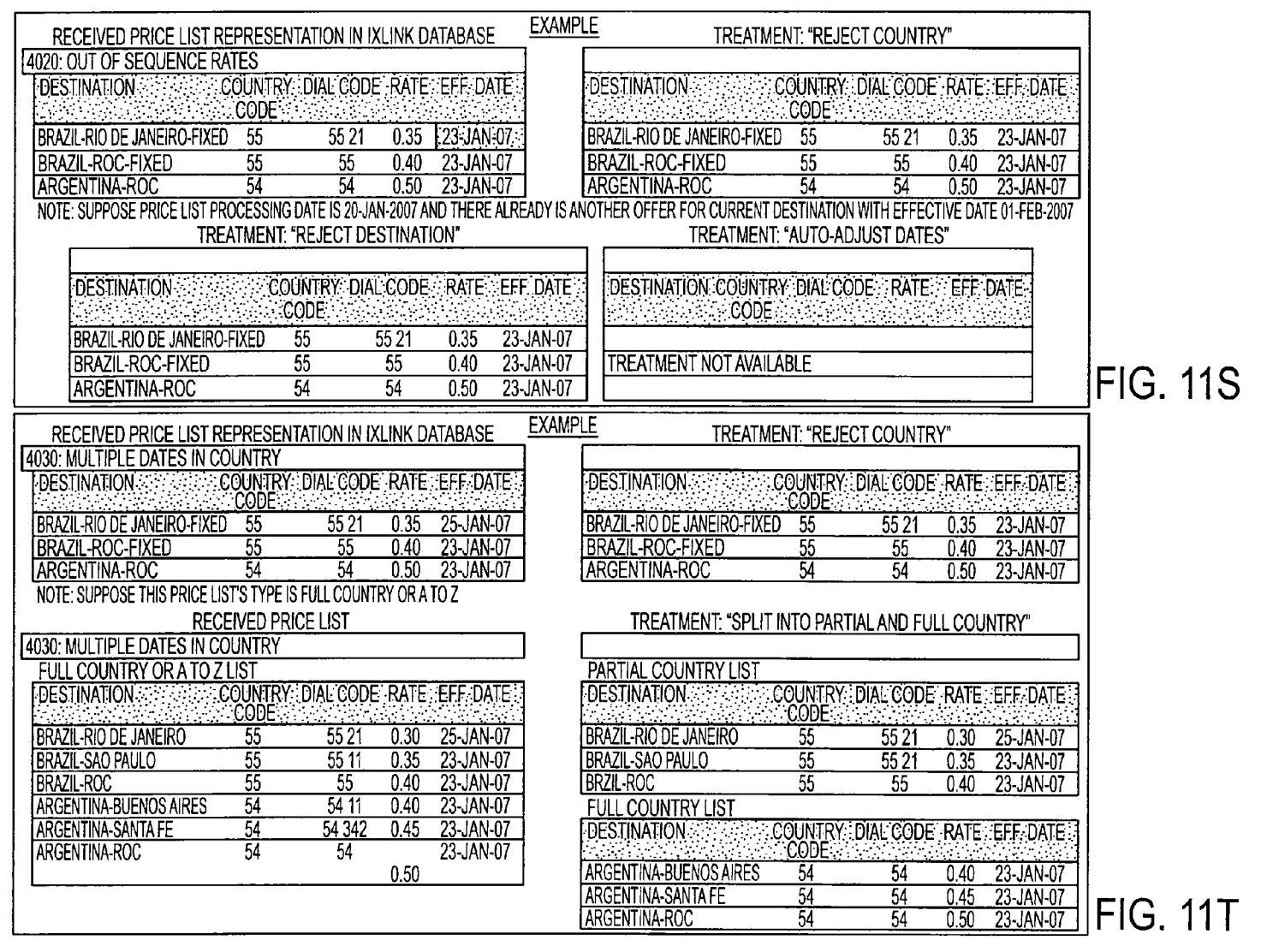

Treatment Options: Ignore, Reject price list, Reject Destination, Reject Country, Alert Only The business rule is illustrated by the example in FIG. 11A.

b) PL 1020—Multiple Country Codes for Destination

Description: In the case where dial codes cross into more than one country code, for example Vatican City. The system expects the destination to be broken into two unique names, one for each country code.

Treatment Options: Ignore, Reject Price List, Reject Destination, Reject Country, Alert Only The business rule is illustrated by the example in FIG. 11B.

c) PL1030—New Destination with no Associated Dial Codes

Description: A new destination defined by the sending member has no dialed digits specified.

Treatment Options: Reject Price List, Reject Destination

The business rule is illustrated by the example in FIG. 11C.

d) PL1040—Destinations with no Rates or Dial Codes

Description: A destination has no associated rates and no associated dial codes.

Treatment Options: Ignore, Reject Price List, Reject Destination, Alert Only

The business rule is illustrated by the example in FIG. 11D.

e) PL1050—Destination with Rates but no Dial Codes

Description: A destination has associated rates, but no dial codes.

Treatment Options: Ignore, Reject price list, Reject Destination, Alert Only

The business rule is illustrated by the example in FIG. 11E.

f) PL1060—Destinations with Dial Codes but no Rates

Description: A destination has associated rates, but no dial codes.

Treatment Options: Ignore, Reject Price List, Reject Destination, Alert Only

The business rule is illustrated by the example in FIG. 11F.

g) PL2010—Duplicate Rate Type

Description: The same Rate Type appears more than once with different rates for each Price List item.

Treatment Options: Reject Price List, Reject Destination, Reject Country

The business rule is illustrated by the example in FIG. 11G.

h) PL2020—Rate Increase Notice Violation.

Description: Effective date of Rate Increase for an item in the business document violates the notice period as defined by a parameter—Rate Increase Notice Period (Days) configuration variable, the current date relative to the member's Time Zone Shift is the baseline.

Treatment Options: Ignore, Reject Price List, Reject Destination, Reject Country, Auto Adjust Dates, Alert Only The business rule is illustrated by the example in FIG. 11H.

i) PL2031—Rate Increase

Description: Rate increase of an item in the business document exceeds the limit as defined by the parameter—Rate Increase Percentage (%) configuration variable.

Treatment Options: Ignore, Alert Only

The business rule is illustrated by the example in FIG. 11I.

j) PL2032—Rate Decrease

Description: Rate decrease of an item in the Price List exceeds the limit as defined by the parameter—Rate Decrease Percentage (%) configuration variable.

Treatment Options: Ignore, Alert Only

The business rule is illustrated by the example in FIG. 11J.

k) PL3010—Non Numeric Dial Code

Description: Dialed digits and dialed digits range for each item in the business document must be numeric.

Treatment Options: Reject Price List, Reject Destination, Reject Country

The business rule is illustrated by the example in FIG. 11K.

l) PL3020—Dial Code Length Greater than Allowed Limit

Description: The maximum length of a Dialed Digit has exceeded the limit as defined by the parameter—Dial Code Length (Characters) configuration variable.

Treatment Options: Ignore, Reject Price List, Reject Destination, Reject Country, Alert Only The business rule is illustrated by the example in FIG. 11L.

m) PL3030—Invalid Dial Code Range

Description: Dialed Digit range is not valid. For example, 5521235-552124 is invalid but 552123-5521245 is valid.

Treatment Options: Reject price list, Reject Destination, Reject Country

The business rule is illustrated by the example in FIG. 11M.

n) PL3040—Duplicate Dial Code

Description: The same Dial Code appears more than once for distinct destinations for an effective date in the business document.

Treatment Options: Reject Price List, Reject Destination, Reject Country

The business rule is illustrated by the example in FIG. 11N.

o) PL3050—Overlap in Dial Code Range

Description: Two destinations in the business document have overlapping dial digit range. For example, destination 1 has dial codes 552-554 and destination 2 has dial codes 553-555.

Treatment Options: Reject price list, Reject Destination, Reject Country

The business rule is illustrated by the example in FIG. 11O.

p) PL3060—Dial Code Changes Notice Violation

Description: The effective date of an item in the business document does not meet the requirements for the advance notice period defined by the parameter—Dial Code Change Notice Period configuration variable for new destinations or for dial code changes.

Treatment Options: Reject price list, Reject Destination, Reject Country

The business rule is illustrated by the example in FIG. 11P.

q) PL4011—Effective Date Older Than Allowed Limit

Description: The effective date of an item in the business document is in the past and older than the limit as defined by the parameter—Past Effective Date Notice Period configuration variable. The current date relative to the member's Time Zone Shift is the baseline.

Treatment Options: Ignore, Reject Price List, Reject Destination, Reject Country, Alert Only The business rule is illustrated by the example in FIG. 11Q.

r) PL4012—Effective Date Greater Than Allowed Limit

Description: The effective date of an item is in the future and is greater than older than the limit as defined by the parameter—Future Effective Date Notice Period (Days) configuration variable. The current date relative to the member's Time Zone Shift is the baseline.

Treatment Options: Ignore, Reject price list, Reject Destination, Reject Country, Alert Only The business rule is illustrated by the example in FIG. 11R.

s) PL4020—Out of Sequence Rates

Description: The effective date of the rate offered for each destination is earlier than the effective date previously provided for the same destination. For example: the sending member provides a rate for December 15th, and later sends another rate for the same destination with December 10th effective date.

Treatment Options: Ignore, Reject price list, Reject Destination, Reject Country, Alert Only The business rule is illustrated by the example in FIG. 11S.

t) PL4030—Multiple Dates in Country

Description: The business document has line items with different effective dates for destinations within a country. A single date may be needed in order to retire destinations not in the business document. Only applicable to a Full Country or A to Z business documents.

Treatment Options: Ignore, Reject price list, Reject Country, Split into Partial & Full Country, Alert Only The business rule is illustrated by the example in FIG. 11T.

u) PL5010—Band Overlap

Description: There is an overlap in the time band definitions of the rating calendars provided in the business document. For example, Peak goes from 08:00 to 18:00, while Off-Peak goes from 00:00: to 08:00 and from 18:00 to 23:59—overlaps occur at 08:00 and at 18:00.

Treatment Options: Ignore, Reject price list, Reject Destination, Reject Country, Alert Only The business rule is illustrated by the example in FIG. 11U.

v) PL5020—Country Code Not Resolved

Description: The Country Code provided in the business document can not resolved based on the receiving member's set of Country Codes.

Treatment Options: Reject price list, Reject Destination

Figures 11U, 11V:
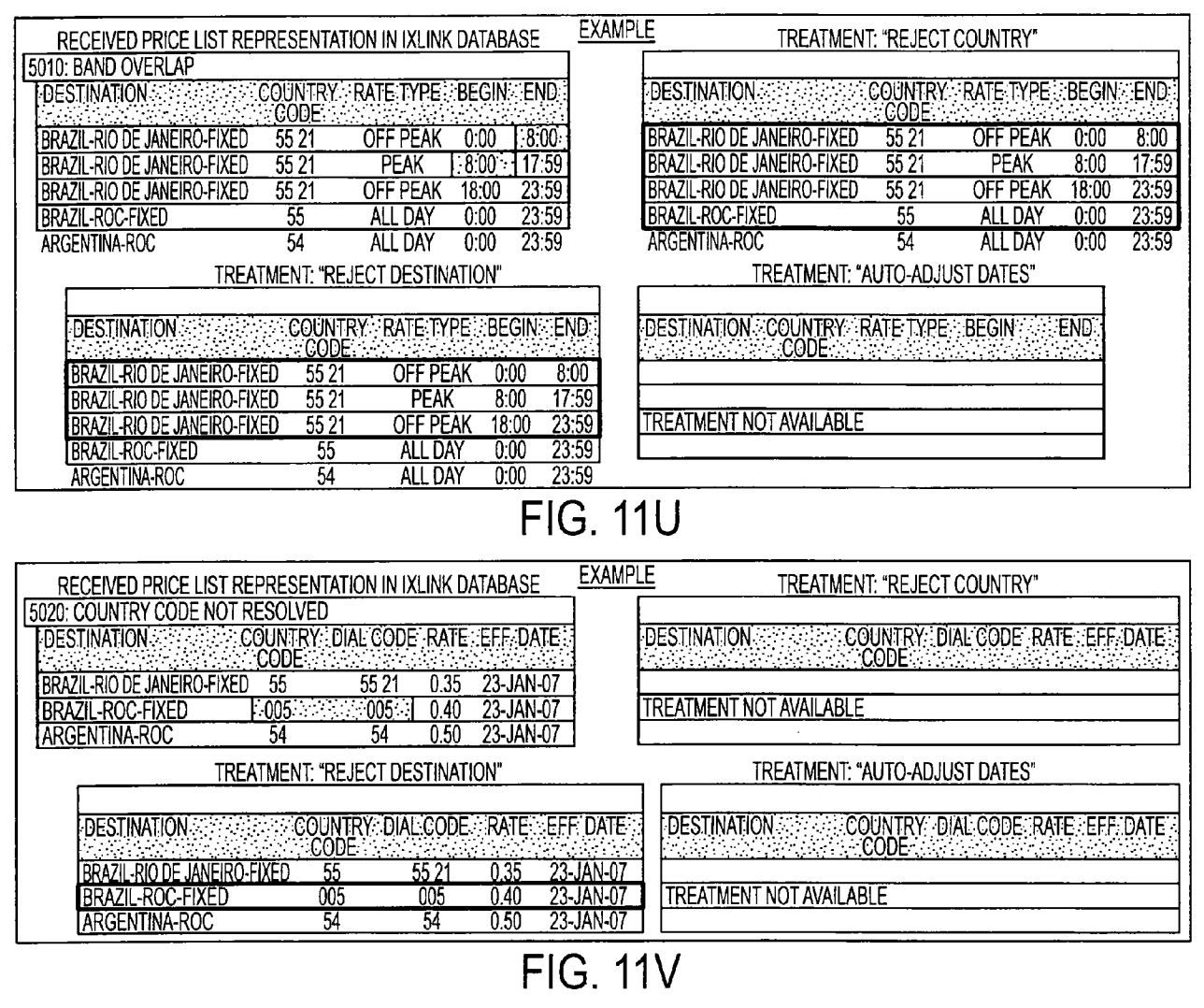

The business rule is illustrated by the example in FIG. 11V.

w) PL6010—Time Band Mismatch

Description: The time band for destination(s) in the business document do not match the Time Bands entered by the sending member in the system for that (those) destination(s).

Treatment Options: Ignore Rule, Reject Price List, Reject Destination, Reject Country and Alert Only.

3. Business Rules—Configurable Variables

Several configurable variables may be configured for business rule conditions in this embodiment. Each variable may be associated with a certain business rule condition. The configuration variables may be set both at the member, or general default configuration, level and at the link, or specific transaction, level using a member level default override. FIG. 12 shows some examples of configurable variables at the Member level. A description for some of these variables is as follows.

a) Past Effective Date Notice Period (Days)

This configuration variable sets the acceptable limit for business documents with an effective date in the past.

b) Future Effective Date Notice Period (Days)

This configuration variable sets the acceptable limit for business documents with an effective date in the future.

c) Dial Code Change Notice Period (Days)

This configuration variable sets the advance Notice Period that has to be observed by the sending member for Dial Code changes. It means that any addition, removal, or reassignment of Dial Codes to a new destination must have an effective date equal or greater than the current date (i.e. processing date of the transaction by the system) plus this Notice Period. This configuration variable is used in the business rule PL3060, Dial Code Changes Notice Violation.

d) Rate Increase Notice Period (Days)

This configuration variable sets the advance Notice Period that has to be observed by the sending member prior to a rate increase for any destination quoted in a given business document. The industry norm is a 7 day advanced notice for rate increase; however this advance notice might be negotiated differently between the sending member and the receiving member on a case by case basis and specified accordingly in the interconnection agreement. This configuration variable is used in the business rule PL2020, Rate Increase Notice Violation.

e) Dial Code Length (Characters)

This configuration variable sets the maximum Dial Code length accepted for any given destination, and allows for numeric as well as alpha characters. This configuration variable is used in the business rule PL3020, Dial Code Length Greater than Allowed Limit.

f) Rate Increase Percentage (%)

This configuration variable sets a threshold for rate increases, measured in percentage, by comparing the current rate with the last rate sent through the system for that destination by the sending member. If the threshold is exceeded an alert could be generated. This configuration variable is used in the business rule 2031, Rate Increase.

g) Rate Decrease Percentage (%)

This configuration variable sets a threshold for rate decreases, measured in percentage, by comparing the current rate with the last rate sent through the system for that destination by the sending member. If the threshold is exceeded an alert could be generated. This configuration variable is used in the business rule 2032, Rate Decrease.

Returning to the components of database layer 320, splitting & cloning engine 630 may clone and split documents based on a configurable engine. Cloning may occur when the receiving member indicates that more than one copy of the business document should be generated by the system and delivered to different systems or delivery points at the receiving end over a single link. Splitting may occur when due to various conditions the original business document is split into multiple parts and sent to the receiver. For example, if the original document contains a part with prices in one currency and other parts with prices in a second currency, then the system may split the business document into two separate business documents each containing a single currency.

Update repository 640 may update a data repository associated with every link with the pertinent data from each business document. This capability allows comparing the data in the current business document to the previously received business document on any given link and to detect business conditions such as rate increases.

Figure 7:
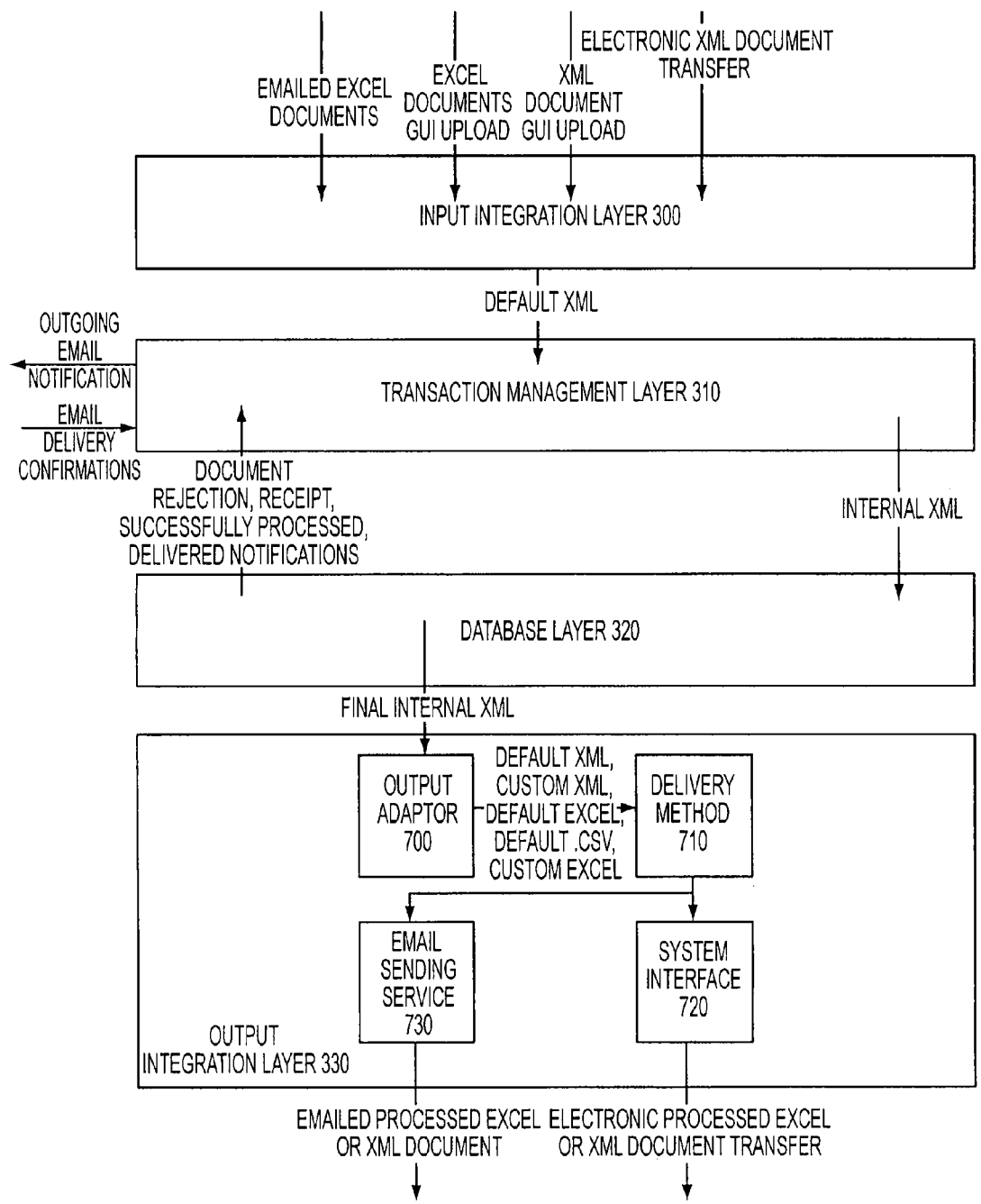
FIG. 7 is a block diagram of an example of an output integration layer of a document exchange platform.

FIG. 7 shows several components of output integration layer 330. For example, output adaptor 700 may receive the final internal XML documents from database layer 320 and convert it into various output formats such as default XML, custom XML, default Excel, default .CSV, and custom Excel, for example. Delivery method 710 may determine the delivery method associated with receiving end of each link, such as email delivery or File Transfer Protocol for example. Email sending service 730 may send out email notifications received from delivery method 710, and may employ email protocols like SMTP for example. System interface 720 may allow electronic transfer of business documents to the receiving member by supporting common industry protocols such as Web Services, HTTP, and alike for example.

Figure 8:
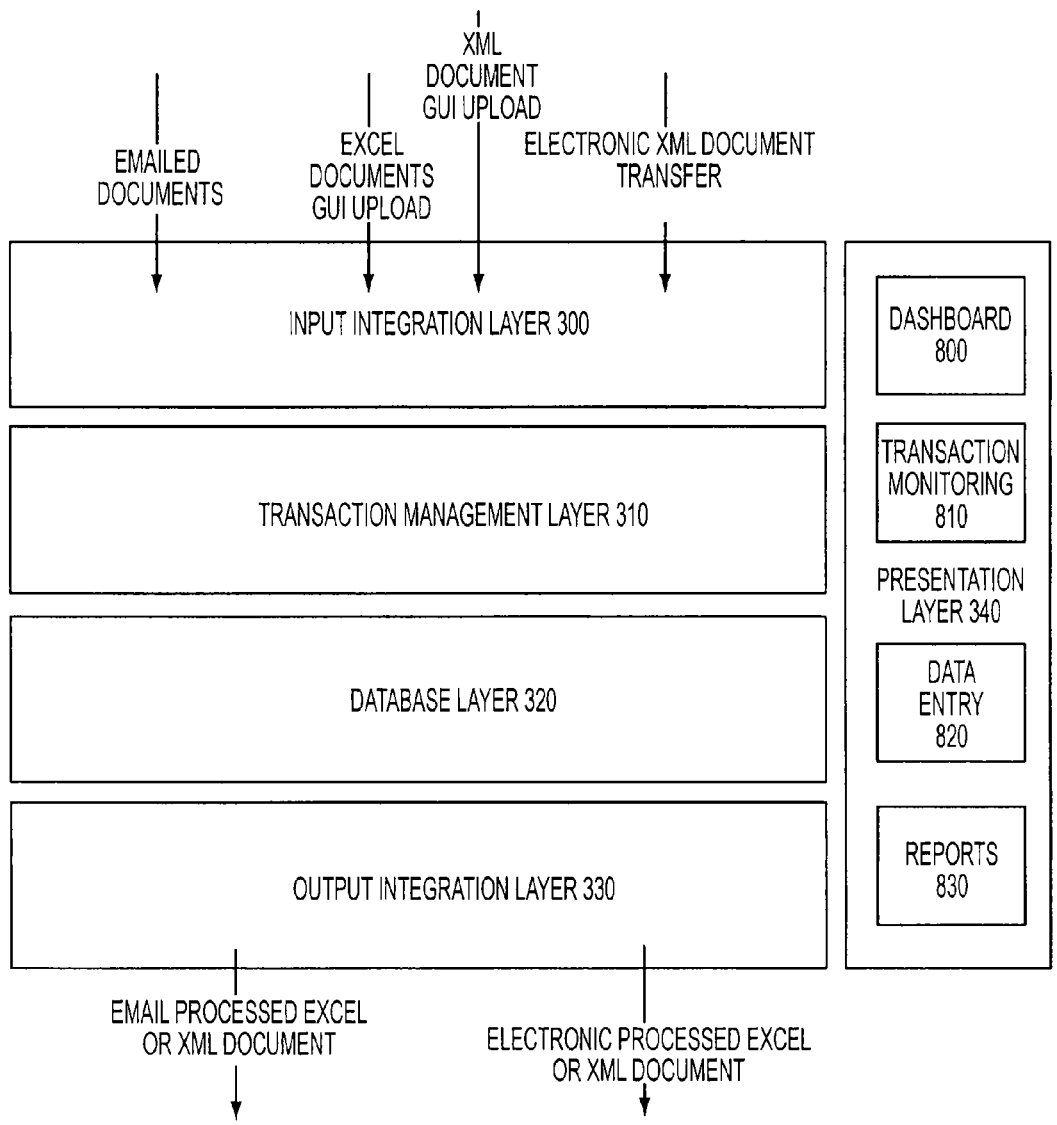
FIG. 8 is a block diagram of an example of a presentation layer of a document exchange platform.

FIG. 8 shows several components of presentation layer 340. This layer includes a web portal accessible to members only via the internet, for example. Members have access to their transactions only via dashboard 800. A transaction may be generated whenever a member sends a business document to another member via the system. Transaction monitoring 810 allows all the transactions and the operations performed by the system to be logged and tracked and monitored by the authorized members. Data entry 820 allows members to enter reference data, set up their business rules and configure email notifications via the web portal. Reports 830 allows members to generate reports related to their transactions and obtain relevant statistics. All member activities on the web portal may also be logged and accessible through an audit trail. Examples of UI pages pertaining to these components follow.

1. Dashboard Page

Figure 13:
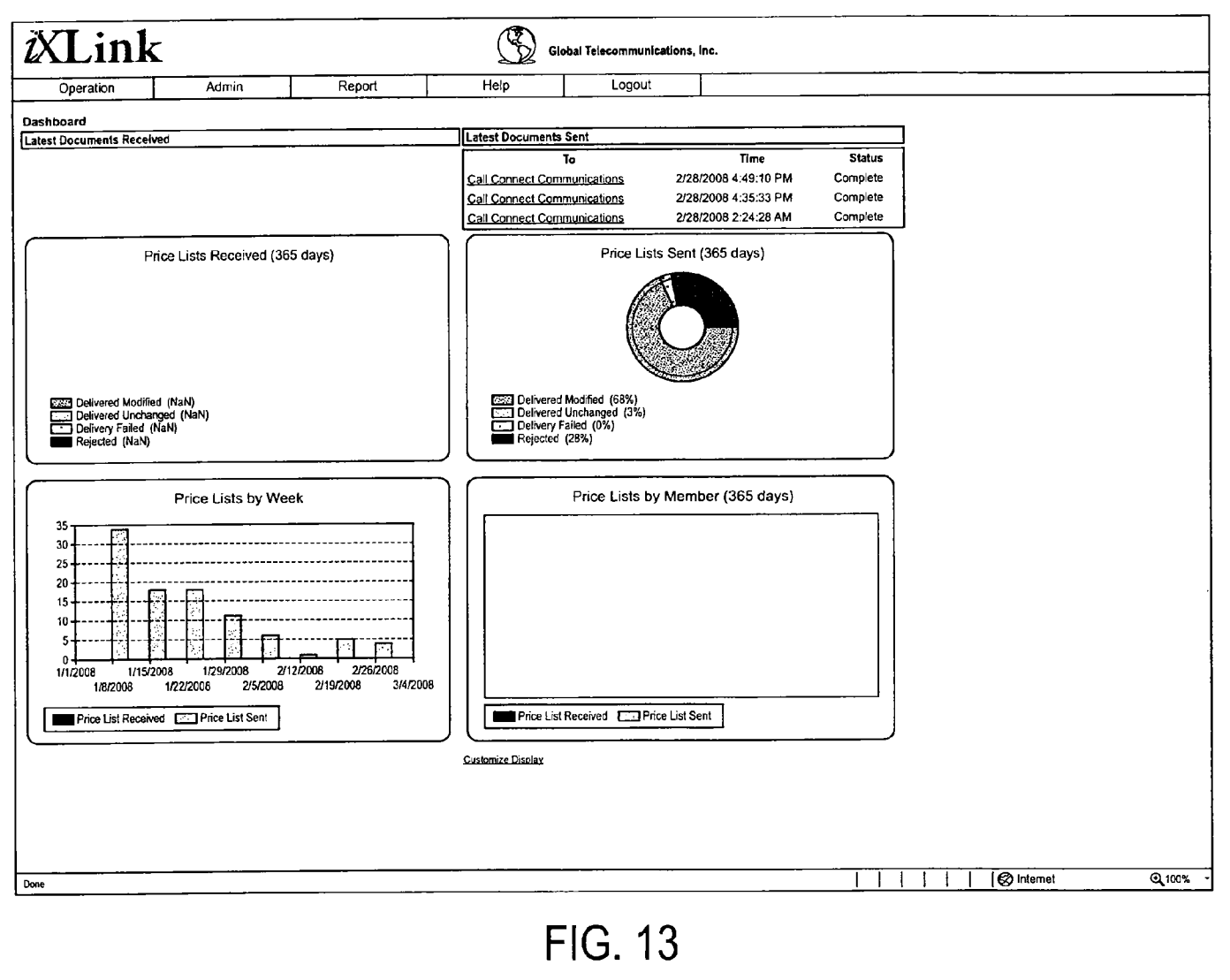

Dashboard 800 may provide information on latest business documents sent and received; business documents sent and received in the last 365 days with a breakdown on documents modified, documents unchanged, delivery failed and documents rejected; business documents received by week and business documents sent by member. An example of a member specific dashboard page is shown in FIG. 13.

2. Transaction Monitoring Pages

All the transactions and the operations performed by the system may be logged and tracked and can be monitored by the authorized members. An example of a member specific transaction summary page may be shown in FIG. 14A. The top part of the screen provides filtering options for selecting the transactions to be viewed. The transactions can be filtered by date, document type, link activity, link code, document ID, transaction status (In Process; Rejected; Complete; Delivery Failed; Unexpected Error), modified by system (yes, no), and by member. The bottom part of the screen shows the actual transactions based on the selected filters. By clicking the icon at the end of the line, the system may send the authorized user an email with all the documents related to the transaction. By clicking on the icon at the beginning of the line, a pop-up window may open up with the detailed transactions page.

Figure 14B:
Figure 14C:
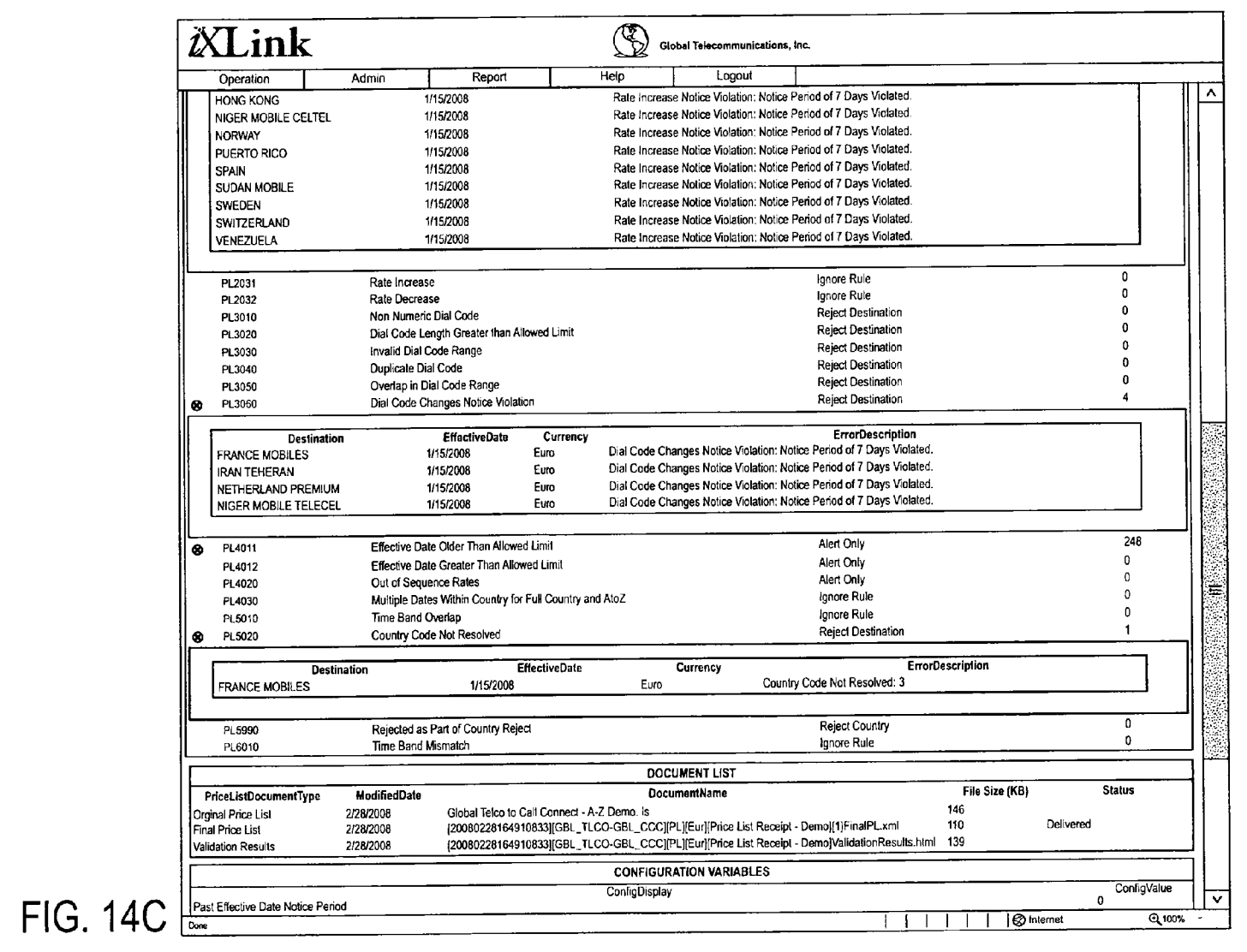
Figure 14D:
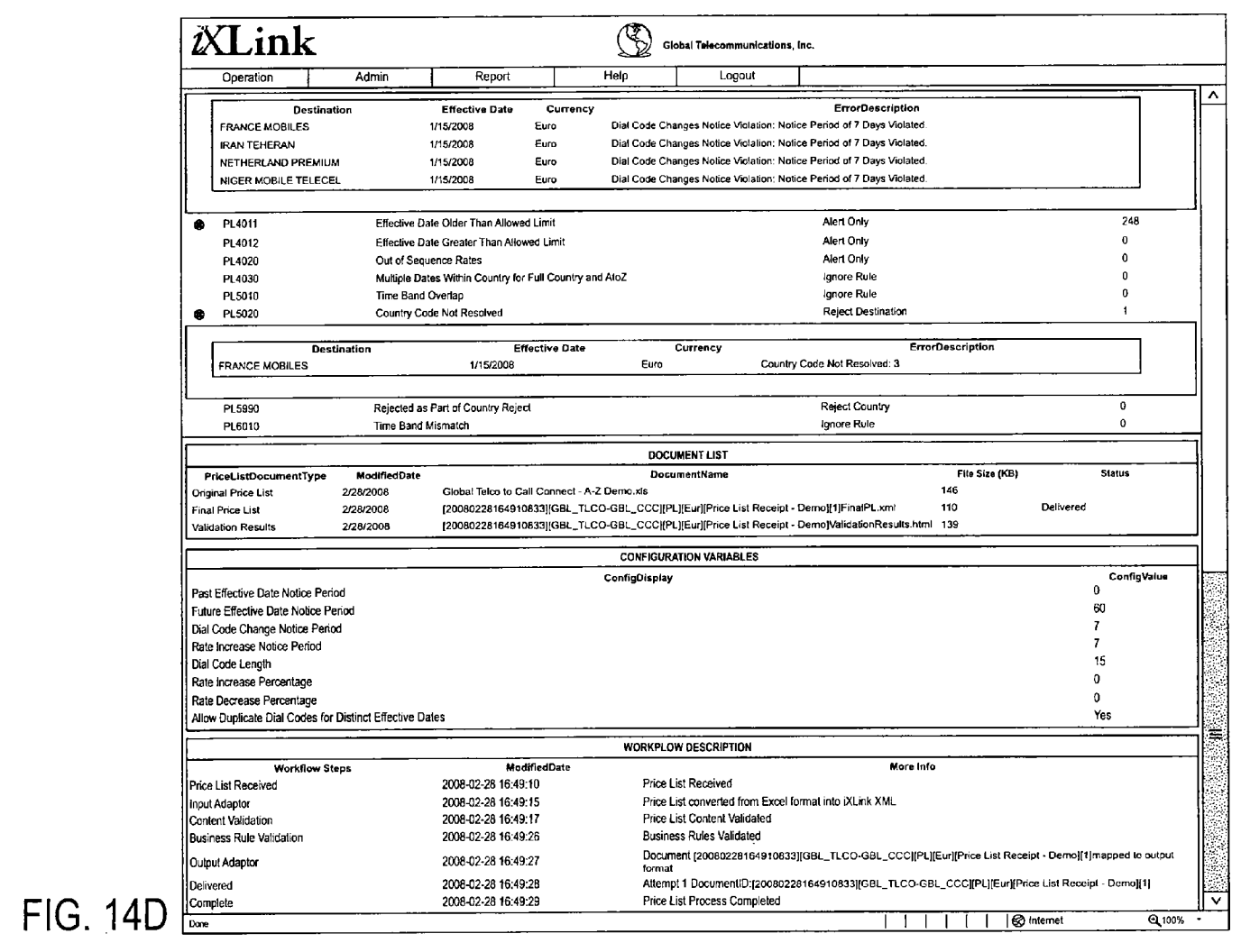

The detailed transaction page may also provide:
Processing Summary
Document Summary
Business rules in effect at the time of processing
List of relevant documents related to the transaction
Configurable variables in effect at the time of processing
Transaction workflow steps An example of a member specific transaction detail page is shown in FIGS. 14B-14D.

3. Data Entry Pages

Figure 15A:
FIGS. 15A-15AA are screenshots of examples of data entry pages within a document exchange platform.
Figure 15B:
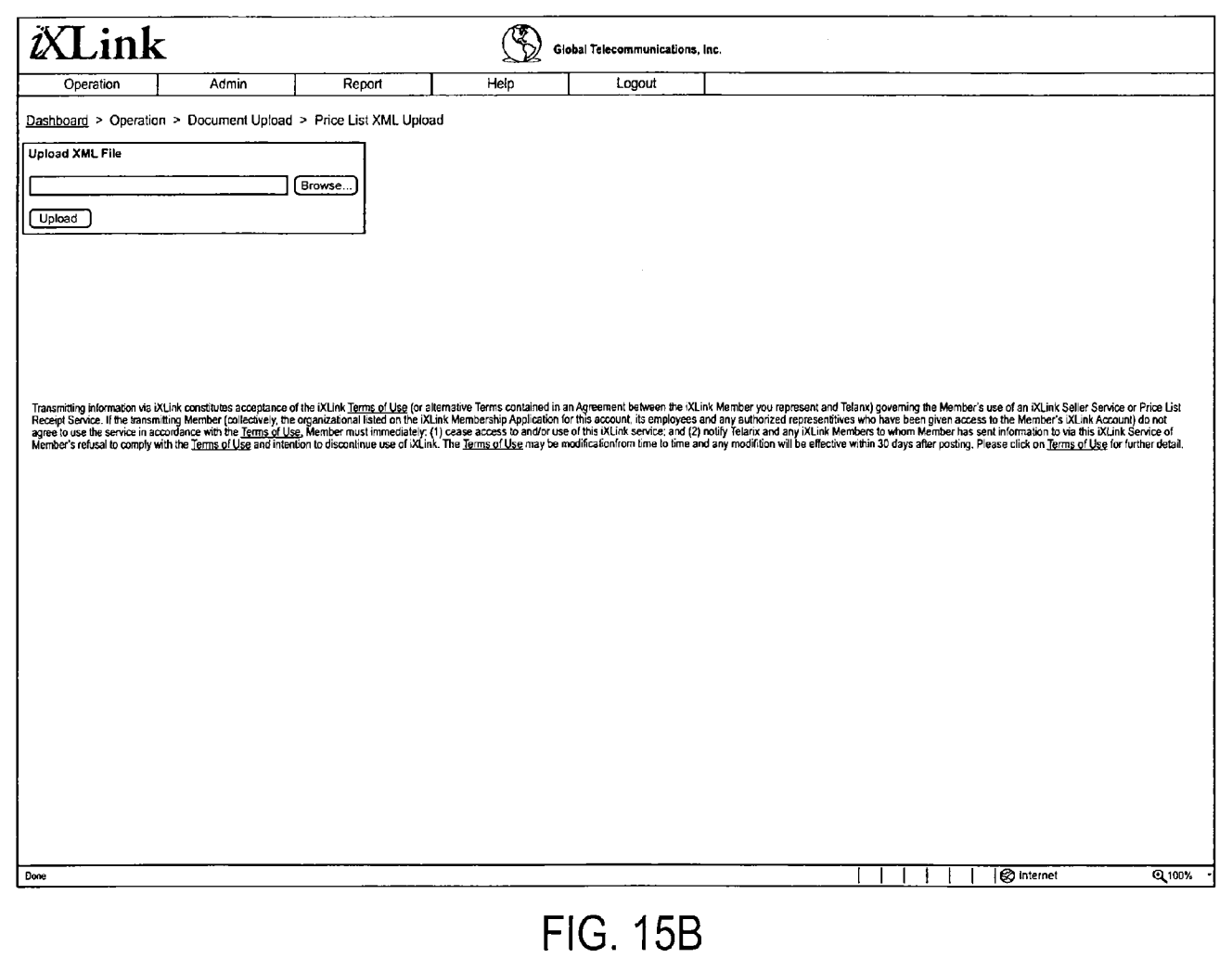
Figure 15C:
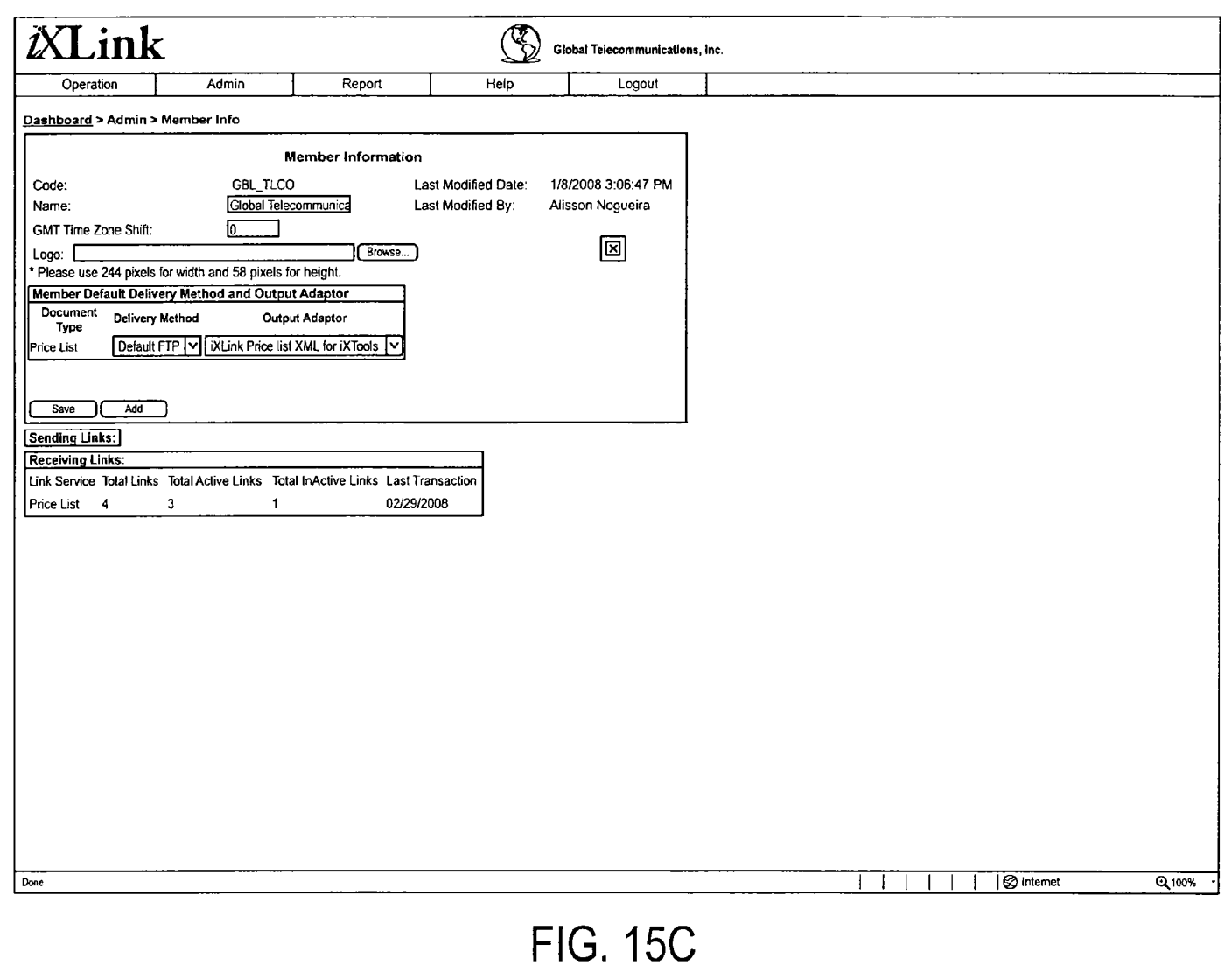

FIGS. 15A-15AA are screenshots of examples of data entry pages within a document exchange platform. An example of a Microsoft Excel portal upload page is shown in FIG. 15A. An example of a default XML portal upload page is shown in FIG. 15B. An example of a member information page is shown in FIG. 15C.

Figure 15D:
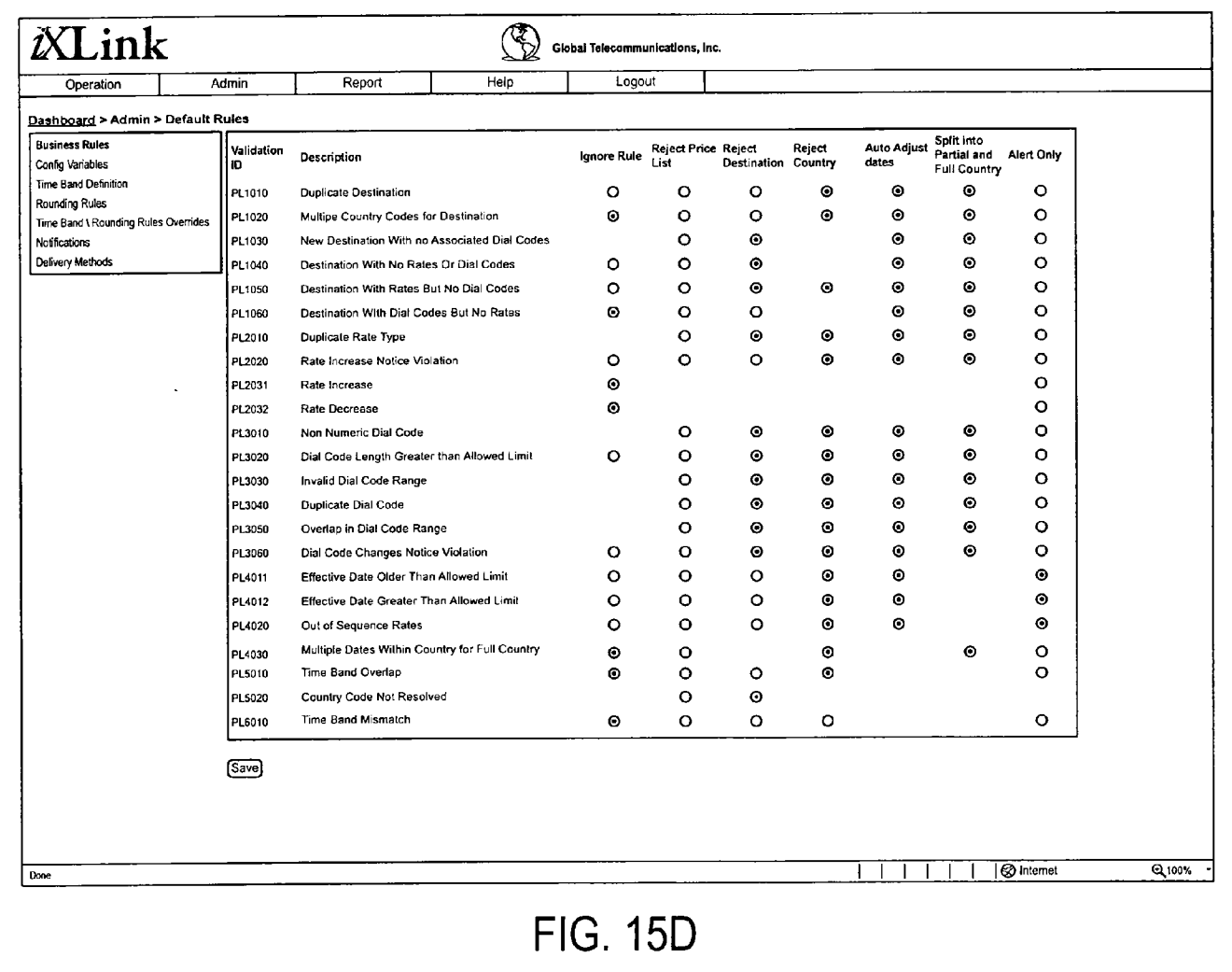
Figure 15E:
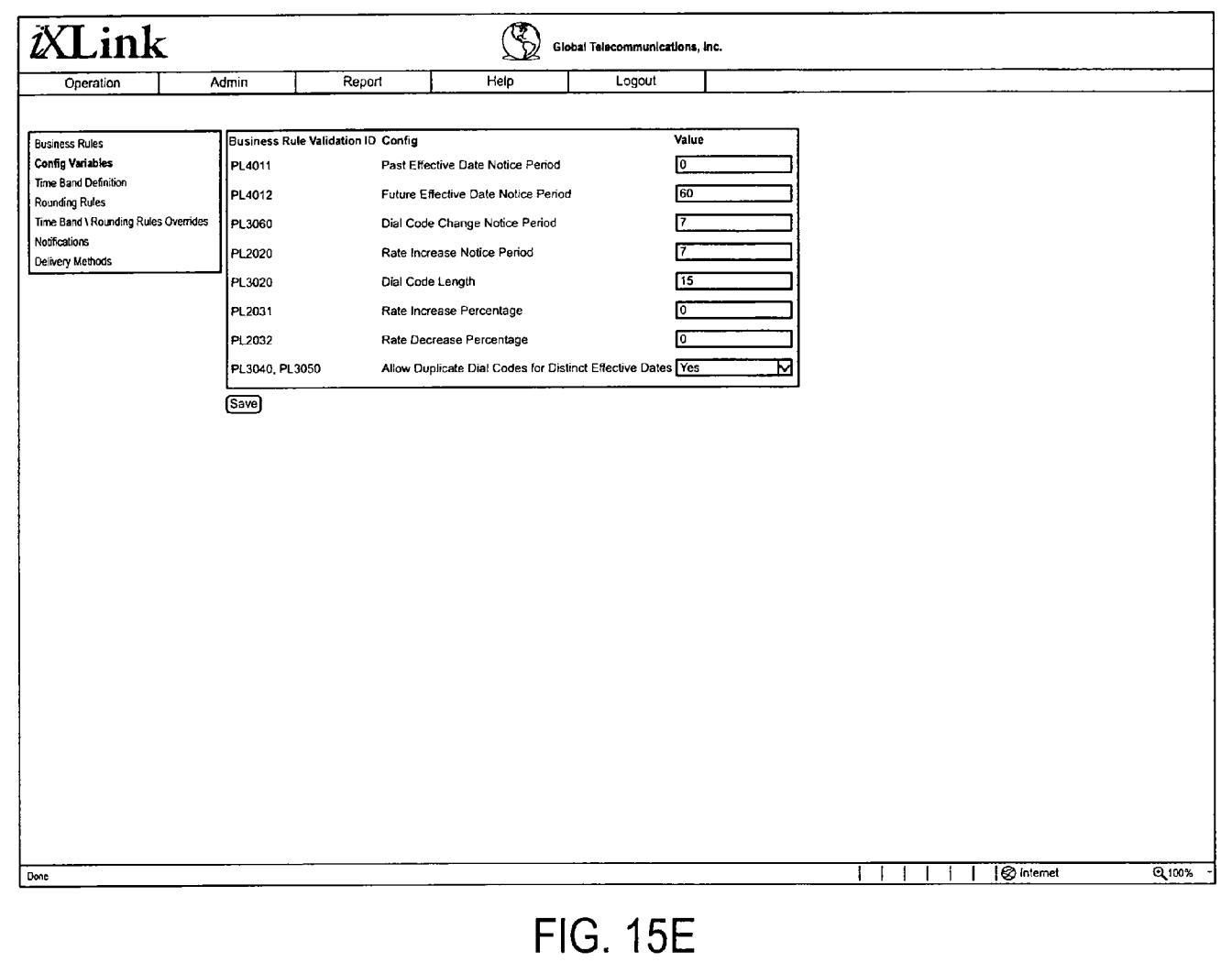
Figure 15F:
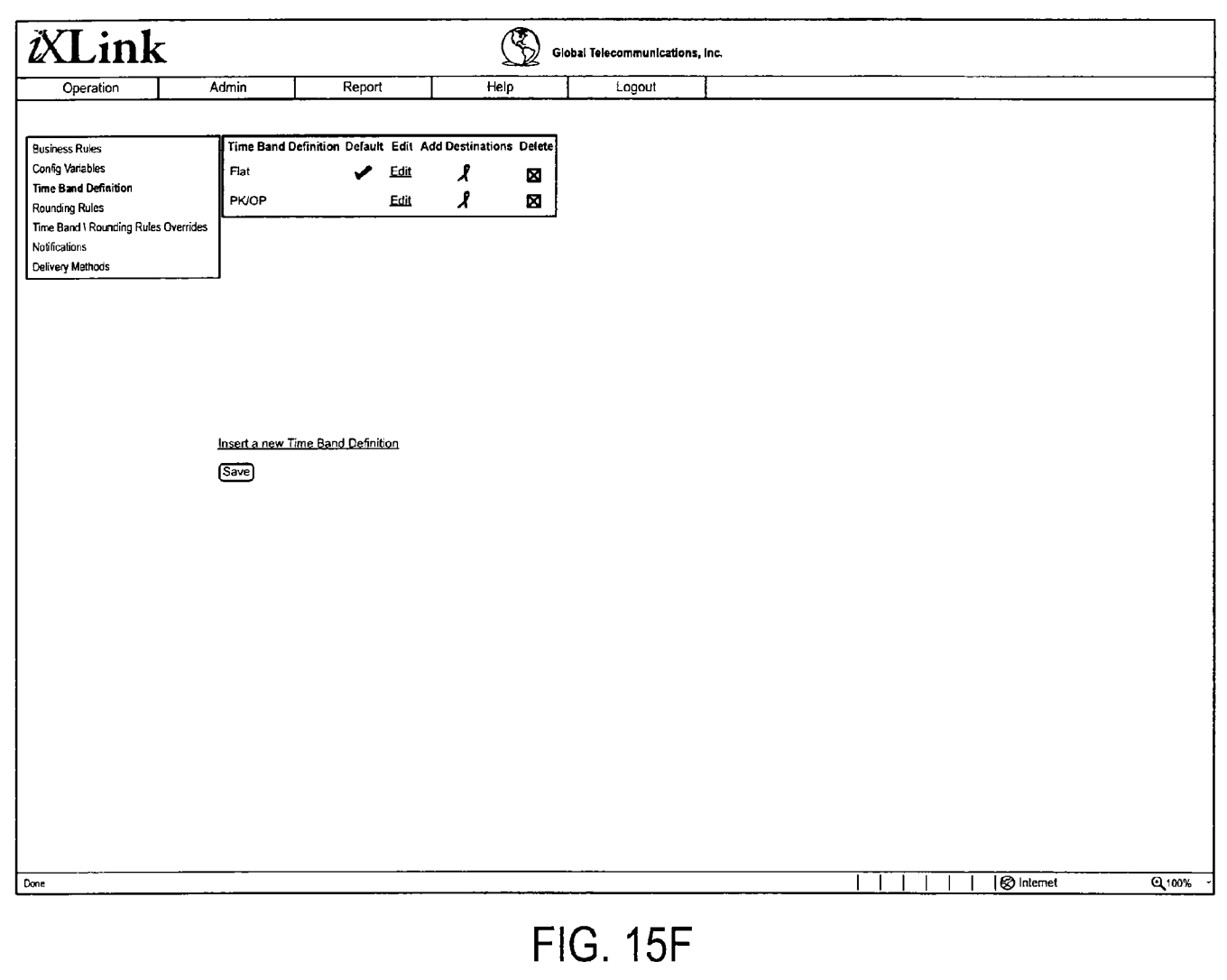
Figure 15G:
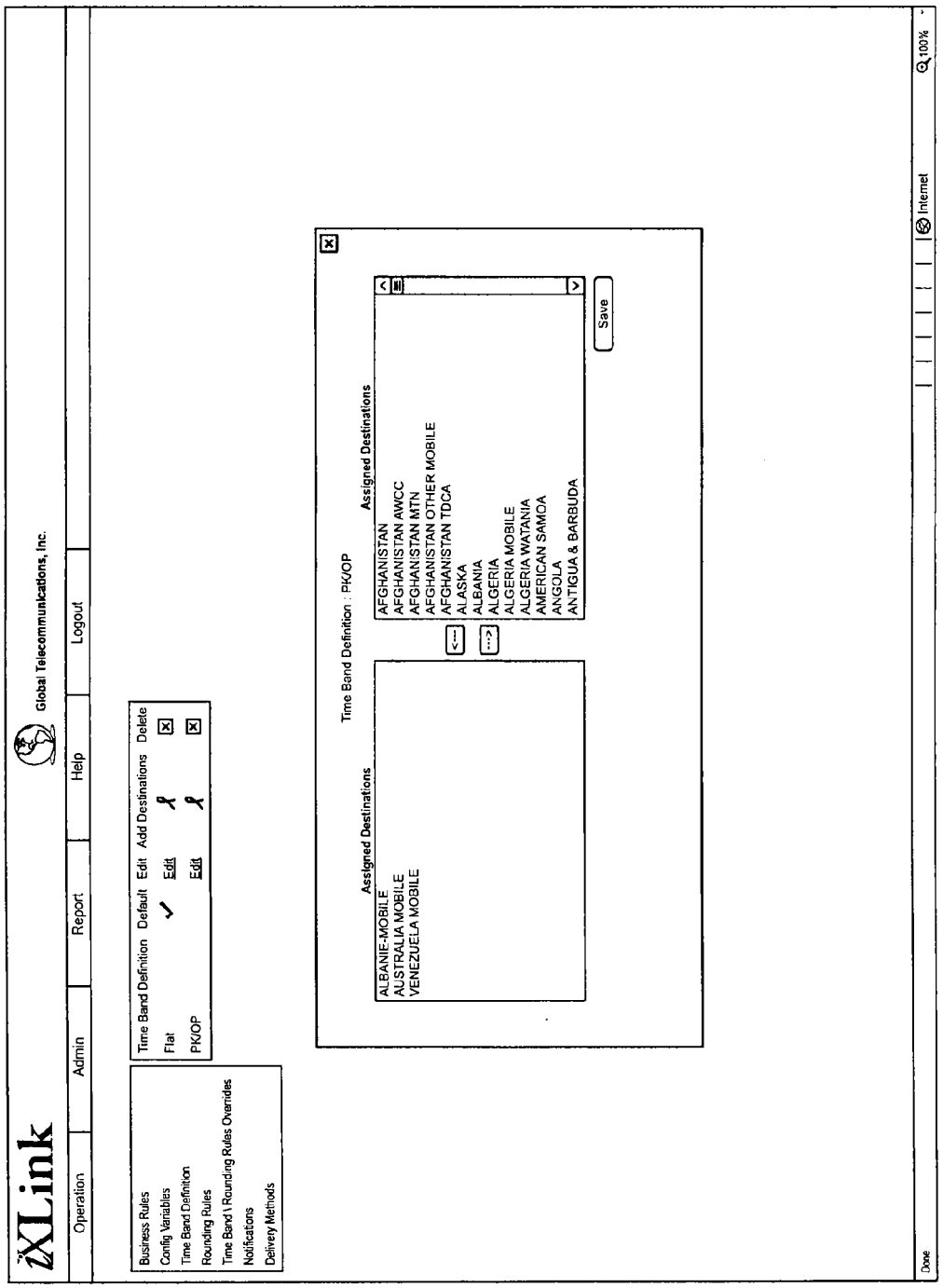
Figure 15H:
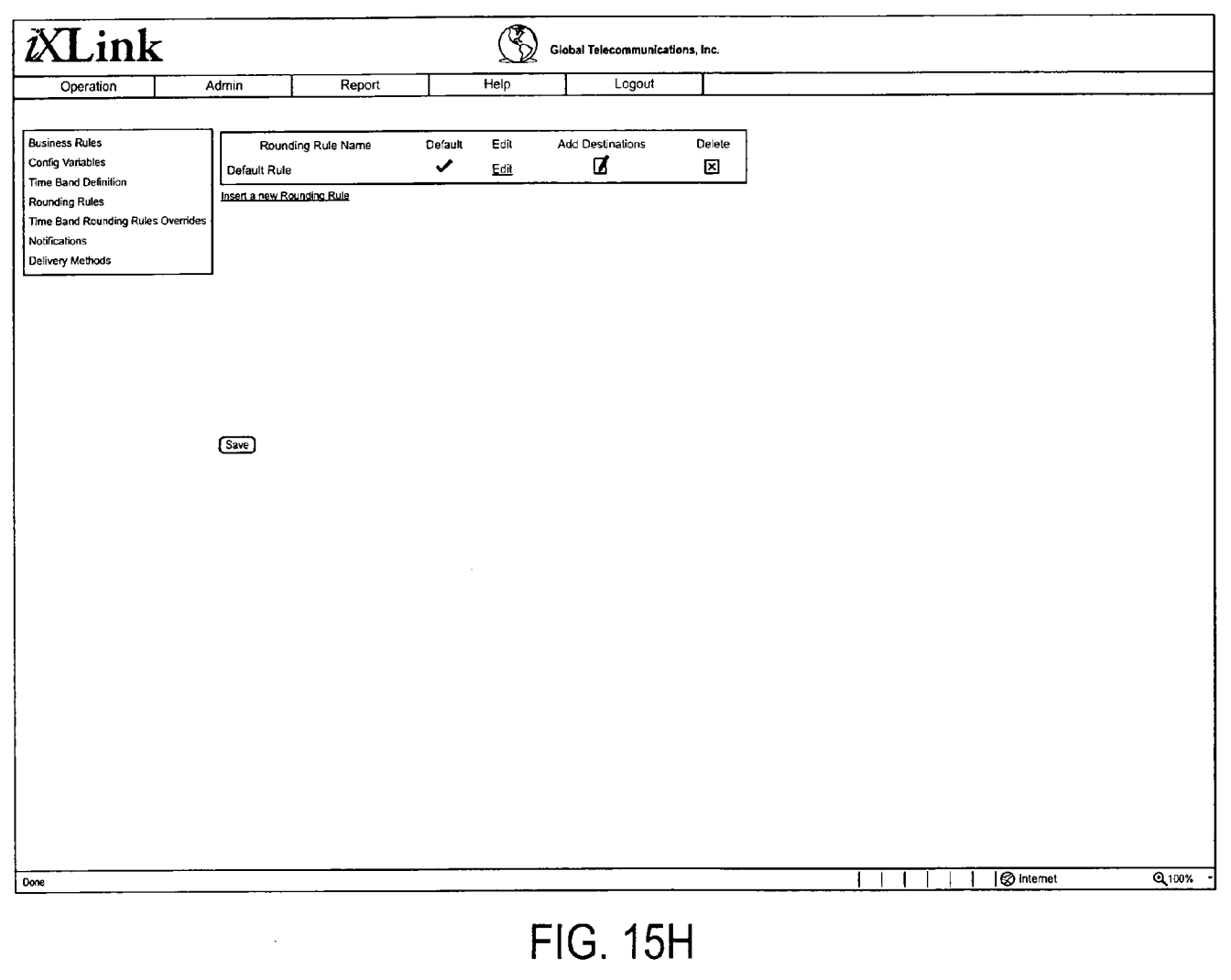
Figure 15I:
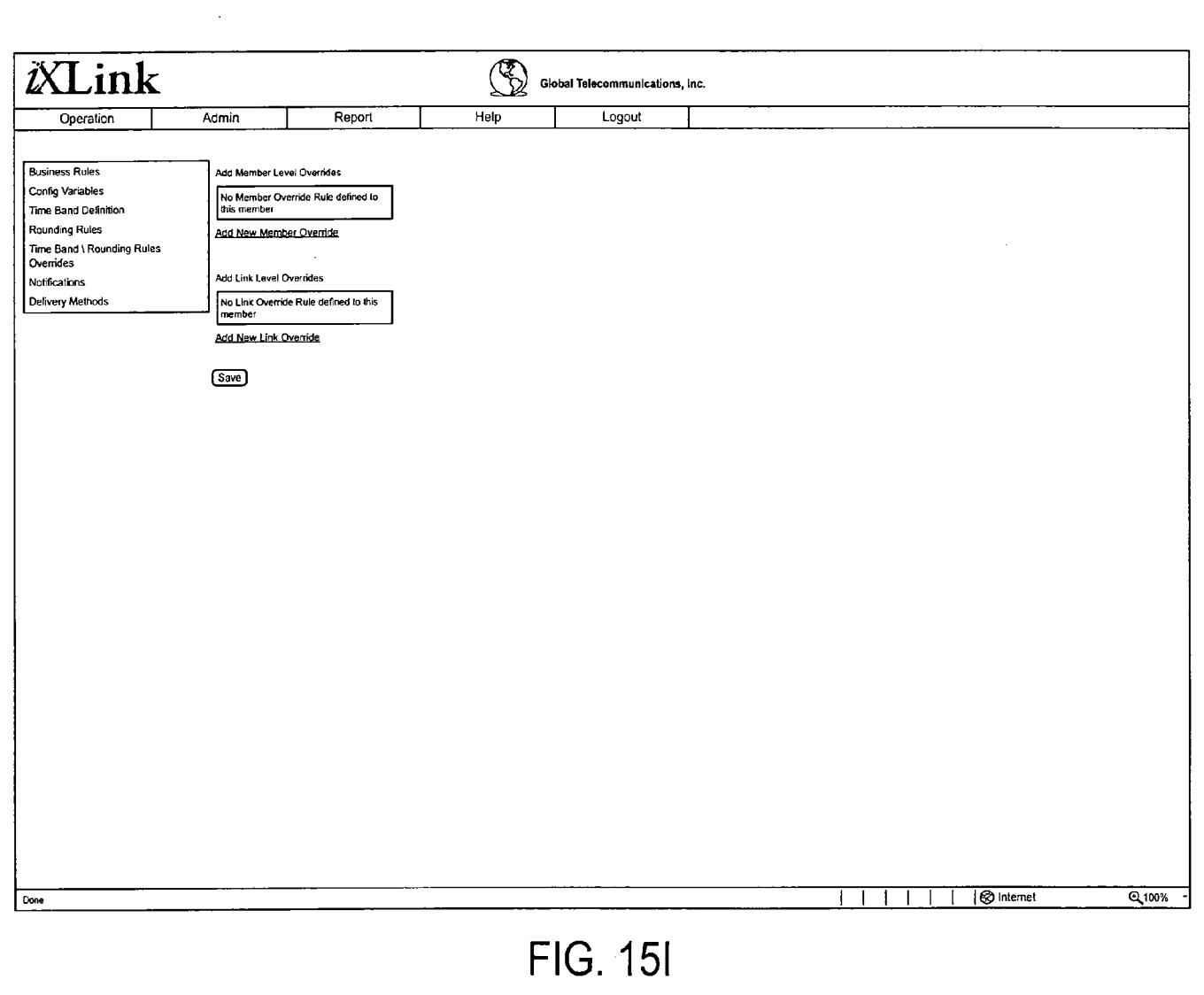
Figure 15K:
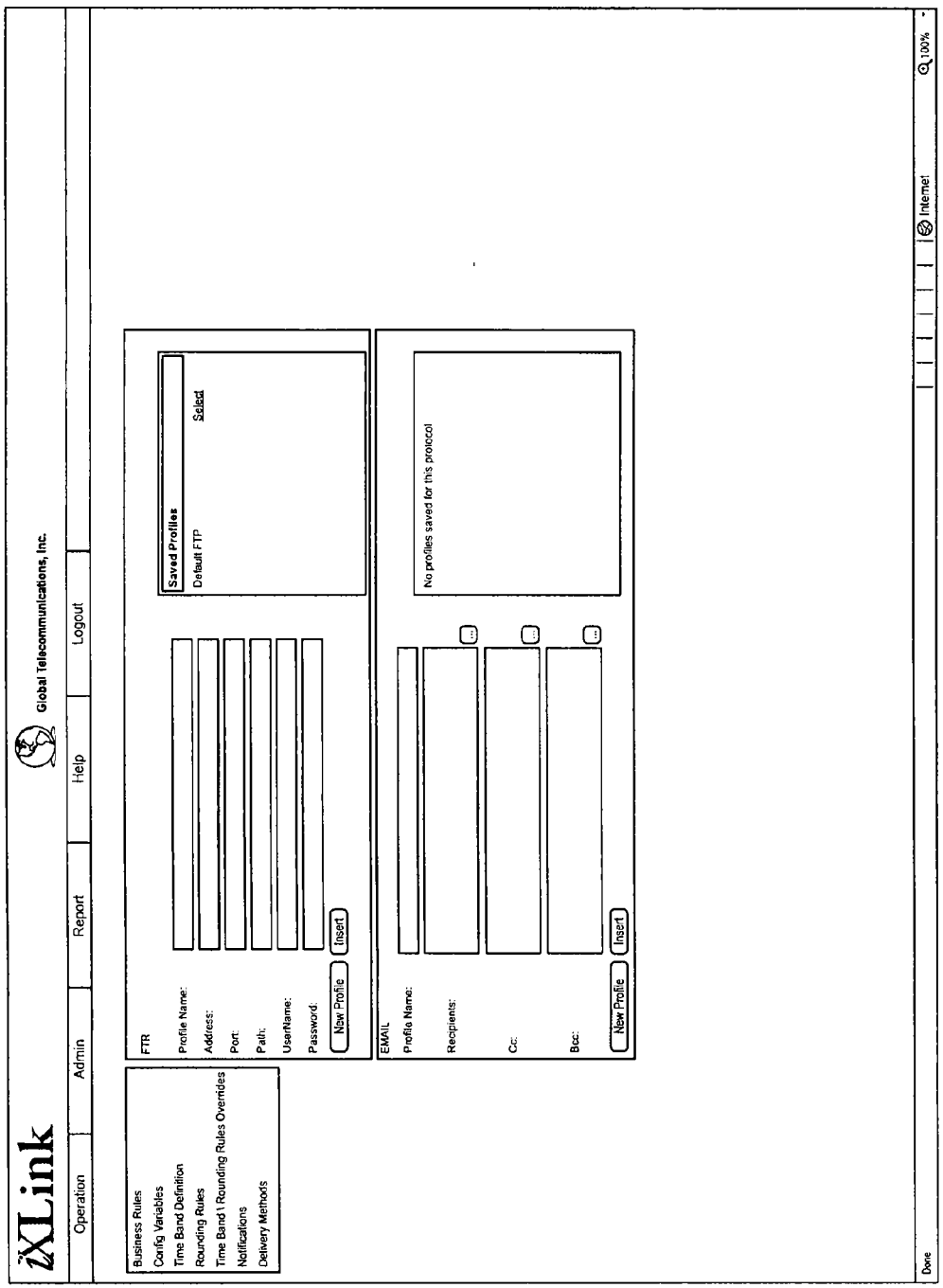
Figure 150:
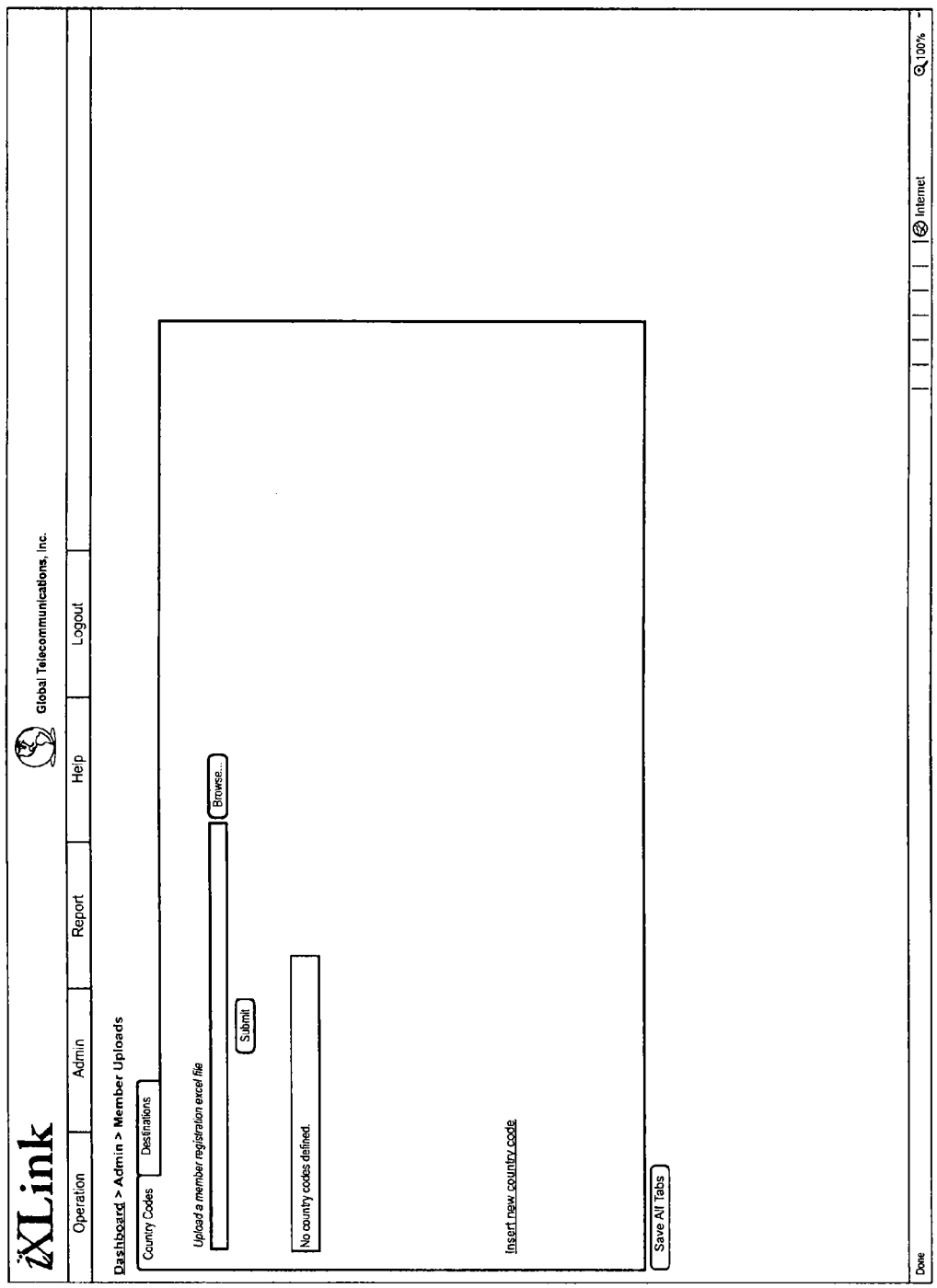

An example of a member specific default rules page is shown in FIG. 15D. An example of a member specific configuration variables page is shown in FIG. 15E. An example of a member specific time band definitions page is shown in FIG. 15F. An example of a destination assignment for time band definitions page is shown in FIG. 15G. An example of a rounding rules page is shown in FIG. 15H. An example of a time band/rounding rule link override page is shown in FIG. 15I. An example of an email notifications page is shown in FIG. 15J. An example of a delivery method page is shown in FIG. 15K.

Figure 15L:
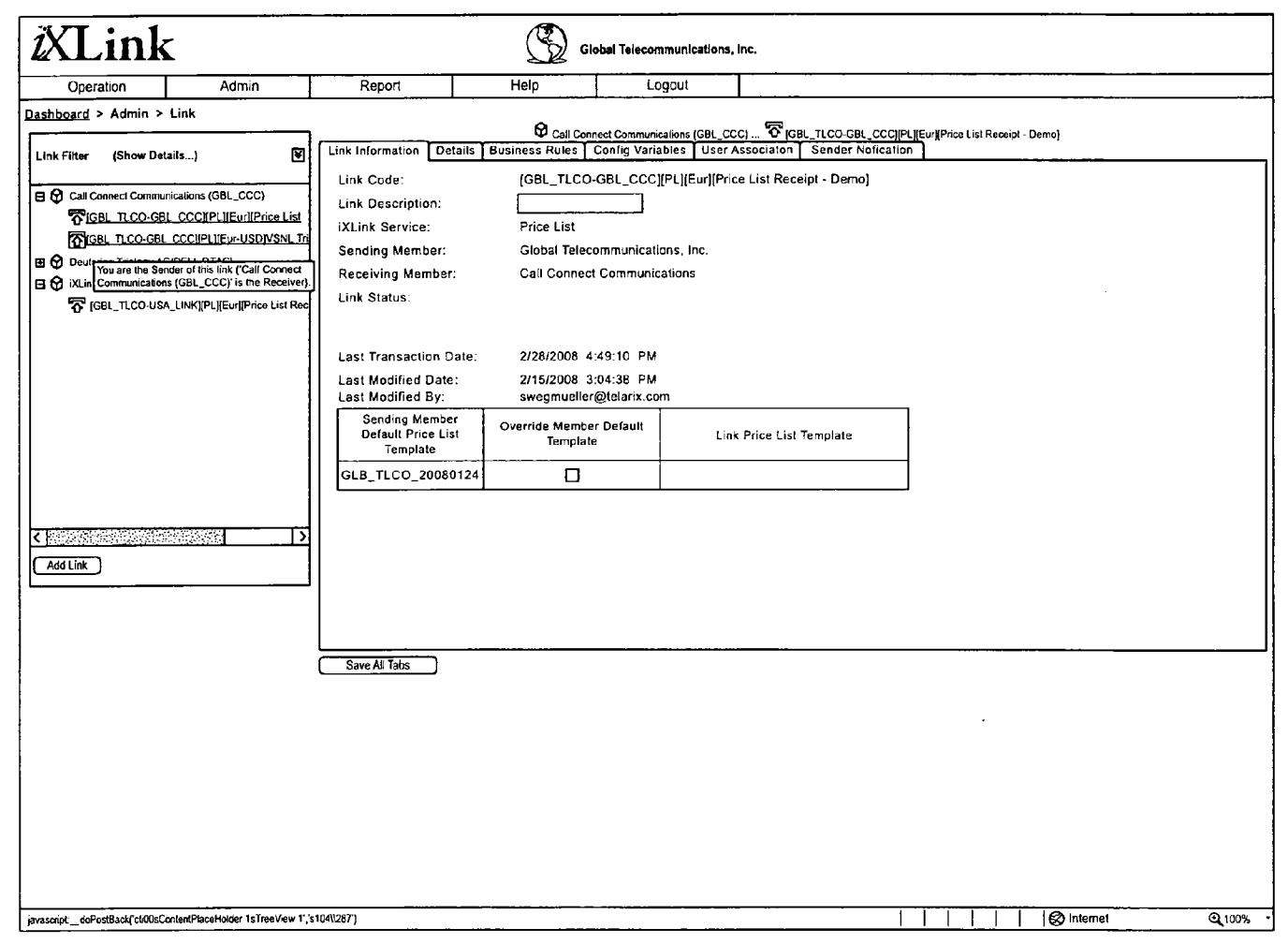
Figure 15M:
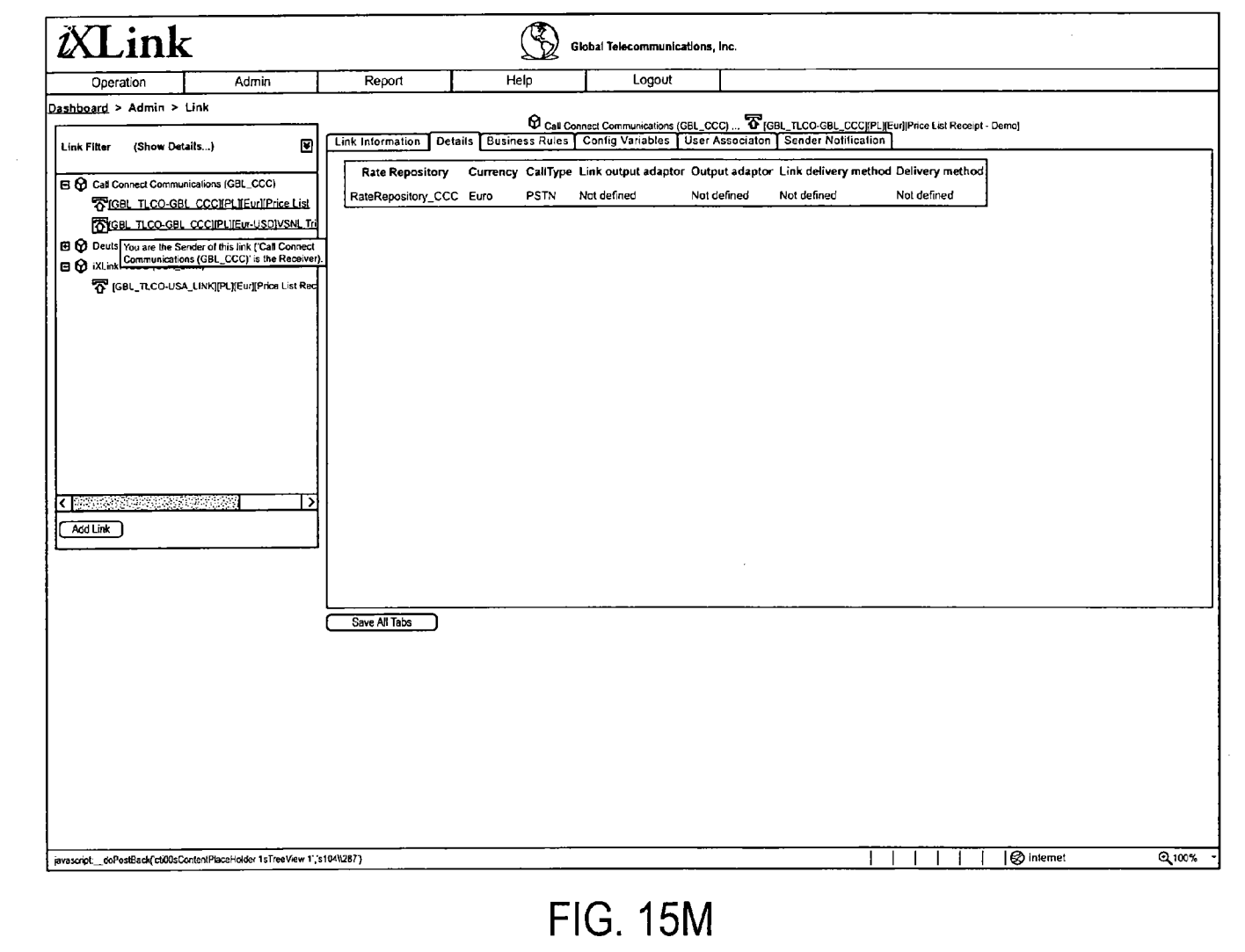
Figure 15N:
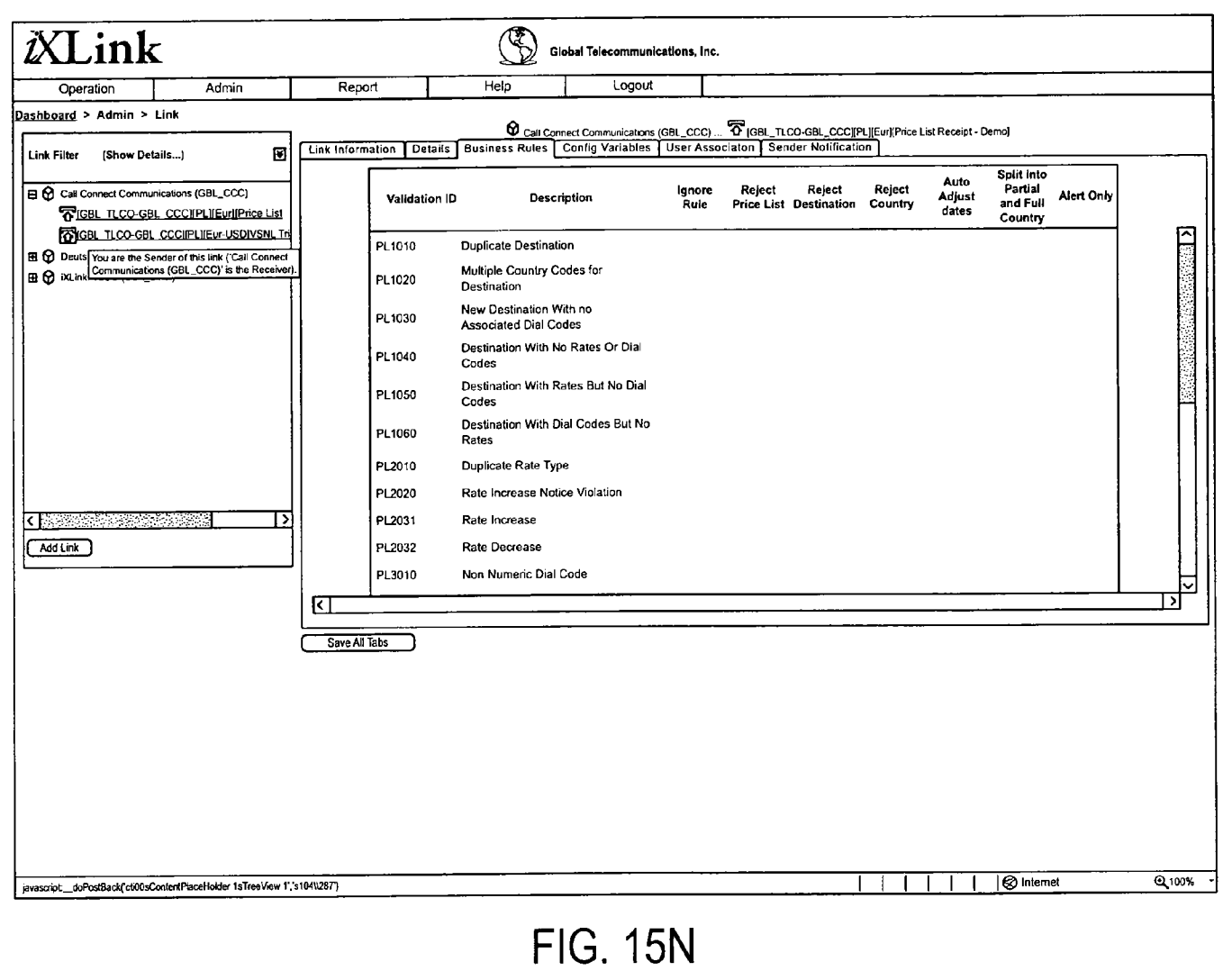
Figure 15P:
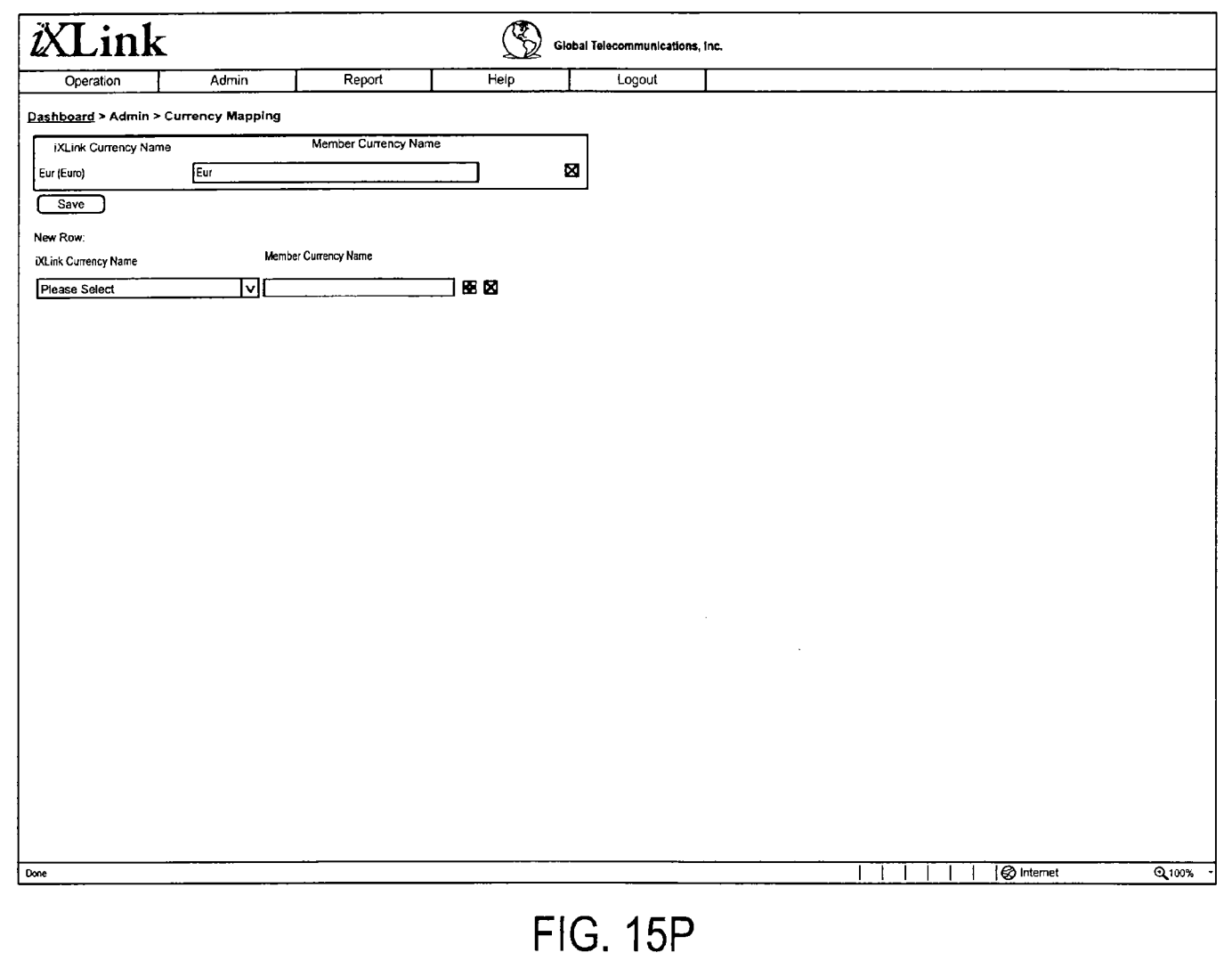

An example of a member specific link information page is shown in FIG. 15L. An example of a member specific link detail page is shown in FIG. 15M. An example of a link level business rule page is shown in FIG. 15N. An example of a member reference data upload page is shown in FIG. 15O. An example of a member specific currency mapping page is shown in FIG. 15P.

Figure 15Q:
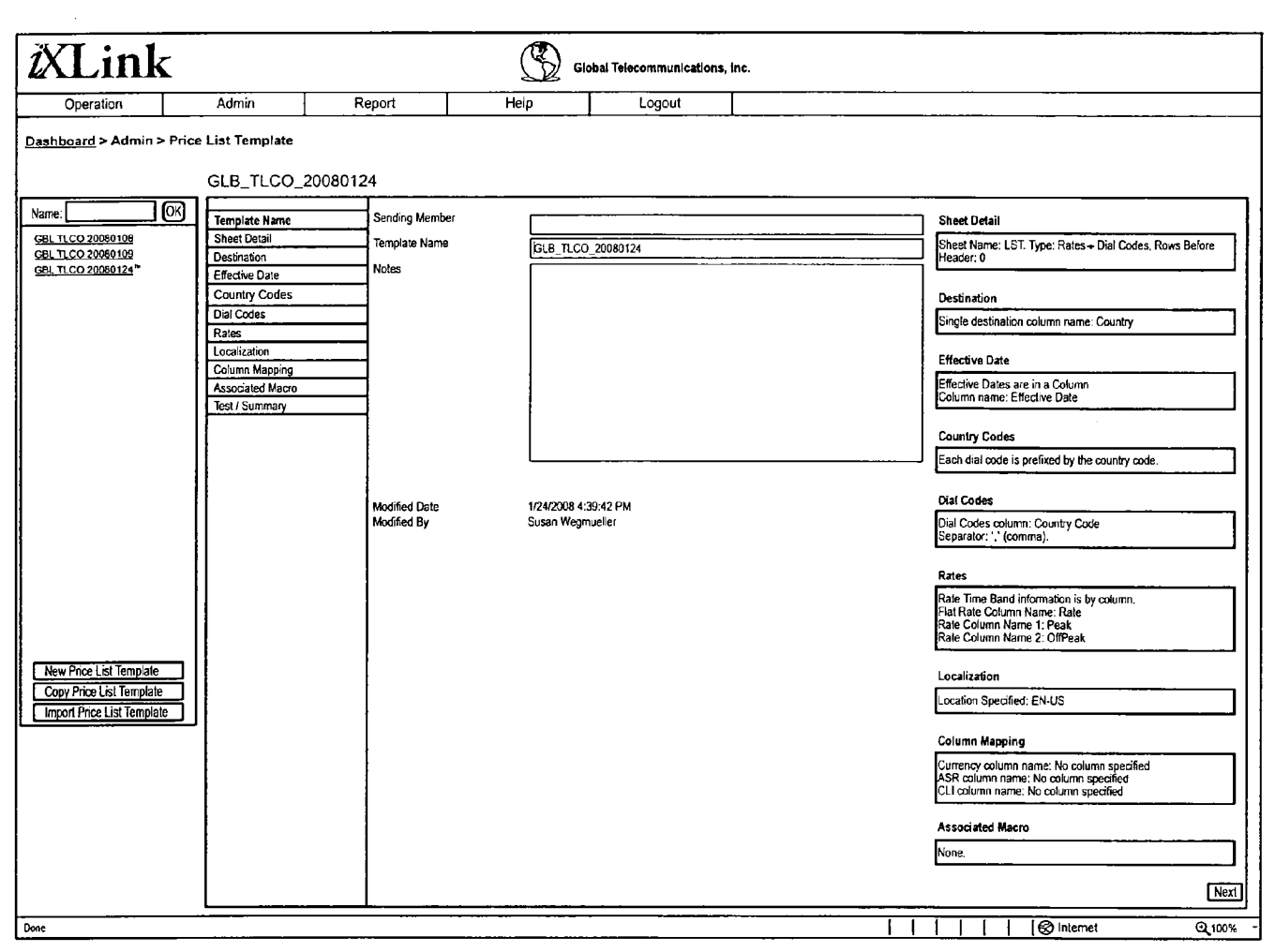
Figure 15R:
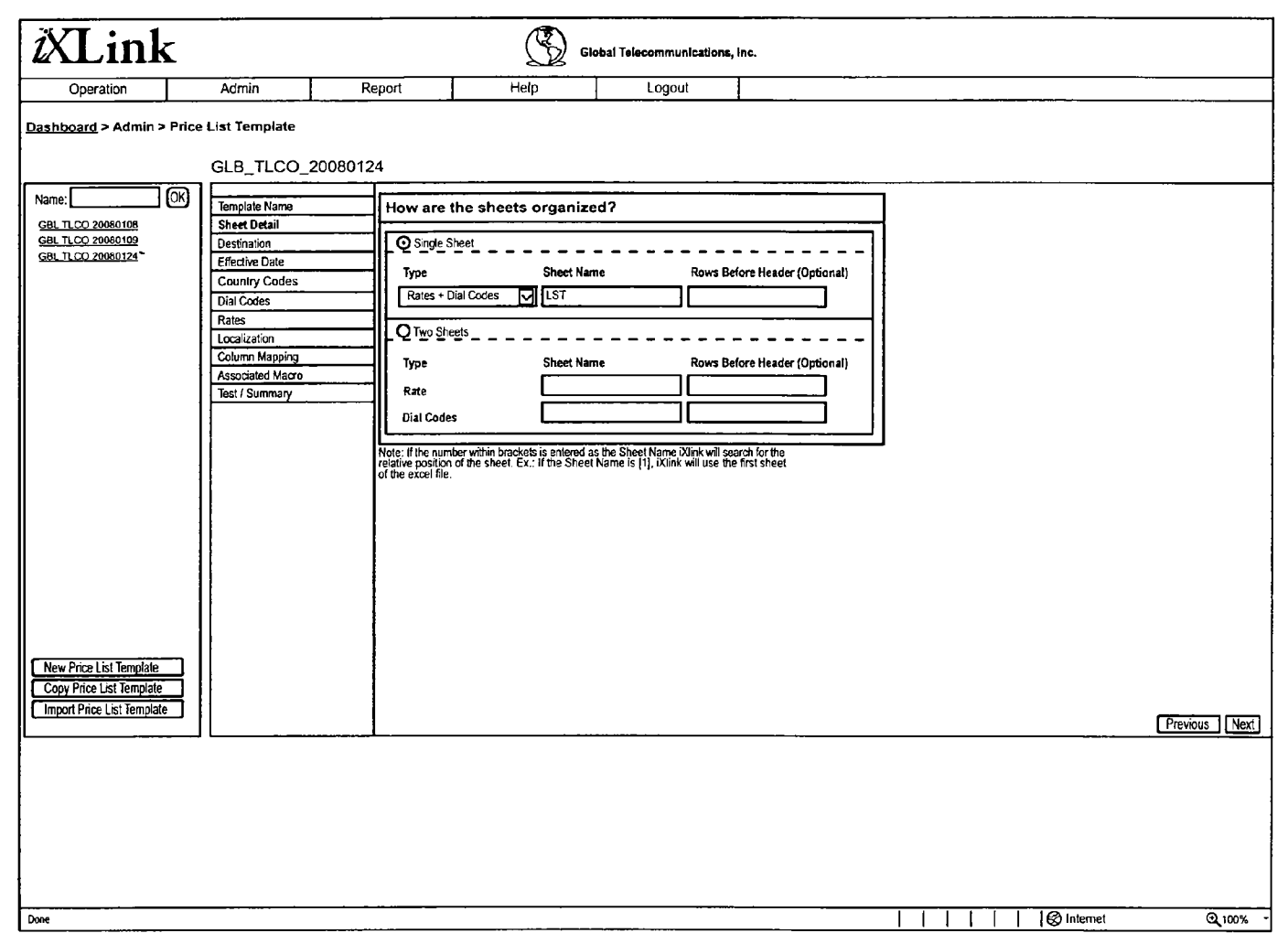
Figure 15S:
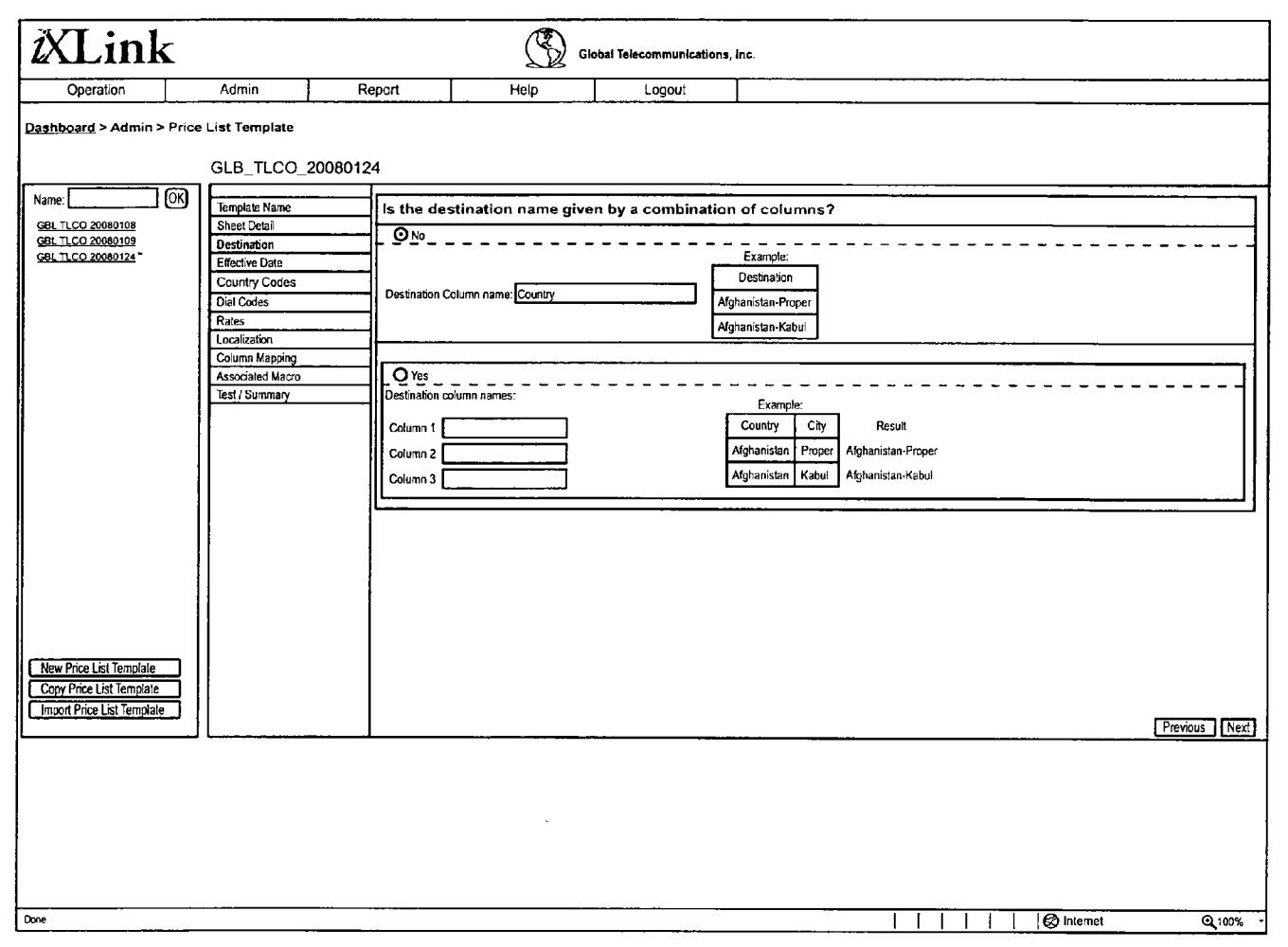
Figure 15T:
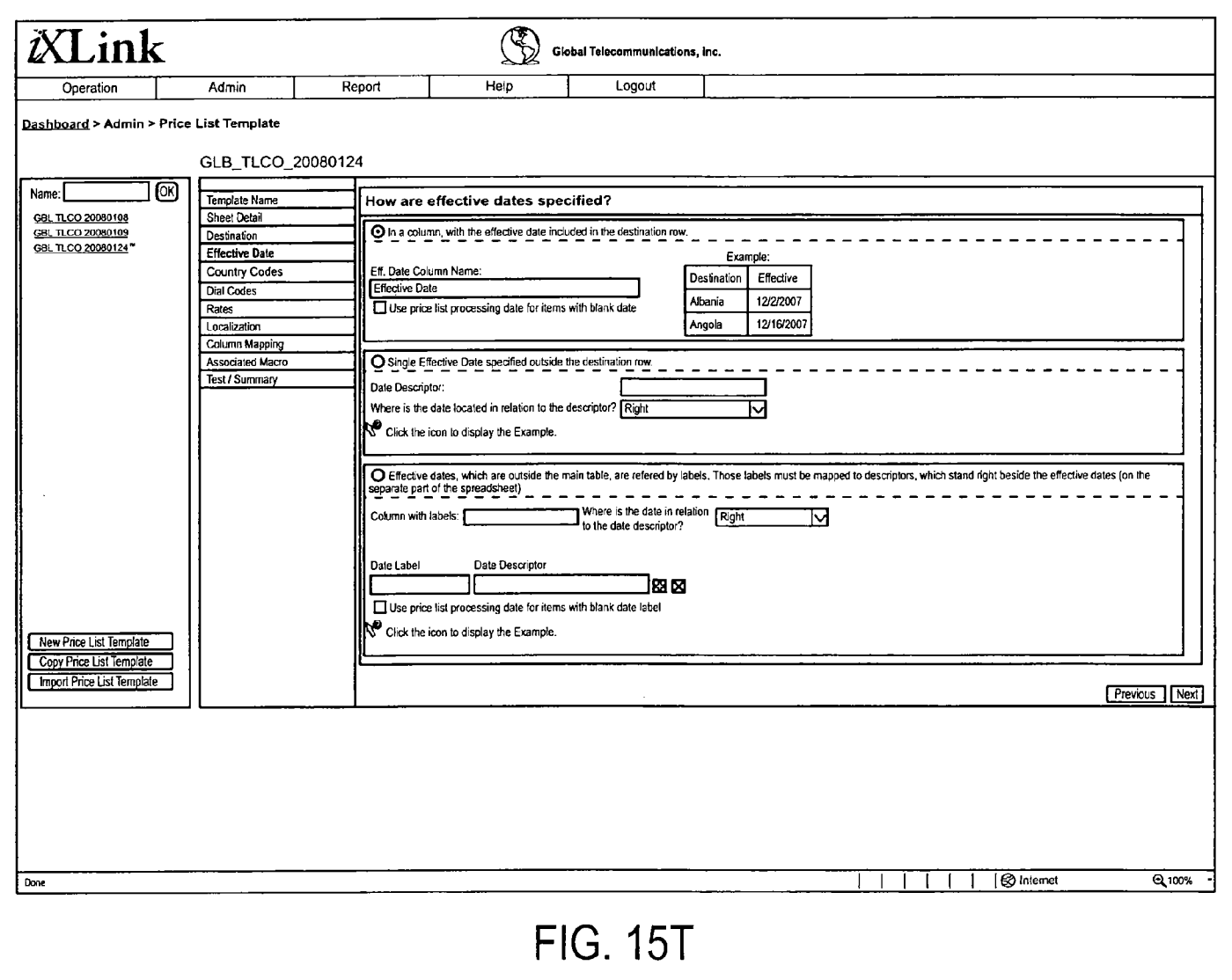
Figure 15U:
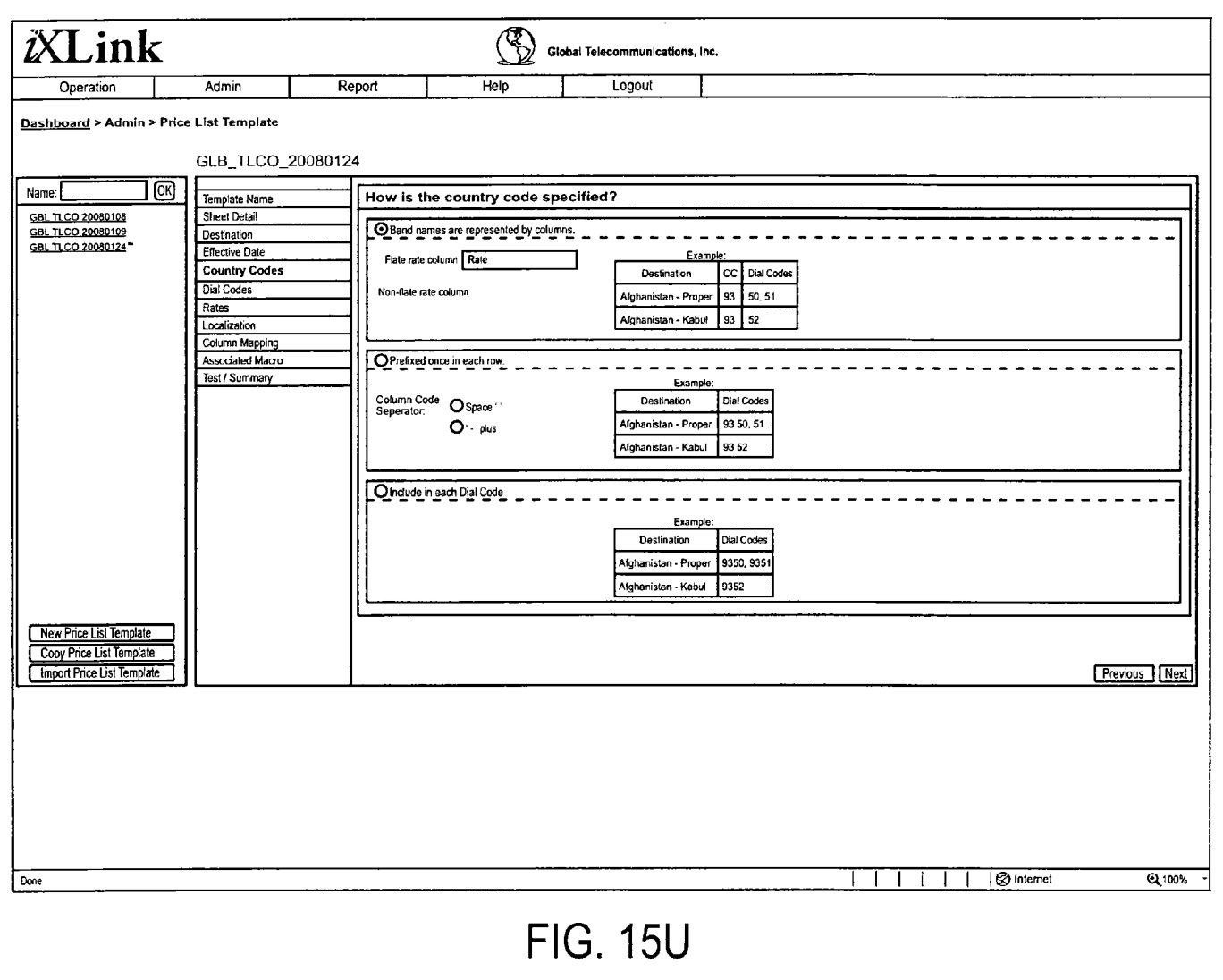
Figure 15V:
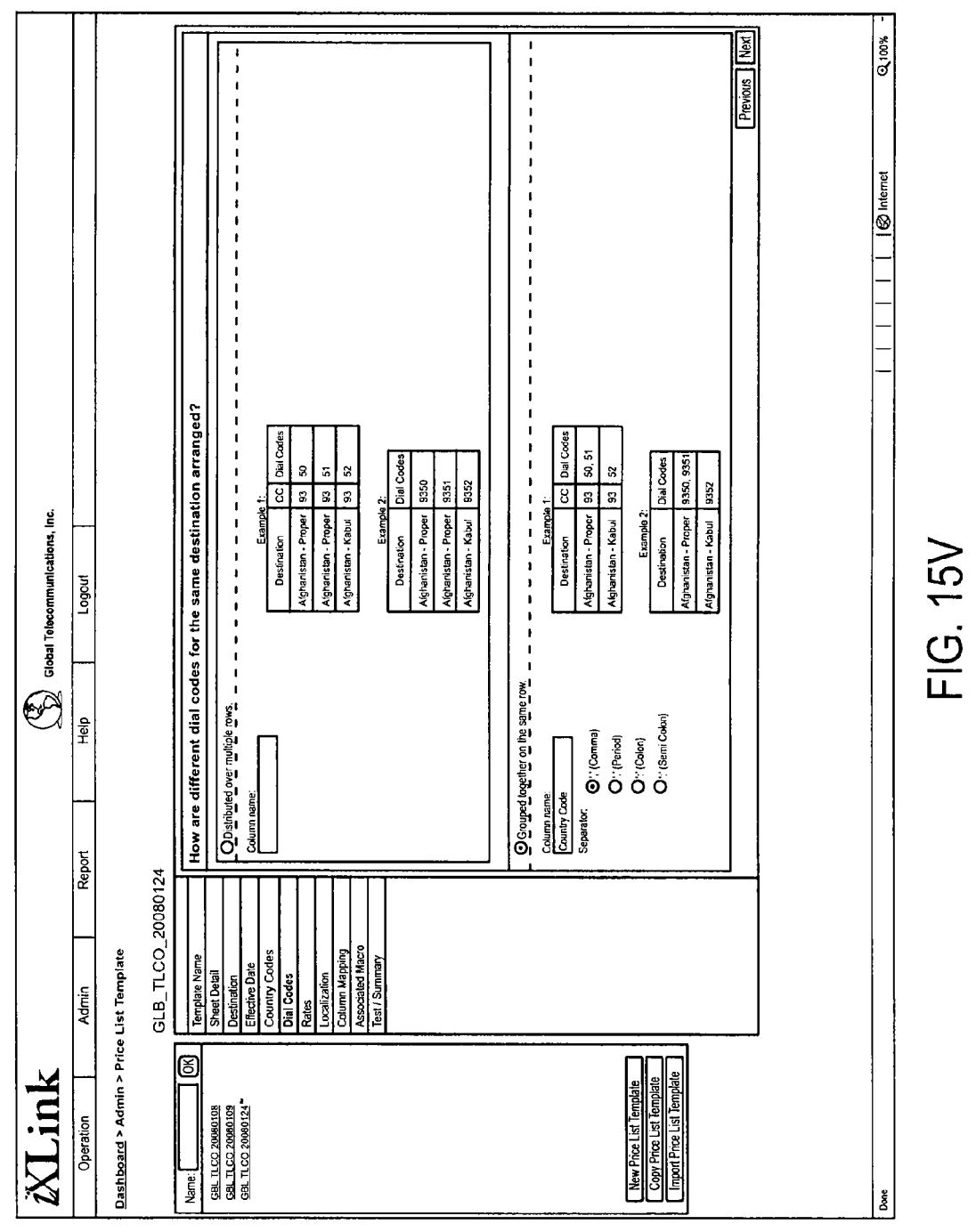
Figure 15W:
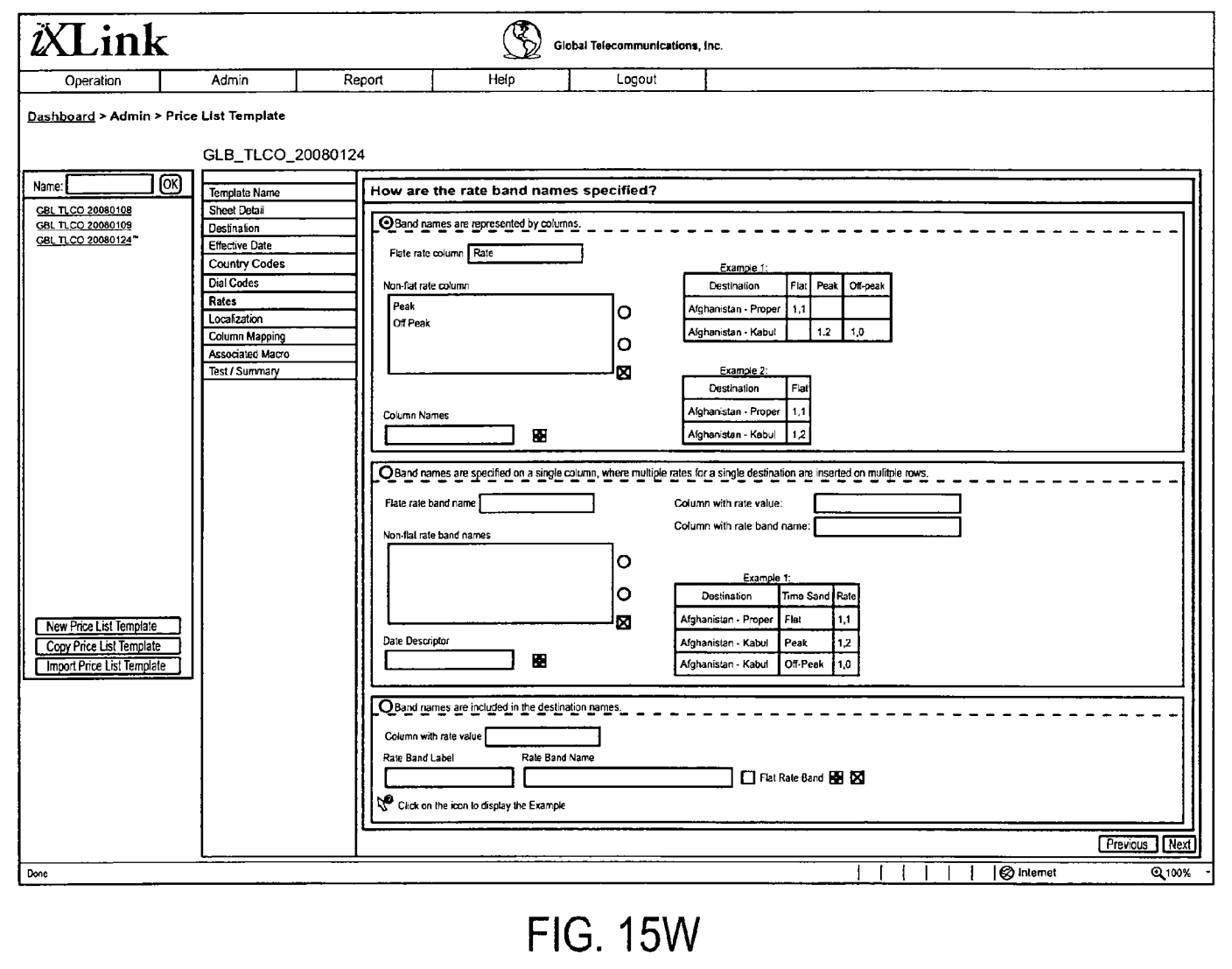
Figure 15X:
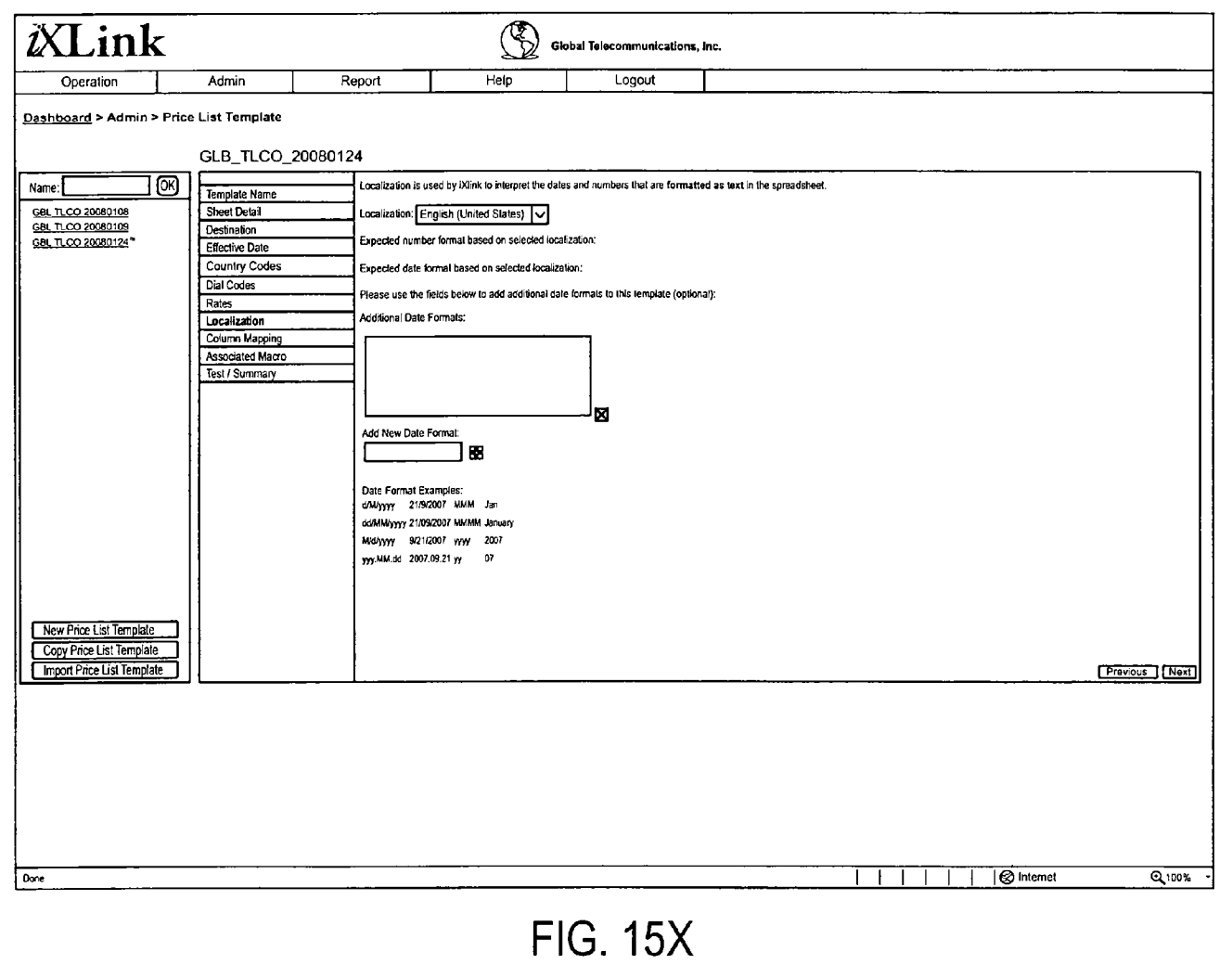
Figure 15Y:
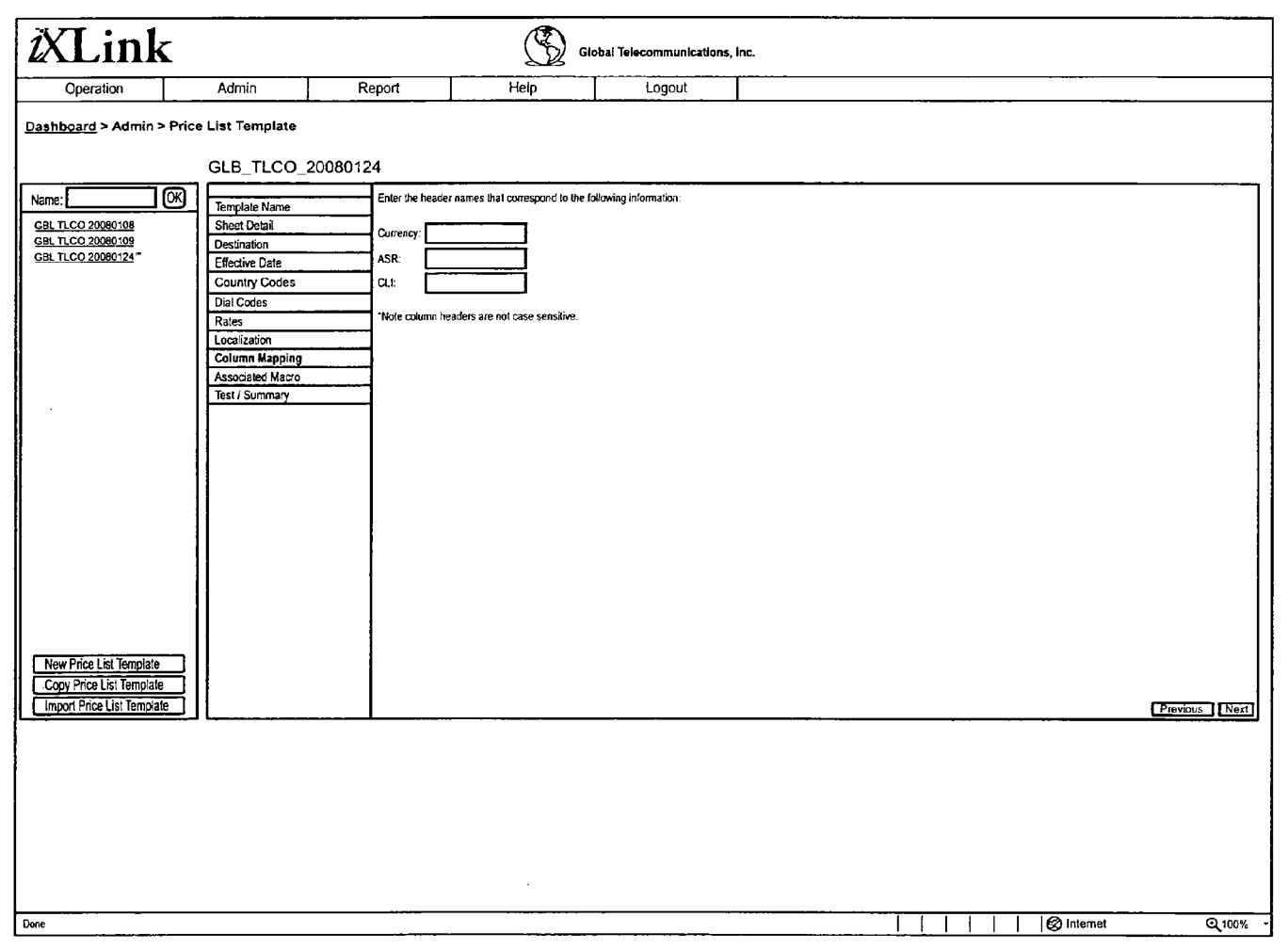
Figure 15Z:
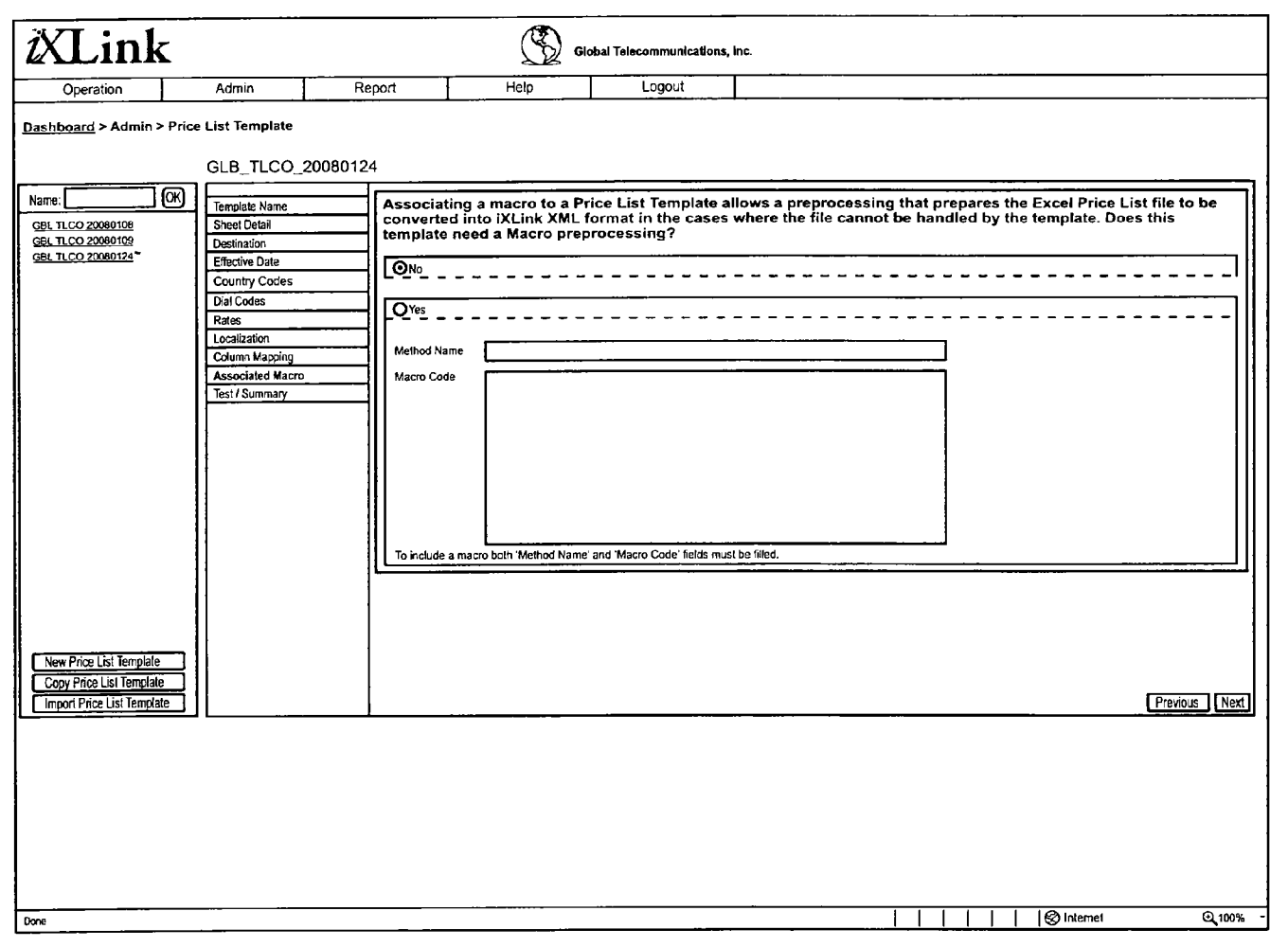

An example of a member specific Microsoft Excel template summary page is shown in FIG. 15Q. An example of a member specific Microsoft Excel template sheet detail page is shown in FIG. 15R. An example of a member specific Microsoft Excel template destination specification page is shown in FIG. 15S. An example of a member specific Microsoft Excel template effective date specification page is shown in FIG. 15T. An example of a member specific Microsoft Excel template country code specification page is shown in FIG. 15U. An example of a member specific Microsoft Excel template dial codes specification page is shown in FIG. 15V. An example of a member specific Microsoft Excel template rates specification page is shown in FIG. 15W. An example of a member specific Microsoft Excel template localization specification page is shown in FIG. 15X. An example of a member specific Microsoft Excel template column mapping page is shown in FIG. 15Y. An example of a member specific Microsoft Excel template macro specification page is shown in FIG. 15Z. An example of a member specific Microsoft Excel template test/summary page is shown in FIG. 15AA.

4. Report Pages

Figure 16:
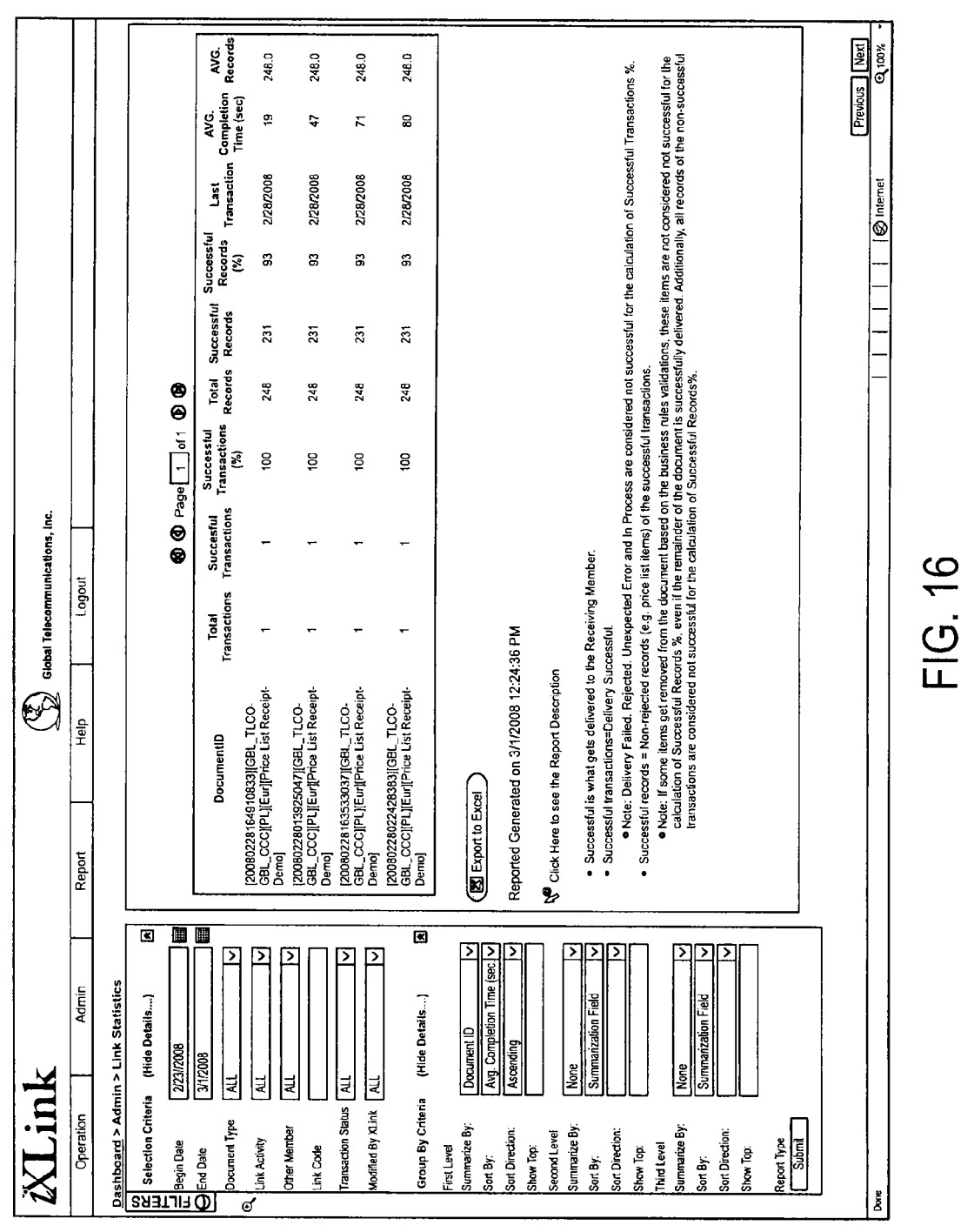

As described above, the system may generate reports related to the business documents exchanged between the members. For example, one such report is a member specific link statistics report page as shown in FIG. 16. This report shows statistics on the transactions and records within transactions related to the links between members. The statistics include total transactions, transactions successful, total records and successful records. The successful transactions may be defined as the transactions that result in successful delivery of one or more documents (as a result of splitting and cloning) after system processing. The successful records may be the records that are not rejected from the business documents due to the business rules.

There are a number of selection criteria listed on the left side of the link statistics report page as well as three levels of group by criteria consisting of:
Document ID
iXLink Service (e.g., Price List Receipt Service)
Link Activity
Link Code
Modified by iXLink
Other Member
Transaction State
Transaction Date The sorting selections for this group are by:
Average Completion Time
Last Transaction
Successful Records percent
Successful Number of Records
Total Records
Total Transactions The sorting selection can be ascending or descending, for example. Within each group at the first level, the same options may be selected at the second and third level. After making selections and clicking the submit button the results may appear on the right hand side of the page.

Figure 17:
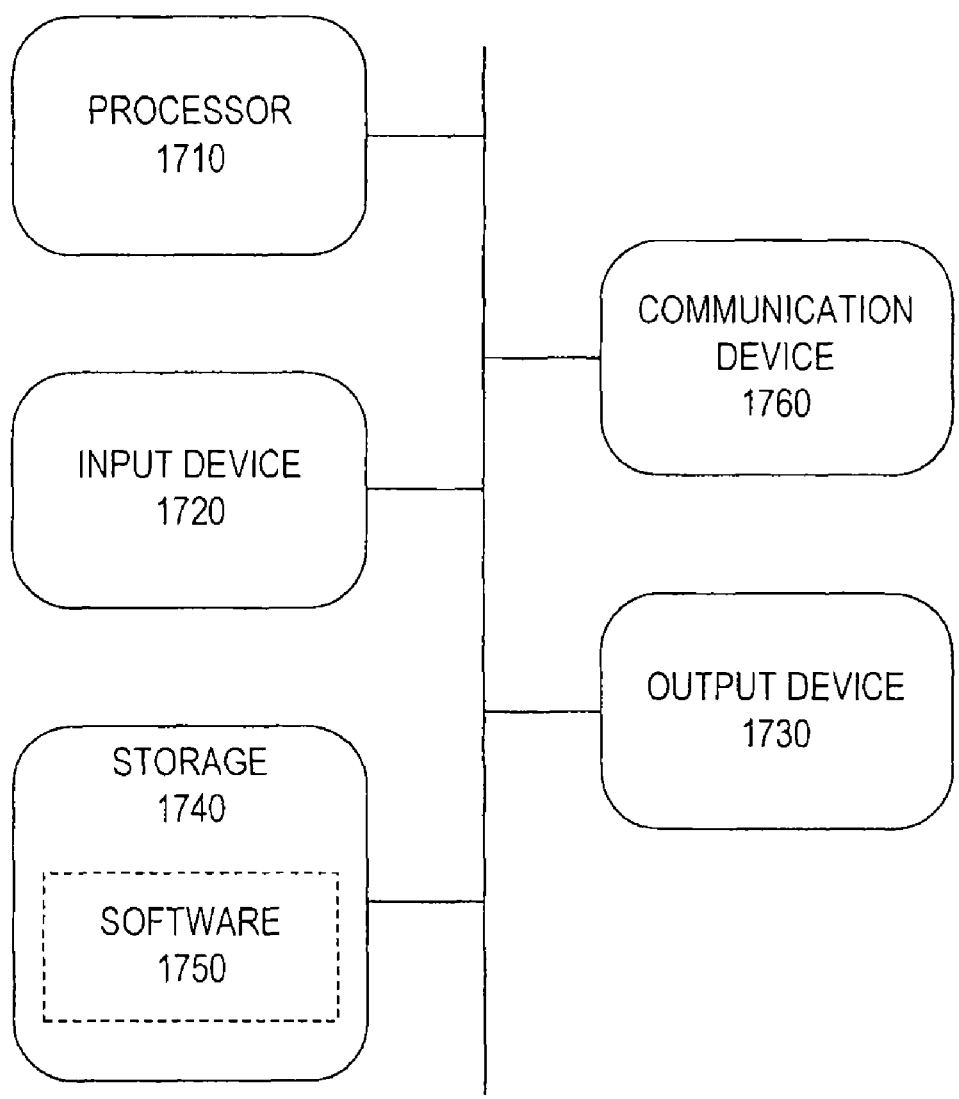
FIG. 17 is a block diagram of an example of a basic computing device.

FIG. 17 shows a block diagram of an example of a basic computing device, which may include sending client 100, receiving client 110 and document exchange server 120. The computing device may be a personal computer, workstation, server, handheld computing device, or any other type of microprocessor-based device. The computing device may include, for example, one or more of processor 1710, input device 1720, output device 1730, storage 1740, and communication device 1760.

Input device 1720 may include, for example, a keyboard, mouse, pen-operated touch screen or monitor, voice-recognition device, or any other device that provides input. Output device 1730 may include, for example, a monitor, printer, disk drive, speakers, or any other device that provides output.

Storage 1740 may include, for example, volatile and nonvolatile data storage, including one or more electrical, magnetic or optical memories such as a RAM, cache, hard drive, CD-ROM drive, tape drive or removable storage disk. Communication device 1760 may include, for example, network interface card, modem or any other device capable of transmitting and receiving signals over a network. The components of the computing device may be connected, for example, via a physical bus or wirelessly.

Software 1750, which may be stored in storage 1740 and executed by processor 1710, may include, for example, the application programming that embodies the functionality of the present disclosure (e.g., as embodied in document exchange server 120). Software 1750 may include, for example, a combination of servers such as application servers and database servers.

Network 0205 may include any type of interconnected communication system, which may implement any communications protocol, which may be secured by any security protocol. The corresponding network links may include, for example, telephone lines, DSL, cable networks, T1 or T3 lines, wireless network connections, or any other arrangement that implements the transmission and reception of network signals.

The computing device may implement any operating system, such as Windows or UNIX. Software 1750 may be written in any programming language, such as C, C++, Java or Visual Basic. In various embodiments, application software embodying the functionality of the present disclosure may be deployed on a standalone machine, in a client/server arrangement or through a Web browser as a Web-based application or Web service, for example.

Although the claimed subject matter has been fully described in connection with examples thereof with reference to the accompanying drawings, it is to be noted that various changes and modifications will become apparent to those skilled in the art. Such changes and modifications are to be understood as being included within the scope of the present disclosure as defined by the appended claims.

What is claimed is:

1. A method, comprising:
    establishing, by a transaction processing system, a link between a first party and a second party, the link being associated with one or more format rules, registered with the transaction processing system by the first party, specifying a document format and one or more business rules, registered with the transaction processing system by the second party, specifying how to process document content;
    receiving, by the transaction processing system, a document from the first party in association with the link;
    extracting, by the transaction processing system, multiple portions of content of the document;
    determining, by the transaction processing system, whether each of the extracted multiple portions of content satisfies the one or more business rules registered with the transaction processing system by the second party in association with the link;
    accepting, by the transaction processing system, one or more of the extracted multiple portions determined to satisfy the one or more business rules;
    rejecting, by the transaction processing system, one or more of the extracted multiple portions determined not to satisfy the one or more business rules; and
    delivering, by the transaction processing system, the accepted portions and not the rejected portions of the extracted content to the second party via the link.

2. The method of claim 1, further comprising:
    validating, by the transaction processing system, the content of the document based on business rules, registered with the transaction processing system by the first party in association with the link, specifying how to process document content.

3. The method of claim 1, further comprising:
    validating, by the transaction processing system, formatting associated with the document based on the one or more format rules registered with the transaction processing system by the first party.

4. The method of claim 3, further comprising:
    providing, by the transaction processing system, an error notification to the first party via the link if the formatting associated with the document violates the one or more format rules registered with the transaction processing system by the first party.

5. The method of claim 1, further comprising:
    providing, by the transaction processing system, an error notification to the first party regarding the rejected portions of the extracted content via the link.

6. The method of claim 1, further comprising:
    providing, by the transaction processing system, a delivery status of the document to the first party via the link.

7. The method of claim 6, wherein the delivery status of the document comprises a partial rejection of the content of the document.

8. The transaction processing system of claim 7, wherein the document format registered with the transaction processing system by the second party is Microsoft Excel.

9. The transaction processing system of claim 7, wherein the document format registered with the transaction processing system by the second party is CSV.

10. The transaction processing system of claim 7, wherein the document format registered with the transaction processing system by the second party is XML.

11. The method of claim 6, wherein the delivery status of the document comprises a full rejection of the content of the document.

12. The method of claim 1, wherein the first party and second party are communication service providers.

13. The method of claim 12, wherein the document is a telecommunication wholesale business document.

14. The method of claim 13, wherein the content of the document involves a price list.

15. The method of claim 13, wherein the content of the document involves an invoice.

16. The method of claim 13, wherein the content of the document involves a dispute.

17. The method of claim 1, wherein the delivery of the accepted portions of the extracted content to the second party is made via e-mail.

18. The method of claim 1, wherein the delivery of the accepted portions of the extracted content to the second party is made via File Transfer Protocol.

19. The method of claim 1, wherein the delivery of the accepted portions of the extracted content to the second party is made via Web Services.

20. The method of claim 1, wherein the receiving of the document by the transaction processing system is via e-mail.

21. The method of claim 1, wherein the receiving of the document by the transaction processing system is via File Transfer Protocol.

22. The method of claim 1, wherein the receiving of the document by the transaction processing system is via Web Services.

23. The method of claim 1, wherein the receiving of the document by the transaction processing system is via portal upload.

24. The method of claim 1, wherein the document received by the transaction processing system is in a Microsoft Excel format.

25. The method of claim 1, wherein the document received by the transaction processing system is in a CSV format.

26. The method of claim 1, wherein the document received by the transaction processing system is in an XML format.

27. The method of claim 1, wherein the link is further associated with one or more format rules, registered with the transaction processing system by the second party, specifying a document format.

28. The method of claim 27, wherein the document format registered with the transaction processing system by the second party is Microsoft Excel.

29. The method of claim 27, wherein the document format registered with the transaction processing system by the second party is CSV.

30. The method of claim 27, wherein the document format registered with the transaction processing system by the second party is XML.

31. The method of claim 27, further comprising:
converting the accepted portions of the extracted content to the document format specified by the one or more format rules registered with the transaction processing system by the second party, and
delivering the converted accepted portions of the extracted content to the second party via the link.

32. A transaction processing system, comprising:
circuitry configured to establish a link between a first party and a second party, the link being associated with one or more format rules, registered with the transaction processing system by the first party, specifying a document format and one or more business rules, registered with the transaction processing system by the second party, specifying how to process document content;
circuitry configured to receive a document from the first party in association with the link;
circuitry configured to extract multiple portions of content of the document;
circuitry configured to determine whether each of the extracted multiple portions of content satisfies the one or more business rules registered with the transaction processing system by the second party in association with the link;
circuitry configured to accepting, by the transaction processing system, one or more of the extracted multiple portions determined to satisfy the one or more business rules;
circuitry configured to rejecting, by the transaction processing system, one or more of the extracted multiple portions determined not to satisfy the one or more business rules; and
circuitry configured to deliver the accepted portions and not the rejected portions of the extracted content to the second party via the link.

33. The transaction processing system of claim 32, wherein the circuitry is configured to validate the content of the document based on business rules, registered with the transaction processing system by the first party in association with the link, specifying how to process document content.

34. The transaction processing system of claim 32, wherein the circuitry is configured to validate formatting associated with the document based on the one or more format rules registered with the transaction processing system by the first party.

35. The transaction processing system of claim 34, wherein the circuitry is configured to provide an error notification to the first party via the link if the formatting associated with the document violates the rules registered with the transaction processing system by the first party.

36. The transaction processing system of claim 32, wherein the circuitry is configured to provide an error notification to the first party regarding the rejected portions of the extracted content via the link.

37. The transaction processing system of claim 32, wherein the circuitry is configured to provide a delivery status of the document to the first party via the link.

38. The transaction processing system of claim 37, wherein the delivery status of the document comprises a partial rejection of the content of the document.

39. The transaction processing system of claim 37, wherein the delivery status of the document comprises a full rejection of the content of the document.

40. The transaction processing system of claim 32, wherein the first party and second party are communication service providers.

41. The transaction processing system of claim 40, wherein the document is a telecommunication wholesale business document.

42. The transaction processing system of claim 41, wherein the content of the document involves a price list.

43. The transaction processing system of claim 41, wherein the content of the document involves an invoice.

44. The transaction processing system of claim 41, wherein the content of the document involves a dispute.

45. The transaction processing system of claim 32, wherein the circuitry is configured to deliver the accepted portions of the extracted content to the second party via e-mail.

46. The transaction processing system of claim 32, wherein the circuitry is configured to deliver the accepted portions of the extracted content to the second party via File Transfer Protocol.

47. The transaction processing system of claim 32, wherein the circuitry is configured to deliver the accepted portions of the extracted content to the second party via Web Services.

48. The transaction processing system of claim 32, wherein the circuitry is configured to receive the document via e-mail.

49. The transaction processing system of claim 32, wherein the circuitry is configured to receive the document via File Transfer Protocol.

50. The transaction processing system of claim 32, wherein the circuitry is configured to receive the document via Web Services.

51. The transaction processing system of claim 32, wherein the circuitry is configured to receive the document via portal upload.

52. The transaction processing system of claim 32, wherein the circuitry is configured to receive the document in a Microsoft Excel format.

53. The transaction processing system of claim 32, wherein the circuitry is configured to receive the document in a CSV format.

54. The transaction processing system of claim 32, wherein the circuitry is configured to receive the document in an XML format.

55. The transaction processing system of claim 32, wherein the link is further associated with one or more format rules, registered with the transaction processing system by the second party, specifying a document format.

56. The transaction processing system of claim 55, wherein the circuitry is configure to convert the accepted portions of the extracted content to the document format specified by the one or more format rules registered with the transaction processing system by the second party, and deliver the converted accepted portions of the extracted content to the second party via the link.

\* \* \* \* \*